US009335467B2

(12) United States Patent
Kokubun et al.

(10) Patent No.: US 9,335,467 B2
(45) Date of Patent: May 10, 2016

(54) MULTI-CORE FIBER AND METHOD OF POSITIONING OF CORE OF MULTI-CORE FIBER

(75) Inventors: Yasuo Kokubun, Yokohama (JP); Tatsuhiko Watanabe, Yokohama (JP)

(73) Assignee: NAT'L UNIVERSITY CORP. YOKOHAMA NAT'L UNIVERSITY, Yokohama-shi (JP)

( * ) Notice: Subject to any disclaimer, the term of this patent is extended or adjusted under 35 U.S.C. 154(b) by 0 days.

(21) Appl. No.: 14/238,698

(22) PCT Filed: Aug. 22, 2012

(86) PCT No.: PCT/JP2012/071216
§ 371 (c)(1),
(2), (4) Date: Feb. 12, 2014

(87) PCT Pub. No.: WO2013/027776
PCT Pub. Date: Feb. 28, 2013

(65) Prior Publication Data
US 2014/0199039 A1 Jul. 17, 2014

(30) Foreign Application Priority Data

Aug. 25, 2011 (JP) .................................. 2011-183768
Feb. 20, 2012 (JP) .................................. 2012-034470

(51) Int. Cl.
*G02B 6/40* (2006.01)
*G02B 6/02* (2006.01)
(Continued)

(52) U.S. Cl.
CPC ........ *G02B 6/02042* (2013.01); *G02B 6/03633* (2013.01); *G02B 6/46* (2013.01); *Y10T 29/49826* (2015.01)

(58) Field of Classification Search
CPC .................................... G02B 6/02; G02B 6/40
USPC ......................................................... 385/126
See application file for complete search history.

(56) References Cited

U.S. PATENT DOCUMENTS 3,823,996 A * 7/1974 Kompfner et al. ............. 385/126
2002/0176677 A1* 11/2002 Kumar et al. .................. 385/126
(Continued)

FOREIGN PATENT DOCUMENTS

JP          61-10036 A       1/1986
JP        2004-252401 A      9/2004
(Continued)

OTHER PUBLICATIONS

Notification of Transmittal of Translation of the International Preliminary Report on Patentability (Form PCT/IB/326) of International Application No. PCT/JP2012/071216 mailed Mar. 6, 2014 with Forms PCT/IB/373, PCT/IB/338 and PCT/ISA/237 (13 pages).
(Continued)

*Primary Examiner* — Kaveh C Kianni
(74) *Attorney, Agent, or Firm* — Westerman, Hattori, Daniels & Adrian, LLP

(57) ABSTRACT

A multi-core fiber for accommodating multiple single mode cores in one optical fiber is provided with multiple types of non-identical cores having different propagation constants. Each of the multiple types of non-identical cores includes a core part and a cladding part covering an outer periphery of the core part. The cladding part has a double cladding structure including a first cladding for surrounding an outer periphery of the core part and a second cladding on the outer side of the first cladding. In the multiple types of non-identical cores, an optical electromagnetic profile in the core part and the first cladding is confined within a range of the core part and the first cladding, restricting a leakage thereof to the second cladding, and the propagation constant of each non-identical core is made different using the refractive index of the first cladding as a parameter.

13 Claims, 40 Drawing Sheets

(51) Int. Cl.
*G02B 6/46* (2006.01)
*G02B 6/036* (2006.01)

(56) References Cited

U.S. PATENT DOCUMENTS

| | | | | |
|---|---|---|---|---|
| 2005/0002424 | A1* | 1/2005 | Bernasconi et al. | 372/20 |
| 2005/0249509 | A1* | 11/2005 | Nagarajan et al. | 398/198 |
| 2009/0154503 | A1* | 6/2009 | Peyghambarian et al. | 372/6 |
| 2010/0316343 | A1* | 12/2010 | Yamamoto | 385/129 |
| 2010/0329670 | A1* | 12/2010 | Essiambre | H04B 10/2581 398/43 |
| 2010/0329671 | A1* | 12/2010 | Essiambre | G02B 6/14 398/44 |
| 2011/0235983 | A1* | 9/2011 | Hayashi et al. | 385/100 |
| 2011/0243517 | A1 | 10/2011 | Kokubun et al. | |
| 2011/0243556 | A1* | 10/2011 | Nagarajan et al. | 398/43 |
| 2011/0274398 | A1* | 11/2011 | Fini et al. | 385/124 |
| 2013/0039627 | A1* | 2/2013 | Li | G02B 6/02042 385/126 |
| 2013/0136410 | A1 | 5/2013 | Sasaoka | |
| 2013/0302002 | A1* | 11/2013 | Imamura | 385/127 |
| 2014/0119694 | A1* | 5/2014 | Abedin et al. | 385/43 |
| 2014/0199039 | A1* | 7/2014 | Kokubun et al. | 385/126 |

FOREIGN PATENT DOCUMENTS

| | | |
|---|---|---|
| WO | 2010/038863 A1 | 4/2010 |
| WO | 2010/082656 A1 | 7/2010 |

OTHER PUBLICATIONS

International Search Report dated Sep. 18, 2012 issued in corresponding application No. PCT/JP2012/071216.
Written Opinion of the International Searching Authority dated Sep. 18, 2012 issued in corresponding application No. PCT/JP2012/071216.
Hayashi et al., "Low-Crosstalk and Low-Loss Multi-Core Fiber Utilizing Fiber Bend", Proceedings of Optical Fiber Communications Conference, OWJ3, 2011, 3 pages, cited in the Specification.
Inao et al., "High Density Multicore-Fiber Cable", Proceedings of the 28th International Wire & Cable Symposium (IWCS), 1979, pp. 370-384, cited in the Specification.
Koshiba et al., "Heterogeneous multi-core fibers: proposal and design principle", IEICE Electronics Express, vol. 6, No. 2, Jan. 2009, pp. 98-103, cited in the Specification.
Rosinski et al., "Multichannel Transmission of a Multicore Fiber Coupled with Vertical-Cavity Surface-Emitting Lasers", Journal of Lightwave Technology, vol. 17, No. 5, May 1999, pp. 807-810, cited in the Specification.
Takenaga et al., "Reduction of Crosstalk by Trench-Assisted Multi-Core Fiber", Proceedings of Optical Fiber Communications Conference, 2011, OWJ4, 3 pages, cited in the Specification.
Tomozawa et al., "Maximum core capacity of heterogeneous uncoupled multi-core fibers", 15th OptoElectronics and Communications Conference (OECC2010) Technical Digest, 7C2-4, Jul. 2010, pp. 170-171, cited in the Specification.
Tomozawa et al., "Maximum number of cores in heterogeneous uncoupled multicore fibers", Proceedings of IEICE General Conference, C-3-25, Mar. 2010, p. 198, cited in the Specification.
Office Action dated Jan. 12, 2016, issued in counterpart Chinese Application No. 201280041183.0, with English translation (14 pages).

* cited by examiner

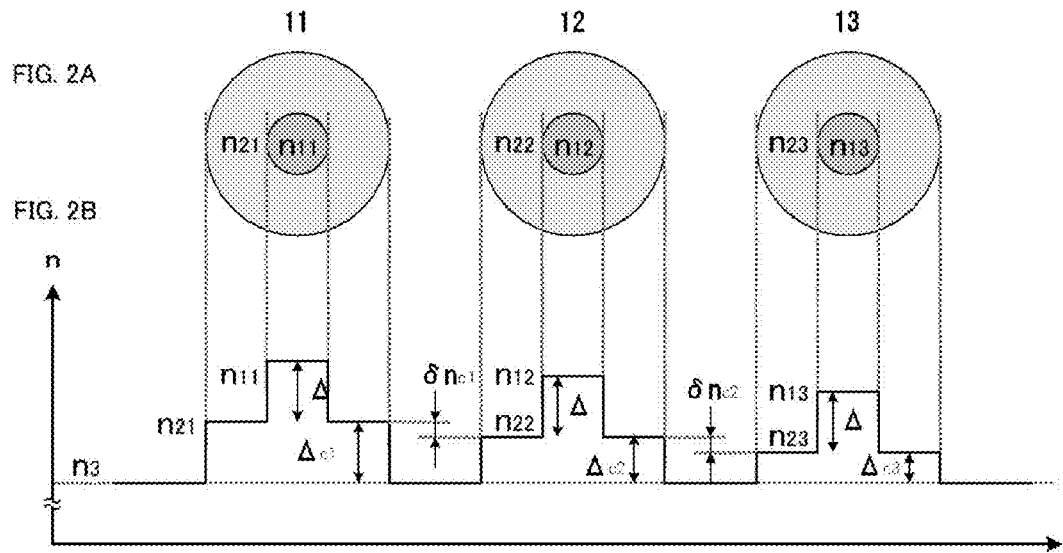
FIG. 2A
FIG. 2B
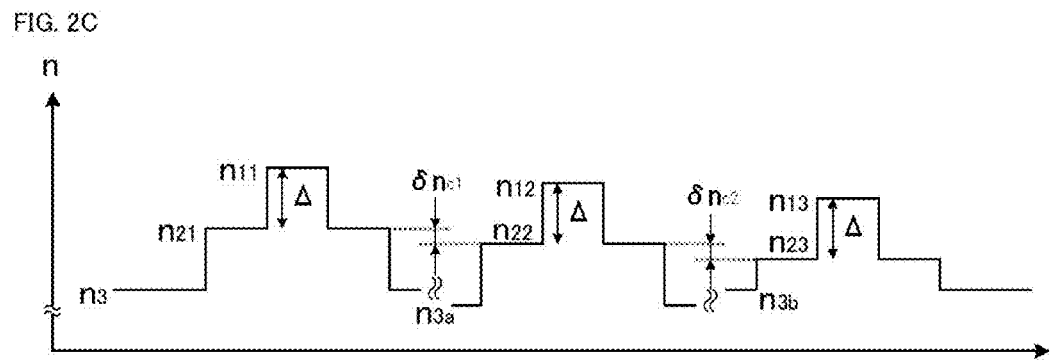
FIG. 2C
$\Delta = (n_{11}^2 - n_{21}^2)/2n_{11}^2$
$= (n_{12}^2 - n_{22}^2)/2n_{12}^2$
$= (n_{13}^2 - n_{23}^2)/2n_{13}^2$
→ DISPERSION AND SINGLE MODE WAVELENGTH ARE MADE UNIFORM
$n_{21} > n_{22} > n_{23}$
→ PROPAGATION CONSTANT $\beta$ IS MADE DIFFERENT
→ CORE-TO-CORE IS UNCOUPLED

|     | i=1     | i=2     | i=3     | i=4     | i=5     |
|-----|---------|---------|---------|---------|---------|
| n1i | 1.44910 | 1.44939 | 1.44968 | 1.44989 | 1.45027 |
| n2i | 1.44402 | 1.44431 | 1.44960 | 1.44490 | 1.444519 |
|     | i=6     | i=7     | i=8     | i=9     |         |
| n1i | 1.45087 | 1.45087 | 1.45116 | 1.45145 |         |
| n2i | 1.44548 | 1.44578 | 1.44607 | 1.44636 |         |

LP$_{01}$ ELECTRIC FIELD AMPLITUDE PROFILE
(COLOR BAR DISPLAY)

LP$_{01}$ ELECTRIC FIELD VECTOR DISPLAY

LP₁₁(even) ELECTRIC FIELD AMPLITUDE PROFILE
(COLOR BAR DISPLAY)

LP₁₁(even) ELECTRIC FIELD VECTOR DISPLAY

LP$_{11}$(odd) ELECTRIC FIELD AMPLITUDE PROFILE
(COLOR BAR DISPLAY)

LP₁₁(odd) ELECTRIC FIELD VECTOR DISPLAY

INDEPENDENT WAVEGUIDE,
(UNCOUPLED) CORE

UNCOUPLED WAVEGUIDE

INDEPENDENT
(UNCOUPLED) CORE

125 μm

19 CORES $$\Lambda = \frac{40 \mu m}{\sqrt{3}} = 23 \mu m$$

125 μm

12 CORES $$\Lambda_y = 40 \frac{\sqrt{3}}{2} = 28.3 \mu m$$

FIG. 37A
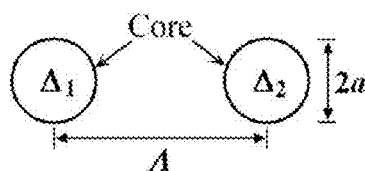
FIG. 37B
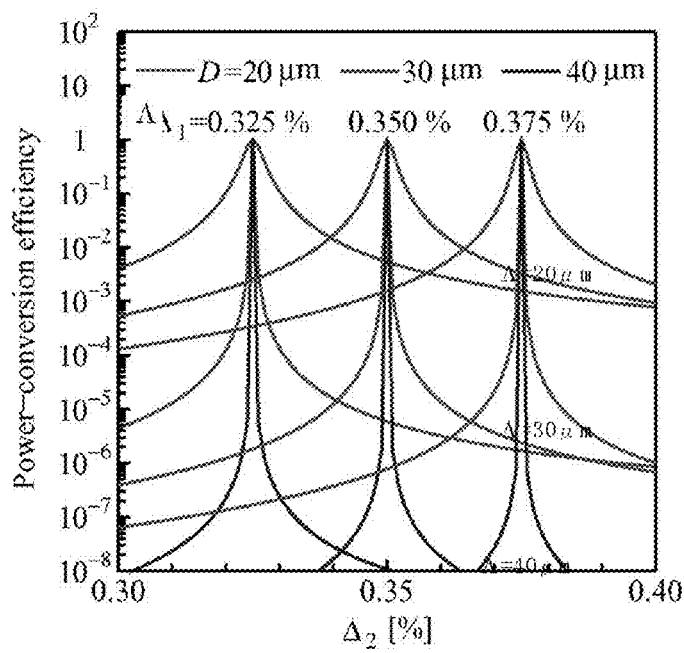
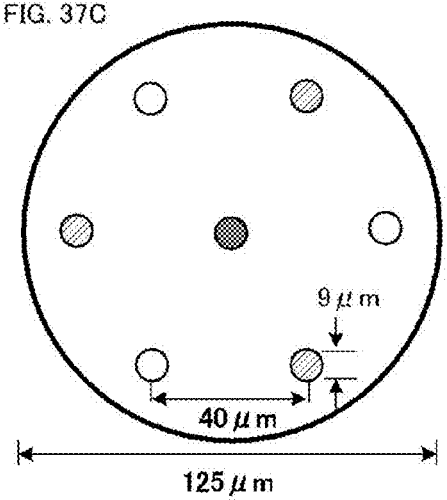
FIG. 37C
7 CORES
$$\Lambda = \frac{70\,\mu m}{\sqrt{3}} = 40\,\mu m$$
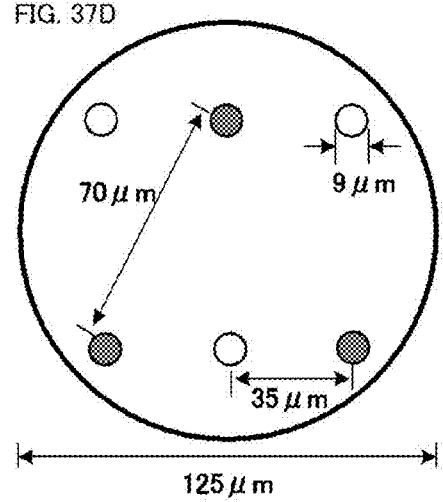
FIG. 37D
6 CORES
$$\Lambda_y = 70\frac{\sqrt{3}}{2} = 52.0\,\mu m$$

MULTI-CORE FIBER AND METHOD OF POSITIONING OF CORE OF MULTI-CORE FIBER

TECHNICAL FIELD

The present invention relates to a multicore fiber for use in high-density space-division multiplexed transmission, and a method for arranging cores thereof.

BACKGROUND ART

As terms for representing a coupled state of signals between cores in a general sense, the term "coupled state" and the term "imperfect coupled state" are used. As terms for representing the inter-core coupled state in a strict sense, the term "perfect coupled state" and the term "uncoupled state" are known.

The term "coupled state" represents a coupled state in which the coupling efficiency is almost 1, and the term "imperfect coupled state" represents a coupled state in which the coupling efficiency is smaller than 1 but not perfectly zero.

The term "perfect coupled state" represents a coupled state in which the coupling efficiency is perfectly 1, and the term "uncoupled state" represents a coupled state in which the coupling efficiency is close to zero, being a value at which the coupling efficiency is unmeasurable.

In the field of a multicore fiber, the term "coupled multicore fiber" and the term "uncoupled multicore fiber" are used. In this case, coupling in the "coupled multicore fiber" indicates that the inter-core coupled state corresponds to the "coupled state" in a general sense, and coupling in the "uncoupled multicore fiber" indicates that the inter-core coupled state corresponds to the "imperfect coupled state" in a general sense.

The present invention employs the terms used in the field of the multicore fiber. That is, being "uncoupled" in the "uncoupled multicore fiber" is not the state of "uncoupled" in the strict sense, but indicates being "imperfect coupled" in the general sense, which means the coupled state with the coupling efficiency being smaller than 1 but not perfectly zero.

For spatial division multiplexed transmission by the use of the multicore fiber, there are known configurations in which multiple single mode cores are accommodated in one optical fiber, such as those disclosed in the Non-Patent Document 1 and the Non-Patent Document 2.

To keep individual cores in the uncoupled state, the following configurations are known: a configuration in which the cores are placed with a sufficient core center interval, a configuration in which cores with different propagation constants are used so that the imperfect coupled state is maintained even though the cores are placed close enough, and a configuration in which a separation layer or an air hole is provided between the cores.

FIG. 32 illustrates models in a manner being the simplest for describing the inter-core coupled state of the multicore fiber.

An attempt to configure an uncoupled multicore fiber, by use of identical cores with the same propagation constant, requires to separate the cores significantly so as to avoid cross talk therebetween, and this makes it difficult to increase the core density. Accordingly, the uncoupled multicore fiber employs non-identical cores with different propagation constants to establish the multicore fiber.

FIG. 32A) illustrates independent waveguides of non-identical cores with different propagation constants $\beta_0^{(1)}$ and $\beta_0^{(2)}$. FIG. 32B illustrates uncoupled waveguides of non-identical cores, being two types with different propagation constants. A multi-core fiber using two types of non-identical cores which have different propagation constants $\beta_0^{(1)}$ and $\beta_0^{(2)}$ forms the uncoupled waveguides.

It is to be noted here that non-identical cores represent cores with different propagation constants, and identical cores represent cores with the same propagation constant.

Propagation constants may be made different by using various values as parameters, such as a refractive index difference, a core diameter, and a refractive index profile. FIG. 33 illustrates one example of different propagation constants. FIG. 33A illustrates a configuration example of the multicore fiber made up of a triangular arrangement of three types of cores with different propagation constants, and the figures from FIG. 33B to FIG. 33D illustrate examples in which the propagation constants of the cores are made different, by using various refractive index differences, core diameters, and refractive index profile.

The core shown in FIG. 33B has the core diameter of $2a_{-1}$, the refractive index of $n_{1-1}$, and the cladding refractive index of $n_{2-1}$. The core shown in FIG. 33C has the core diameter of $2a_{-2}$, the refractive index of $n_{1-2}$, and the cladding refractive index of $n_{2-2}$. The core shown in FIG. 33D has the core diameter of $2a_{-3}$, the peak refractive index of $n_{1-3}$, and the refractive index profile with the cladding refractive index of $n_{2-3}$.

The inventors of the present invention proposed a heterogeneous uncoupled multicore fiber (MCF) that suppresses inter-core coupling and accommodates cores at high density, by using multiple single mode cores with various relative refractive index differences Δ (Non Patent Document 3).

The relative refractive index difference Δ is defined as the following, when the refractive index of the core is assumed as $n_1$, and the refractive index of the first cladding is assumed as $n_2$:

$$\Delta = (n_1^2 - n_2^2)/2n_1^2$$

In the case where the relative refractive index difference Δ between the core and the first cladding is extremely small relative to 1 (Δ is much less than 1), it is expressed as $(n_1 - n_2)/n_1$ according to weakly guiding approximation.

The relative refractive index difference Δc between the first cladding and the second cladding is defined as the following, when the refractive index of the first cladding is assumed as $n_2$, and the refractive index of the second cladding is assumed as $n_3$:

$$\Delta c = (n_2^2 - n_3^2)/2n_2^2$$

FIG. 33A illustrates the multicore fiber made up of a large number of cores that have different propagation constants, being arranged in a triangular lattice pattern. In this example, the core center interval is Λ between neighboring non-identical cores having different propagation constants, and the core center interval is D between identical cores having the same propagation constant. Note that, in the triangular lattice pattern arrangement using three types of cores, there is the relation of D=√3×Λ between the core center interval Λ and the core center interval D, based on the geometrical shape of the arrangement, Λ representing the distance between non-identical cores and D representing the distance between identical cores.

With reference to FIG. 34 to FIG. 37, an explanation will be provided as to a procedure for designing an uncoupled multicore fiber made up of the non-identical cores. FIG. 34 and FIG. 35 illustrate the case of high refractive index difference where the relative refractive index difference is large between the core and the cladding in the non-identical core, and FIG. 36 and FIG. 37 illustrate the case of low refractive index difference where the relative refractive index difference is small between the core and the cladding of the non-identical core. Those examples illustrate the case where $\Delta=1.10\%$ to $1.30\%$ is assumed as the high refractive index difference, and the case where $\Delta=0.3\%$ to $0.4\%$ is assumed as the low refractive index difference.

The multi-core fiber has a problem of cross talk caused by coupling phenomenon, that is, signal light leaks mutually into the cores within the optical fiber.

For the same core center interval, the cross talk between identical cores is higher than the cross talk between non-identical cores, and for the same cross talk level, the identical core center interval D is larger than the non-identical core center interval $\Lambda$. If the identical core center interval D is determined in the triangular arrangement of cores of three types in such a manner that a defined cross talk level is obtained between the identical cores, and this may allow a propagation constant difference to be defined between the non-identical cores, so that the cross talk between non-identical cores is sufficiently lower than the defined cross talk level.

Conventional procedures for designing the uncoupled multicore fiber made up of non-identical cores is; firstly, calculating the identical core center interval D based on the cross talk that is defined between the identical cores, and then, calculating the non-identical core center interval $\Lambda$ according to geometric relations in the core arrangement.

FIG. 34 illustrates a procedure for determining the identical core center interval D. In FIG. 34A, the distance between the identical cores with the same relative refractive index difference $\Delta$ is assumed as D. A coupling length $l_c$ between identical cores is 5,000 km, when the cross talk is set to be equal to or lower than −30 dB between identical cores for the propagation distance of 100 km as a required condition in designing. Assuming a coupling coefficient between two cores as $\kappa$, the cross talk caused by the coupling between the identical cores is represented by normalized power $\sin^2(\kappa L)$ that is transferred from one core to the other core after propagating only by a certain distance L. The coupling length $l_c$ is defined as a length which renders the normalized power transferred from one core to the other core to be 1.0, and therefore, it is expressed as $l_c=\pi/(2\kappa)$.

FIG. 34B illustrates the relations between the coupling length $l_c$ and the identical core center interval D, where the core diameter $2a=5$ μm and the relative refractive index difference $\Delta$ is 1.10%, 1.15%, 1.20%, 1.25%, and 1.30%. The relations as shown in FIG. 34B indicates that when the relative refractive index difference $\Delta$ is 1.20%, the identical core center interval D, which satisfies the condition that coupling length $l_c=5,000$ km or longer, is 40 μm.

FIG. 35 illustrates the cross talk between non-identical cores and an arrangement thereof. In FIG. 35A, the non-identical cores are arranged at the non-identical core center interval $\Lambda$ that is determined from the identical core center interval D. FIG. 35B illustrates the power coupling efficiency (also referred to as the maximum power transfer efficiency) of the non-identical cores. The power coupling efficiency represents the cross talk between non-identical cores. This figure illustrates the cross talk by the power coupling efficiency F, with respect to the relative refractive index difference $\Delta_2$ in each case where the relative refractive index difference $\Delta_1$ is 1.15%, 1.20%, and 1.25%. As illustrated, the power coupling efficiency (maximum power transfer efficiency) F represents the cross talk caused by the coupling between the non-identical cores.

The power coupling efficiency (maximum power transfer efficiency) F between two non-identical cores is expressed by the following formula:

$$F=1/[1+(\beta_1-\beta_2)^2/(2\kappa)^2]$$

In the above formula, $\kappa$ represents the inter-core coupling coefficient, $\beta n$ represents the propagation constant of the core n (Non Patent Document 3).

FIG. 35B illustrates the cases where the non-identical core center interval $\Lambda$ is 10 μm, 15 μm, and 20 μm, indicating that the larger is the non-identical core center interval $\Lambda$, the smaller is the cross talk. If a gap between the relative refractive index differences $\Delta$ is 0.05% in the case where the non-identical core center interval $\Lambda$ is 23 μm, the cross talk is equal to or lower than −80 dB, and it is possible to assume that the cross talk value of −30 dB being defined as the set value is satisfied.

When the identical core center interval D is 40 μm, the non-identical core center interval $\Lambda$ in the triangular lattice arrangement is 23 μm $(=40/\sqrt{3})$, and the non-identical core center interval $\Lambda y$ in a rectangular lattice arrangement is 28.3 μm $(=40\times\sqrt{3}/2)$. FIGS. 35C and D illustrate, respectively, an example of the triangular lattice arrangement where 19 cores are arranged and an example of the rectangular lattice arrangement where 12 cores are arranged, in the case where the fiber diameter is set to be 125 μm.

In the case of low refractive index difference where the relative refractive index difference is small between the core and the cladding of the non-identical core, similar to the case of high refractive index difference, the coupling length $l_c$ between identical cores is 5,000 km, when the cross talk between identical cores is set to be equal to or lower than −30 dB for the propagation distance of 100 km as a required condition in designing.

FIG. 36A illustrates the distance D between the identical cores having the same relative refractive index difference $\Delta$, and FIG. 36B illustrates the relations between the coupling length $l_c$ and the identical core center interval D. Here, the core diameter is assumed as $2a=9$ μm, and results are shown respectively for the relative refractive index differences $\Delta$, being 0.3%, 0.325%, 0.35%, 0.375%, and 0.40%. According to the relations as shown in FIG. 36B, when the relative refractive index difference is 0.35%, the identical core center interval D is 70 μm, which satisfies the coupling length $l_c=5,000$ km or more.

FIG. 37 illustrates the cross talk between the non-identical cores, and the core arrangement thereof. In FIG. 37A, the non-identical cores are arranged, keeping the non-identical core center interval $\Lambda$ therebetween, the distance being determined by the identical core center interval D. FIG. 37B illustrates the power coupling efficiency (maximum power transfer efficiency) of the non-identical cores. This figure illustrates the cross talk by the power coupling efficiency F with respect to the relative refractive index difference $\Delta_2$, in each case where the relative refractive index difference $\Delta_1$ is 0.325%, 0.350%, and 0.375%.

FIG. 37B illustrates the cases where the non-identical core center interval $\Lambda$ is 20 μm, 30 μm, and 40 μm, indicating that the larger is the non-identical core center interval $\Lambda$, the smaller is the cross talk. If a gap between the relative refractive index differences $\Delta$ is 0.025% in the case where the non-identical core center interval $\Lambda$ is 40 μm, the cross talk is equal to or lower than −80 dB, and therefore it is confirmed that the cross talk value of −30 dB being defined as the set value is satisfied.

When the identical core center interval D is 70 μm, the non-identical core center interval $\Lambda$ is 40 μm $(=70/\sqrt{3})$ in the triangular lattice arrangement, and the non-identical core center interval Δy is 52.0 μm (=70×√3/2) in the rectangular lattice arrangement. FIGS. 37C and D illustrate, respectively, an example of the triangular lattice arrangement where 7 cores are arranged and an example of the rectangular lattice arrangement where 6 cores are arranged, in the case where the fiber diameter is set to be 125 μm.

The core arrangement in the heterogeneous uncoupled multicore fiber is based on the periodic arrangement of a symmetric configuration such as the triangular arrangement or the rectangular arrangement. According to the aforementioned examples, the identical core center interval for the cross talk of the same level is approximately three times larger than the non-identical core center interval. Therefore, it is suggested to raise the number of the non-identical core types so as to increase the core density (Non Patent Documents 4 and 5).

FIG. 38 illustrates the cores become denser, along with raising the number of types of non-identical core. FIG. 38A illustrates an example in which nine types of various cores are arranged. A cross-section of the core usually has a circular shape, but in this figure, the cores are represented by symbols having polygonal shapes being displayed for easily identifying the respective non-identical cores. In this arrangement example, the center of gravity of the lattice points in the triangular lattice arrangement is added as a placing position, and nine types of cores are arranged.

FIG. 38B illustrates the number of cores being able to be accommodated within the radius R. If nine types of non-identical cores as shown in FIG. 38B are used, the number of cores being able to be accommodated is 55 for the case where R/D is 1.25. It is to be noted here that R represents the diameter of a range for arranging the cores, and D represents the identical core center interval. In FIG. 38B, the symbols from "a" to "e" represent, respectively, single type core, two types of non-identical cores, three types of non-identical cores, four types of non-identical cores, and eight types of non-identical cores, which are arranged.

In the case where the refractive index difference is high where the relative refractive index difference is large between the core and the cladding in the non-identical core, as shown in FIG. 39A, 19 cores are able to be accommodated in the example where three types of non-identical cores are arranged, whereas, as shown in FIG. 39B, 55 cores are able to be accommodated in the example where nine types of non-identical cores are arranged. Therefore, raising the number of types of the non-identical cores allows the cores to be denser.

As a configuration for increasing the core density, other than raising the number of types of the non-identical cores as described above, there is suggested a configuration that a portion with low refractive index, referred to as "trench", is formed in the portion corresponding to the cladding between adjacent cores (Non Patent Documents 6 and 7).

PRIOR ART DOCUMENT

Non Patent Document

Non Patent Document 1
S. Inao, T. Sato, H. Hondo, M. Ogai, S. Sentsui, A. Otake, K. Yoshizaki, K. Ishihara, and N. Uchida, "High density multi-core-fiber cable", Proceedings of the 28th International Wire & Cable Symposium (IWCS), pp. 370-384, 1979.
Non Patent Document 2
B. Rosinski, J. W. D. Chi, P. Grasso, and J. L. Bihan, "Multichannel transmission of a multicore fiber coupled with Vertically-Coupled-Surface-Emitting Lasers", J. Lightwave Technol., vol. 17, no. 5, pp. 807-810, 1999.
Non Patent Document 3
M. Koshiba, K. Saitoh, and Y. Kokubun, "Heterogeneous Multi-Core Fibers: Proposal and Design Principle", IEICE ELEX, vol 6, No. 2, pp. 98-103, January 2009.
Non Patent Document 4
Tomozawa, Kokubun, "Maximum number of cores in heterogeneous uncoupled multicore fibers", Proceedings of the IEICE General Conference in 2010, The Institute of Electronics, Information and Communication Engineers, C-3-25 (March in 2010)
Non Patent Document 5
K. Tomozawa, Y. Kokubun, "Maximum core capacity of heterogeneous uncoupled multi-core fibers", 15th Optoelectronics and Communications Conference (OECC2010), Sapporo, 7C2-4, Jul. 7, 2010.
Non Patent Document 6
K. Takenaga, Y. Arakawa, S. Tanigawa, N. Guan, S. Matsuo, K. Saitoh, M. Koshiba, "Reduction of Crosstalk by Trench-Assisted Multi-Core Fiber", in Proceedings of Optical Fiber Communications Conference 2011, paper OWJ4.
Non Patent Document 7
T. Hayashi, T. Taru, O. Shimakawa, T. Sasaki, E. Sasaoka, "Low-Crosstalk and Low-Loss Multi-Core Fiber Utilizing Fiber Bend", in Proceedings of Optical Fiber Communications Conference 2011, paper OWJ3.

DISCLOSURE OF THE INVENTION

Problem to be Solved by the Invention

In a case where core density is increased by raising the number of non-identical core types, a range of the gap between the maximum relative refractive index difference $\Delta$ and the minimum relative refractive index difference $\Delta$ (the range of the relative refractive index difference $\Delta$) is enlarged along with the increase of the number of non-identical core types. Since propagation characteristics such as core dispersion and a single mode wavelength (a wavelength in which a next higher order mode of the lowest order mode is cut off) depends on the relative refractive index difference $\Delta$, there is a problem that thus enlarged range of the relative refractive index difference $\Delta$ may expand a difference in the propagation characteristics of the non-identical cores.

FIG. 40 illustrates a profile of the relative refractive index difference $\Delta$ of cores, when the number of types of non-identical cores is increased in the case where the refractive index difference $\Delta$ is high, for instance, over 1.1%. In FIG. 40, in order to form nine types of non-identical cores, assuming the gap as 0.05%, between the relative refractive index differences $\Delta$ of the cores, $\delta\Delta=0.4\%$ (=0.05%×8) is necessary as the range of all relative refractive index differences $\Delta$, and the larger is the range $\delta$ of the relative refractive index difference $\Delta$, the more increases the difference in the propagation characteristics between the cores.

If the relative refractive index difference $\Delta$ and the core diameter are simply changed, in order to differ the propagation constants of the non-identical cores constituting the heterogeneous uncoupled MCF, there is a problem that wide variations may occur in the propagation characteristics such as the single mode wavelength of each core and the dispersion relating to expansion of pulse width at the time of pulse transmission. On the other hand, in order to render the propagation characteristics uniform in the non-identical cores, a measure such as dispersion compensation is necessary, for instance. However, this kind of measure is various depending on each non-identical core, and this makes the configuration of the multi-core fiber complicated. In particular, if the number of the non-identical cores is increased to make the cores denser, it becomes further difficult to reduce the difference in the propagation characteristics.

Therefore, in the multi-core fiber provided with multiple types of non-identical cores with various propagation constants, there is a problem that a difference may occur in the propagation characteristics between the non-identical cores, and additionally, there is another problem that the difference in the propagation characteristics become larger, along with the increase of core density, which is caused by raising the number of the non-identical core types.

An object of the present invention is to solve the conventional problems as described above, and reduce the difference in the propagation characteristics between the non-identical cores in the multi-core fiber provided with multiple types of non-identical cores having different propagation constants.

In addition, another object is to restrain expansion of the range of the relative refractive index difference $\Delta$ between the non-identical cores, when the cores become denser due to the increase of the number of types of the non-identical cores, and thereby mitigating increase of the difference in the propagation characteristics between the cores.

Means to Solve the Problem (Configuration of Non-Identical Cores in a Multi-Core Fiber)

The present invention is directed to a multi-core fiber accommodating multiple single mode cores within one optical fiber, the multiple cores being provided with multiple types of non-identical cores, the cores having different propagation constants. Each of the multiple types of non-identical cores provided in the multi-core fiber of the present invention incorporates a core part and a cladding part that covers the outer periphery of the core part. The cladding part has a double cladding structure, including a first cladding surrounding the outer periphery of the core part, and a second cladding on the outer side of the first cladding.

The double cladding structure made up of the first cladding and the second cladding varies the fundamental mode propagation constant for propagating through each core part, thereby configuring multiple types of non-identical cores.

The core part and the first cladding in each of the non-identical cores are provided with a first configuration relating to propagation characteristics, and a second configuration relating to the propagation constant.

In the first configuration, an optical electromagnetic field profile is confined within the range of the core part and the first cladding, restricting leakage of the optical electromagnetic field into the second cladding, thereby rendering the propagation characteristics uniform in each core part. The propagation characteristics may be, for instance, the dispersion and a single mode wavelength, the dispersion being determined by an electromagnetic field profile of guided mode in the core and wavelength dependence on the refractive index of a material.

Ideally, it is desirable that there is no leakage of the optical electromagnetic profile into the second cladding, but actually, it is extremely difficult to completely prevent the leakage of the optical electromagnetic profile. Here, the term "restricting" means not only the state where the optical electromagnetic profile does not leak, but also the state that it is restricted in an allowable range that has no impact on the propagation characteristics in using the fiber, even though the optical electromagnetic profile leaks out, in other words, it is limited to the range substantially ignorable.

In the second configuration, the propagation constant in the fundamental mode for propagating through each core part of the non-identical cores is made different, assuming the refractive index of the first cladding as a parameter. In the second configuration, the propagation constant varies as to each non-identical core, assuming the refractive index of the cladding part as the parameter, among parameters on which the propagation constant depends, and further assuming the refractive index of the first cladding as the parameter, out of the first cladding and the second cladding that constitute the cladding part. In the second configuration, there are two forms for making the propagation constant different in each of the non-identical cores, assuming the refractive index of the first cladding as the parameter.

[First Configuration]

In the first configuration, a difference between the optical electromagnetic profile in the mode of propagating through the core part in each non-identical core, and the optical electromagnetic profile surrounded only by the first cladding in the core is at an ignorable level, that is, an impact exerted by the aforementioned difference on the electromagnetic field profile within the core is ignorable. The optical propagation characteristics such as the dispersion and the single mode wavelength are determined substantially by the relations between the refractive indexes of the core and the first cladding. Here, the impact at the ignorable level is associated with a range within which the electromagnetic field attenuates on the outer periphery of the first cladding to a degree that there is no influence from the refractive index of the second cladding, and the refractive index of the second cladding has no impact on the propagation characteristics in the mode propagating in the core.

In the first configuration, the boundary between the first cladding and the second cladding (the edge of the first cladding) is sufficiently apart from the core part, and irrespective of the refractive index of the second cladding, the propagation characteristics in the guided mode propagating within the core are determined by the relative refractive index difference between the core part and the first cladding, the core radius, and the refractive index profile within the core part.

The optical electromagnetic profile may be made uniform in the multiple-type non-identical cores, by rendering V-value between the core part and the first cladding and the shape of the refractive index profile within the core part, to be identical in the multiple types of non-identical cores.

In the first configuration, the V-value is a parameter referred to as a normalized frequency, and it is also referred to as V-parameter. When the relative refractive index difference between the core part and the first cladding is assumed as $\Delta$, the diameter of the core part is assumed as $2a$, the refractive index of the core part is assumed as $n_1$, and transmission wavelength is assumed as $\lambda$, the V-value is defined according to the formula:

$$V = (2\pi/\lambda) \cdot n_1 \cdot a \cdot (2\Delta)^{1/2}$$

If the shape of the refractive index profile within the core part is specifically assumed as a rectangular shape, for instance, it is possible to obtain uniform propagation characteristics such as the dispersion and the single mode wavelength, by setting the V-value to be the same.

Here, the relative refractive index difference $\Delta$ is provided by the following expression:

$$\Delta = (n_1^2 - n_2^2)/2n_1^2$$

$$\approx (n_1 - n_2)/n_1$$

It is to be noted that approximation of the formula above (weakly guiding approximation) is established, when the refractive index difference ($n_1-n_2$) is small between the refractive index $n_1$ of the core and the refractive index $n_2$ of the first cladding, as in the case of an optical fiber.

According to the aforementioned definition of V-value, the V-value becomes an identical value, under the condition that the relative refractive index difference $\Delta$, the diameter of the core part $2a$, and the refractive index $n_1$ of the core part are the same.

In addition, according to the definitional equation of the relative refractive index difference $\Delta$ as described above, the V-value may also be expressed by the formula:

$$V=(2\pi/\lambda)\cdot a\cdot(n_1{}^2-n_2{}^2)^{1/2}$$

It is possible to specify the V-value by the product of the core part diameter $2a$, and the square root of the difference between the square of the refractive index of the core part and the square of the refractive index of the first cladding.

According to the first configuration, the V-value of the core part and the first cladding is made to be identical in the non-identical cores, thereby obtaining uniform propagation characteristics such as the single mode wavelength and dispersion of each core.

In the multiple-type non-identical cores, the relative refractive index difference $\Delta$ is just one type, and it is not increased even though the number of types of the non-identical cores is raised. Therefore, this controls the range of the relative refractive index difference $\Delta$ and also mitigates the increase of difference in the propagation characteristics between each core.

[Second Configuration]

According to the second configuration, the propagation constant is made different in the non-identical cores. Variations of the propagation constant in the non-identical cores keep the imperfect coupled state between the cores, even in the state where the cores are close to each other.

According to the change of an equivalent refractive index with respect to the distance between the core part and the edge of the first cladding, it is possible to evaluate an influence on the propagation constant due to the existence of the second cladding. The change of the equivalent refractive index may be expressed by the difference between the equivalent refractive index $n_{eq}$ of the core having only a common cladding (the refractive index of the second cladding is equal to the refractive index of the first cladding), and the equivalent refractive index $n_{eq}'$ of the core in the double cladding structure of the present invention, and it is expressed as $(n_{eq}-n_{eq}')/(n_{eq}-n_2)$, for instance.

It is possible to evaluate an influence on the propagation constant due to the existence of the second cladding, according to the distance from the core part to the edge of the first cladding, the distance corresponding to the range in which the influence on the propagation constant due to the existence of the second cladding is assumed as ignorable, based on the relations with the change of the equivalent refractive index with respect to the distance between the core part and the first cladding edge, for instance.

In the second configuration in terms of the propagation constant, according to the multi-core fiber of the present invention, there are two forms for setting the refractive index of the first cladding in the non-identical cores.

[First Form of the Second Configuration]

In the first form of the second configuration, the second cladding is assumed as a common cladding in the non-identical cores, and with respect to the refractive index of this common cladding, the relative refractive index difference ($\Delta c$) with the first cladding is made different in each non-identical core. The relative refractive index difference $\Delta c$ between the first cladding and the second cladding being the common cladding as a reference are made different, thereby rendering the propagation constant to be different in the non-identical cores.

The refractive index of the first cladding may be set, to be higher than the refractive index of the second cladding, to be equal thereto, or to be lower than the refractive index of the second cladding. Thus, the relative refractive index difference $\Delta c$ may become a positive value, zero, or a negative value, in the relations between the refractive index of the first cladding and the refractive index of the second cladding.

According to the first form, the propagation constant of each non-identical core is determined by the relative refractive index difference between the core and the first cladding. On this occasion, the refractive index of the first cladding is determined based on the relative refractive index difference $\Delta c$ between the first cladding and the second cladding. Therefore, it is possible to form multiple types of non-identical cores having different propagation constants, using the refractive index of the first cladding as a parameter.

The first form is a configuration that the second cladding is assumed as the common cladding between the non-identical cores, and therefore, it is applicable to the configuration in which the refractive index of the second cladding is constant.

[Second Form of the Second Configuration]

In the second form of the second configuration, the refractive index of the first cladding is different in each non-identical core, and the refractive index of the second cladding is not necessarily common, allowing the refractive index of the second cladding to be various for each core. The refractive index of the first cladding is made different for each non-identical core, thereby obtaining the propagation constant being various in the non-identical cores. By changing also the refractive index of the second cladding, a degree of leakage of the optical electromagnetic profile into the adjacent core is restricted, thereby lowering the coupling efficiency.

According to the second form, the propagation constant of each non-identical core is determined based on the refractive index of the first cladding that is provided in each non-identical core, and therefore, it is possible to maintain a set value of the propagation constant in each non-identical core without any change, even in the case where the refractive index of the second cladding is changed for each non-identical core.

According to the second form, the propagation constant is determined based on the refractive index of the first cladding, and therefore, it is possible to restrain cross talk between the cores to a smaller value without any influence on the design to make the propagation constant different in each non-identical core, even in the case where the refractive index of the second cladding is changed for each non-identical core so as to restrict the leakage of the optical electromagnetic profile into the adjacent core.

The present invention uses non-identical cores each including a cladding part in a double cladding structure that is made up of the first cladding and the second cladding, so as to establish a high-density core. The inventors of the present invention found that in this double cladding structure, cross talk and pulse wave distortion may occur due to a cladding mode that is generated in the first cladding.

A core mode and the cladding mode of the first cladding are respectively represented by $LP_{01}$ mode and $LP_{11}$ mode, in the LP mode display according to a guided mode of linear polarization under weakly guiding approximation.

Cross talk may occur due to the following reason: The $LP_{11}$ mode of the first cladding is coupled with the $LP_{11}$ mode propagating in the first cladding that surrounds an adjacent core, and further, signals are coupled between the $LP_{11}$ mode of the first cladding belonging to the adjacent core and the $LP_{01}$ mode of the adjacent core, due to axial displacement or bending on a junction of the optical fiber, resulting in that a single-mode property of the single-mode optical fiber may fail to be maintained, because of the $LP_{11}$ mode of the first cladding.

The pulse wave distortion occurs due to the following reason: There is coupling between the $LP_{01}$ mode propagating in the core and the $LP_{11}$ mode of the first cladding, due to the axial displacement and bending at the junction of the optical fiber, and a delay difference occurs between output signals at the output end, according to various propagation constants and various group velocities.

Therefore, the multi-core fiber of the present invention is configured in such a manner that generation of $LP_{11}$ mode is restrained in the first cladding, thereby maintaining the single mode and reducing the aforementioned cross talk and pulse wave distortion.

In the configuration for restraining the $LP_{11}$ mode generation according to the present invention, as for a difference between the refractive index $n_2$ of the first cladding and the refractive index $n_2$ of the second cladding, a limit value of the refractive index difference $\Delta nc$ ($=n_2-n_3$) is increased at which the $LP_{11}$ mode occurs. Use of the refractive index $n_2$ of the first cladding and the refractive index $n_3$ of the second cladding, within the range that does not exceed the limit value of the refractive index difference $\Delta nc$, allows the single mode to be established, and thus it is possible to produce an effect such as reducing the cross talk and the pulse wave distortion as described above.

Further in the configuration for restraining the $LP_{11}$ mode generation according to the present invention, in addition to the reduction of the cross talk and pulse wave distortion by increasing the limit value of the refractive index difference $\Delta nc$ where the $LP_{11}$ mode is generated, there is another effect that an allowable production error in forming the refractive index difference of each core may be enlarged, because the limit value of the refractive index difference $\Delta nc$ is increased.

[Configuration for Restraining the $LP_{11}$ Mode Generation]

A configuration where a low refractive index portion is provided in the cladding part, so as to restrain generation of the $LP_{11}$ mode in the first cladding.

In the cladding part, the low refractive index portion may be provided in multiple ranges, and it may be any of the ranges, such as the range within the first cladding, the range straddling the first cladding and the core part, the range straddling the first cladding and the second cladding, and the range within the second cladding. In any of those ranges, at least one portion having the refractive index smaller than the refractive index of the second cladding is provided, and it is defined as the low refractive index portion. The low refractive index portion provided in the cladding part restrains the existence of the $LP_{11}$ mode being the guided mode of the first cladding.

The low refractive index portion may be configured as an air hole that is provided by setting a hole within any of the aforementioned ranges in the cladding part, and the refractive index of the air hole corresponds to the refractive index ($n_{air}=1.0$) of the air.

The number of the low refractive index portions to be provided may be one, or alternatively, more than one may be provided. In a case where more than one low refractive index portion is provided, they are located at multiple positions within the ranges in the cladding part as described above.

In a case where one low refractive index portion is provided within the range in the first cladding, the low refractive index portion is provided on one location optionally defined in the annularly-shaped first cladding that surrounds the core part. In a case where multiple low refractive index portions are provided within the range in the first cladding, the low refractive index portions are provided at multiple locations with a spacing defined at any angle in the annularly-shaped first cladding surrounding the core part.

Also in the range straddling the first cladding and the core part, the range straddling the first cladding and the second cladding, and the range in the second cladding, the low refractive index portion is provided at one location optionally defined in the annular part of any of the ranges, or at multiple locations with a spacing defined at any angle in the annular part, within any of those ranges.

(Arrangement of Non-Identical Cores in the Multi-Core Fiber)

In the arrangement of the non-identical cores in the multi-core fiber of the present invention, a core part with the lowest refractive index among the multiple types of non-identical cores is arranged in proximity to the center of the optical fiber. In the arrangement in the outer peripheral direction of the optical fiber from near the center of the optical fiber, a pair of the non-identical cores of two types are formed, and they are arranged based on a difference in the refractive index of the core part in the non-identical cores. The pair of the non-identical cores of two types being arranged is a combination of the cores whose difference in the refractive index is large, among the combinations of cores being selected based on the refractive index difference between the core parts in the multiple non-identical cores.

In arranging the non-identical cores based on the difference in the refractive index between the core parts, it is assumed that the arrangement includes a combination of pairs of the non-identical cores of two types, excluding the pair whose difference in the core-part refractive index between the non-identical cores is minimum, or a combination of pairs in which the number of pairs is made minimum, having the minimum difference in the core-part refractive index between the non-identical cores.

The arrangement of the non-identical cores as described above may reduce the influence on the coupling between cores, and even when the multi-core fiber is bent and an equivalent refractive index profile is changed, it is possible to restrain coupling with adjacent cores.

In the cores arranged at the outer periphery part in the multi-core fiber, an optical electromagnetic profile may leak into a polymer jacket on the outer side of the cladding part, and this may cause an absorption loss due to a polymer material. The lower is the refractive index of the core part, the larger is leakage of the optical electromagnetic profile from the cladding part to the polymer jacket. Therefore, a large absorption loss may occur. Accordingly, the core having the core part with the lowest refractive index among the multiple types of non-identical cores is arranged in proximity to the center of the optical fiber, and the core having the core part with a relatively higher refractive index among the multiple types of non-identical cores is arranged away from the center of the optical fiber, thereby reducing leakage of the optical electromagnetic profile from the core positioned at the outer periphery toward the polymer jacket on the outer side of the cladding part, and reducing the absorption loss.

When the multi-core fiber is bent, the refractive index profile of each non-identical core is changed equivalently, and the refractive indexes of neighboring cores may become closer to each other. Therefore, the propagation constant is also changed, having a larger impact on the inter-core coupling. In the present invention, pairs of two-types non-identical cores formed from multiple non-identical cores are placed based on a difference in the refractive index, in the arrangement from near the center of the optical fiber toward the outer periphery of the optical fiber. The arrangement using the combination having a large refractive index difference may reduce the influence on the inter-core coupling, even in the case where the multi-core fiber is bent with deforming the refractive index profile of the non-identical cores and the refractive index profiles of adjacent cores get closer to each other, since the refractive index difference between the cores is large.

In the combination of multiple cores accommodated in one optical fiber, in a case where the number of the non-identical core types is less than the number of total cores, both types of cores are accommodated for configuring the multi-core fiber; non-identical cores with different propagation constants and identical cores with the same propagation constant.

In the combination of multiple cores accommodated in one optical fiber, in a case where it is possible to prepare non-identical cores whose number of types is larger than the number of total cores, the multi-core fiber may be configured by accommodating the non-identical cores, all of which have different propagation constants.

When multiple cores are accommodated in one optical fiber, the cores may be placed using a triangular lattice arrangement or a rectangular lattice arrangement.

The triangular lattice arrangement places the cores at an equal angle and at an equal spacing on the cross section of the optical fiber, with respect to the nearest six cores being placed around.

In arranging the cores in pairs from near the center of the optical fiber toward the outer periphery of the optical fiber, when the triangular lattice arrangement is employed, the cores are arranged in the radiation direction, from near the center of the optical fiber toward the outer periphery direction of the optical fiber.

According to an aspect of the arrangement of the non-identical cores of the present invention, the core having a low refractive index is arranged at the center of the multi-core fiber, placing a long distance from the polymer jacket provided on the outermost of the multi-core fiber, thereby reducing the absorption loss caused by the polymer jacket.

According to an aspect of the arrangement of the non-identical cores of the present invention, in the inter-core coupling of the neighboring cores upon bending the multi-core fiber, the cores are arranged in such a manner as increasing the refractive index difference between the cores that are adjacent in the bending direction of the multi-core fiber, thereby restraining that the refractive indexes of the cladding become closer due to bending of the multi-core fiber, and further mitigating the increase of cross talk between the cores due to the deformation of the refractive index profile.

Effect of the Invention

As explained above, according to the present invention, in the multi-core fiber provided with multiple types of non-identical cores having different propagation constants, it is possible to reduce a difference in propagation characteristics between the non-identical cores.

In addition, when core density is increased by increasing the number of non-identical core types, expansion of a range of the gap between the relative refractive index differences $\Delta$ in the non-identical cores is controlled, thereby mitigating increase of the difference in propagation characteristics between the cores.

BRIEF DESCRIPTION OF DRAWINGS

FIG. 2 is a schematic view showing relations of the non-identical cores;

FIG. 37 illustrates a power coupling efficiency (maximum power transfer efficiency) between the non-identical cores in the case of low refractive index difference where the refractive index difference is small between the cores of the non-identical cores;

BEST MODE FOR CARRYING OUT THE INVENTION

Hereinafter, with reference to the drawings, preferred embodiments of the present invention will be explained in detail. With reference to the figures from FIG. 1 to FIG. 23, a configuration of the multi-core fiber of the present invention will be explained, and with reference to the figures from FIG. 24 to FIG. 31, a core arrangement in the multi-core fiber of the present invention will be explained. FIG. 1 to FIG. 6 and FIG. 24 to FIG. 30 are figures for explaining the configuration example that is not provided with a low refractive index portion and an arrangement example of the non-identical cores. FIG. 7 to FIG. 23, and FIG. 31 are figures for explaining a configuration example that is provided with the low refractive index portion and an arrangement example of the non-identical cores.

The multi-core fiber of the present invention has a configuration for accommodating multiple single mode cores in one optical fiber, the core incorporating a core part and a cladding part that surrounds the outer periphery of the core part, and optical transmission is performed in the single mode as a transmission mode. The cores accommodated within one optical fiber in the multi-core fiber of the present invention may include non-identical cores and identical cores.

Here, the non-identical cores indicate cores whose propagation constants are different from one another, and the identical cores indicate cores whose propagation constants are identical to one another. The multi-core fiber of the present invention is provided with multiple types of non-identical cores having different propagation constants within one optical fiber, and in those multiple non-identical cores, the cores having the same propagation constant are categorized as identical cores. The propagation constants of the non-identical cores are made various, by changing parameters, such as a relative refractive index difference between the core and the cladding, a diameter of the core, and a refractive index profile within the core.

[Configuration of the Multi-Core Fiber]

Figure 1:
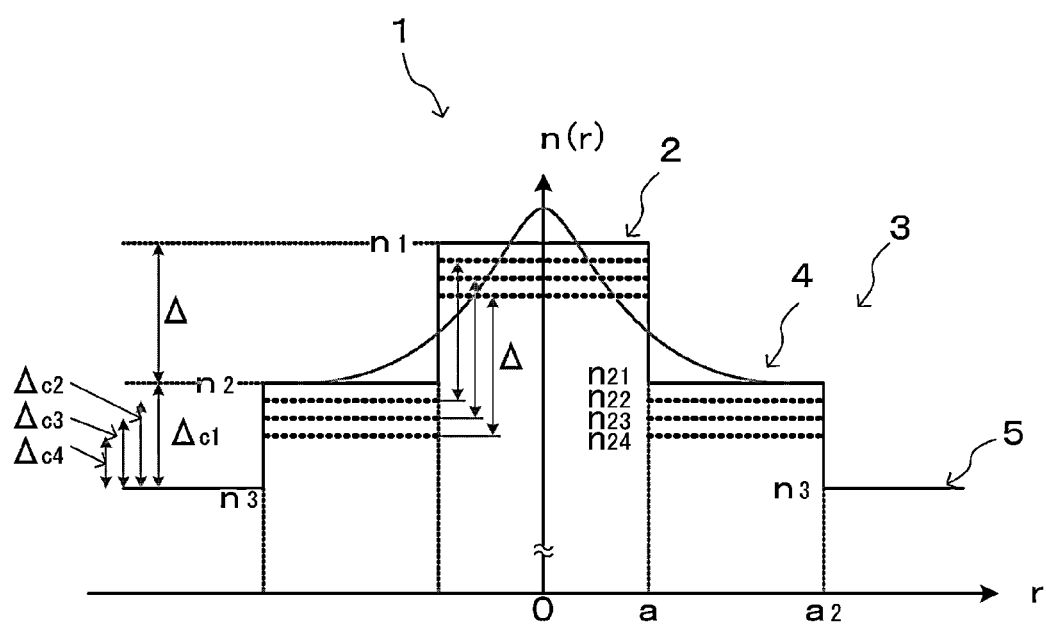
FIG. 1 illustrates one configuration example of the non-identical core provided in the multi-core fiber according to the present invention.

FIG. 1 illustrates one configuration example of the non-identical core provided in the multi-core fiber of the present invention.

The core 1 is made up of the core part 2 and the cladding part 3, and the refractive index of the core part 2 is set to be higher than the refractive index of the cladding part 3. The cladding part 3 of the present invention has a double cladding structure made up of the first cladding 4 surrounding the outer periphery of the core part 2, and the second cladding 5 on the outer side of the first cladding 4. The refractive index of the first cladding 4 is different from that of the second cladding 5, the refractive index of the first cladding 4 is set to be higher than, equal to, or lower than the refractive index of the second cladding 5. Depending on the magnitude relation of the refractive index between the first cladding and the second cladding, the relative refractive index difference $\Delta c$ becomes a positive value, zero, or a negative value.

In the following, one example will be explained, when the refractive index of the first cladding 4 is higher than the refractive index of the second cladding 5, in any case.

The double cladding structure is based on a level difference between the refractive index of the first cladding 4 and the refractive index of the second cladding 5.

According to the configuration of the core 1 of the present invention, light is confined within the core by the refractive index difference between the core part 2 and the first cladding 4. The curve in FIG. 1 indicates an optical electromagnetic field profile in the core. The optical electromagnetic profile of the light attenuates from the core part 2 toward the outer periphery of the first cladding 4, and it is distributed substantially within the range from the core part 2 to the first cladding 4, being zero on the boundary between the first cladding 4 and the second cladding 5, not leaking out in the second cladding 5.

If the intensity of the optical electromagnetic profile at the edge of the first cladding 4 is sufficiently small, there is no influence on the propagation constant of the core, even when the refractive index of the second cladding 5 fluctuates.

Here, an explanation will be provided as to a configuration example where the cross-section of the first cladding has an annular shape. It is to be noted that the cross-section shape of the first cladding may not be limited to the annular shape, but it may be a different configuration such as a triangular shape, a hexagonal shape, and a combination of various polygonal shapes.

In FIG. 1, it is assumed that the core part 2 has the radius a, the radius on the outer side of the annular part of the first cladding 4 is $a_2$, the refractive index of core part 2 is $n_1$, the refractive index of the first cladding 4 is $n_2$, and the refractive index of the second cladding 5 is $n_3$.

The intensity of the optical electromagnetic profile in the lowest-order mode attenuates toward the outer periphery of the first cladding 4, assuming the center of the core part 2 as a peak. In a case where the intensity of the optical electromagnetic profile attenuates sufficiently at the outer peripheral edge $a_2$ of the first cladding 4, influence on the optical electromagnetic profile due to fluctuations of the refractive index $n_3$ of the second cladding 5 may fall into an allowable range, indicating that the fluctuations are ignorable in the variations of the propagation constant.

As for the multiple types of non-identical cores of the present invention, the propagation constant of the fundamental mode that propagates in each core part is made different, thereby constituting the multiple types of non-identical cores. In the core part and the first cladding of the double cladding structure, propagation characteristics are made uniform in each core part of the non-identical cores, according to a first configuration, and the propagation constant is made different in each of the non-identical cores, according to a second configuration.

In the first configuration, the optical electromagnetic profile is confined in the range of each of the core part and the first cladding, and its leakage to the second cladding is restricted, thereby rendering the propagation characteristics uniform in each core part. The propagation characteristics may include, for example, a dispersion determined by the electromagnetic field profile in the core guided mode) and the wavelength dependence of the refractive index of a material, and a single mode wavelength.

In the first configuration, the relative refractive index difference ($\Delta$) between the core part 2 and the first cladding 4 is made identical in multiple types of non-identical cores. The first configuration where the relative refractive index difference ($\Delta$) is identical allows the propagation characteristics, such as the dispersion in the core and the single mode wavelength, to be uniform in the multiple types of non-identical cores.

In the second configuration, the refractive index of the first cladding is assumed as a parameter, and the propagation constant of the fundamental mode propagating in each core part of the non-identical cores is made different. In the second configuration, among the parameters that the propagation constant is dependent on, the refractive index of the cladding part is assumed as a parameter, and the refractive index of the first cladding is further assumed as a parameter, out of the first cladding and the second cladding constituting the cladding part, thereby making the propagation constant different in the non-identical cores. In the second configuration, the refractive index of the first cladding is assumed as a parameter using two forms, to render the propagation constant to be different in the non-identical cores.

There are two forms in the second configuration; the first form and the second form, depending on an aspect how to specify the refractive index of the first cladding.

FIG. 2 is a schematic view showing relations of the non-identical cores, illustrating three types of non-identical cores 11, 12, and 13.

For the non-identical core 11, the refractive index of the core part is assumed as $n_{11}$, and the refractive index of the first cladding is assumed as $n_{21}$. For the non-identical core 12, the refractive index of the core part is assumed as $n_{12}$, and refractive index of the first cladding is assumed as $n_{22}$. For the non-identical core 13, the refractive index of the core part is assumed as $n_{13}$, and the refractive index of the first cladding is assumed as $n_{23}$ (FIG. 2A).

(The First Form of the Second Configuration)

In the first form of the second configuration, the second cladding 5 is assumed as a common cladding in each of the non-identical cores, in the multiple types of non-identical cores, and with respect to the refractive index of this common cladding, the relative refractive index difference ($\Delta c$) with the first cladding 4 is made different for each non-identical core. The common cladding may be assumed as $SiO_2$, for instance.

FIG. 1 illustrates the form in which the refractive index $n_3$ is assumed as the reference refractive index, setting the second cladding 5 as the common cladding, and the relative refractive index difference ($\Delta c$) with the refractive index $n_2$ of the first cladding 4 is made different in each of the non-identical cores. FIG. 1 illustrates the relative refractive index difference ($\Delta c1$) between the first cladding 4 where the refractive index is $n_{21}$ and the second cladding 5, the relative refractive index difference ($\Delta c2$) between the first cladding 4 where the refractive index is $n_{22}$ and the second cladding 5, and the relative refractive index difference ($\Delta c3$) between the first cladding 4 where the refractive index is $n_{23}$ and the second cladding 5. In FIG. 1, the relative refractive index differences ($\Delta c1$) to ($\Delta c4$) as shown on the left side of the core part 2 represent the state that the refractive indexes of the first cladding are specified in the first form.

FIG. 2B illustrates the first form of the second configuration. FIG. 2B illustrates a configuration example where the second cladding 5 is assumed as the common cladding, and according to the relative refractive index difference ($\Delta c$) between the refractive index $n_3$ of the common cladding, and the refractive indexes $n_{21}$, $n_{22}$, and $n_{23}$ of the first cladding 4, the propagation constant of each non-identical core is made different. The relative refractive index difference ($\Delta c1$) between the first cladding and the refractive index $n_3$ of the common cladding in the non-identical core 11 is represented by $(n_{21}^2 - n_3^2)/2n_{21}^2$, the relative refractive index difference ($\Delta c2$) between the first cladding and the refractive index $n_3$ of the common cladding in the non-identical core 12 is represented by $(n_{22}^2 - n_3^2)/2n_{22}^2$, and the relative refractive index difference ($\Delta c3$) between the first cladding and the refractive index $n_3$ of the common cladding in the non-identical core 13 is represented by $(n_{23}^2 - n_3^2)/2n_{23}^2$. In response to each relative refractive index difference ($\Delta c$), the propagation constant of each non-identical core is made different.

On this occasion, the relative refractive index difference $\Delta$ is constant, which is determined by the refractive index of core part 2 and the refractive index of the first cladding 4, and the refractive index of the core part 2 also changes as indicated by $n_{11}$ and $n_{12}$, in response to the change of the refractive index $n_2$ of the first cladding 4. The first form is a configuration which is applicable when the refractive index of the second cladding 5 is common.

(Second Form of the Second Configuration)

In the second form of the second configuration, the refractive index of the first cladding in the multiple types of non-identical cores is made different, and the refractive index of the second cladding is not common. In FIG. 1, the refractive index $n_2$ of the first cladding 4 is made different for each type of non-identical cores, and the refractive index $n_3$ of the second cladding is also made different for each type of non-identical cores. FIG. 2C illustrates the case where the refractive indexes of the first cladding 4 are $n_{21}$, $n_{22}$, and $n_{23}$, and the refractive indexes of the second cladding 5 are $n_3$, $n_{3a}$, and $n_{2b}$.

In this configuration example, each refractive index difference is determined with reference to an arbitrary defined refractive index in the first cladding. According to the second configuration, it is possible to form a difference in the propagation constant of each non-identical core, and even in the case where the refractive index of the second cladding is changed for each non-identical core in order to restrict the leakage of the optical electromagnetic profile to an adjacent core, coupling with the adjacent core is restrained.

FIG. 2C illustrates a configuration example where the refractive indexes $n_{21}$, $n_{22}$, and $n_{23}$ of the first cladding 4 are made different, and also the refractive indexes of the second cladding 5 are also made different as $n_3$, $n_{3a}$, and $n_{3b}$, thereby obtaining the propagation constant being different for each non-identical core. By way of example, the relations of $n_{21} > n_{22} > n_{23}$ are provided among the refractive indexes of the first cladding 4, thereby changing the propagation constant for each non-identical core and rendering the cores to be the state of uncoupled.

It is to be noted that since the relative refractive index difference $\Delta$ of the optical fiber is small, changing the relative refractive index difference $\Delta c$ of the second cladding to $\Delta c1$, $\Delta c2$, and $\Delta c3$, is substantially equivalent to changing the refractive index $n_2$ of the first cladding to $n_{21}$, $n_{22}$, and $n_{23}$, as far as the refractive index $n_3$ of the second cladding is common.

In the figures from FIG. 2B to FIG. 2C, the relative refractive index difference ($\Delta$) between the core part 2 and the first cladding 4 is identical to one another, since it corresponds to $(n_{11}^2 - n_{21}^2)/2n_{11}^2 = (n_{12}^2 - n_{22}^2)/2n_{12}^2 = (n_{13}^2 - n_{23}^2)/2n_{13}^2$ in each figure. By setting the relative refractive index difference ($\Delta$) to be identical, it is possible to obtain uniform propagation characteristics across the non-identical cores, such as the dispersion and the single mode wavelength.

FIG. 2B illustrates a configuration example where the second cladding is assumed as the common cladding. In the configuration being provided with the common cladding, the common cladding is not limited to the second cladding, but other cladding may be provided as the common cladding. FIG. 3 illustrates a configuration example where there is provided a common cladding that is not the second cladding.

Figure 3A:
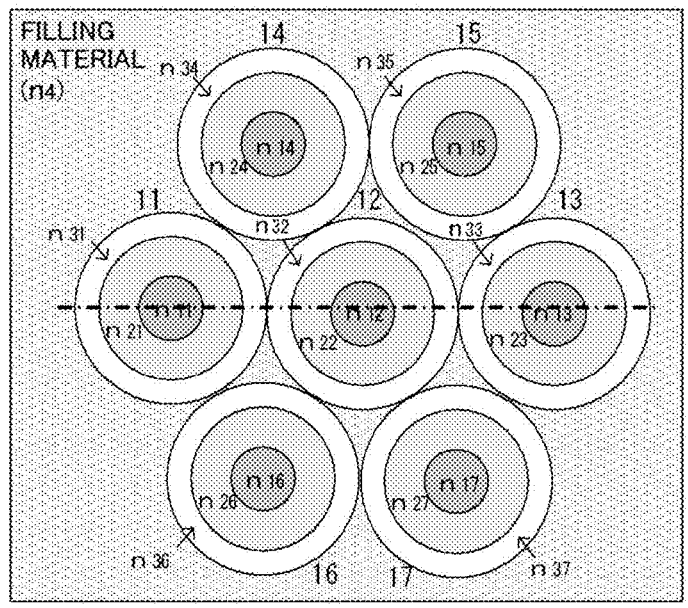
FIG. 3 is a schematic view showing relations of the non-identical cores when a common cladding (filling material) is provided in addition to the second cladding.
Figure 3B:
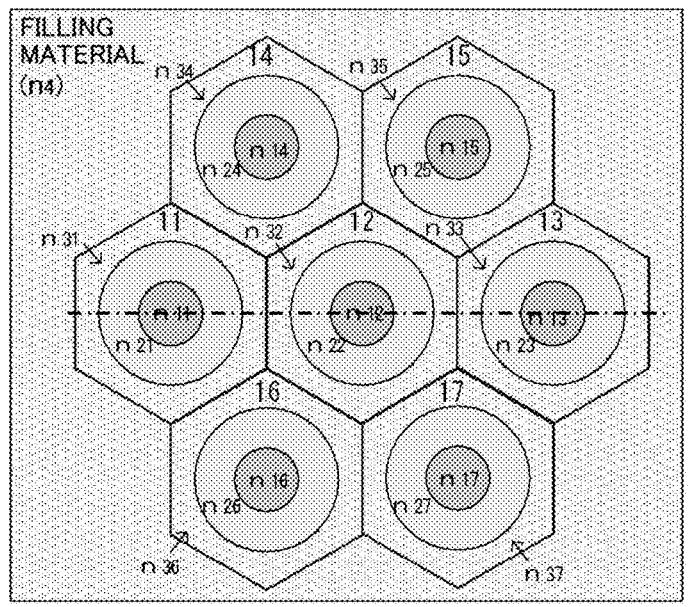
Figure 3C:
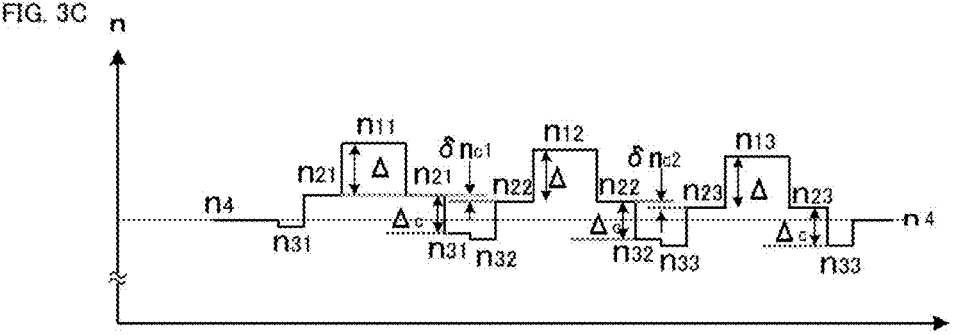

FIG. 3 illustrates a configuration example to reduce coupling (cross talk) between adjacent cores, by decreasing the optical electromagnetic profile that leaks to an adjacent core, in addition to the configuration which increases the difference in propagation constant. In this configuration example, the second cladding is not assumed as the common cladding, but a common cladding ($n_4$) is provided separately, and a region of the second cladding is provided in such a manner that the neighboring cores are brought into contact with each other. FIG. 3 illustrates the case where a filling material is used as the common cladding. With this configuration, as shown in FIG. 3C, it is possible to obtain an identical relative refractive index difference $\Delta c$ in all the non-identical cores. Addition of this configuration may enhance an effect for suppressing the coupling between the adjacent cores.

FIG. 3A illustrates an example where the cross-section shape of the second cladding has an annular shape, and FIG. 3B illustrates an example where the cross-section shape of the second cladding has a honeycomb-like hexagonal configuration.

Figures 4A, 4B:
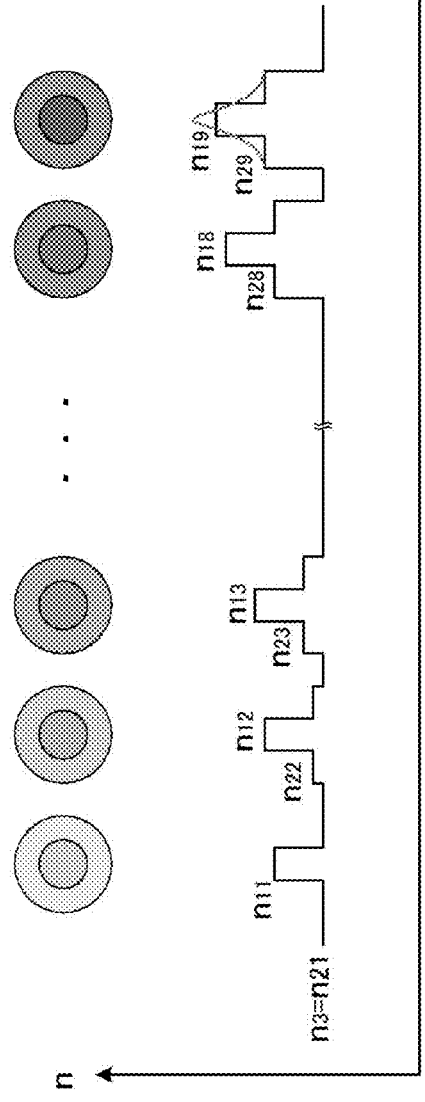
FIG. 4 illustrates one example of nine types of non-identical cores.

FIG. 4 illustrates one example of nine types of non-identical cores. FIG. 4A illustrates an example where the refractive index of each core part 2, from the non-identical core 11 to the non-identical core 19, is increased sequentially from $n_{11}$ to $n_{19}$, and the refractive index of each first cladding 4 is increased sequentially from $n_{21}$ to $n_{29}$. Here, it is to be noted that FIG. 4 illustrates an example where the refractive index $n_{21}$ of the first cladding in the non-identical core 11 is identical to the refractive index $n_3$ of the common cladding in the multi-core fiber.

The table shown in FIG. 4B indicates an example of numerical values indicating the refractive indexes $n_{11}$ to $n_{19}$ of the core parts, and numerical values of the refractive indexes $n_{21}$ to $n_{29}$ of the first cladding, respectively of the non-identical core 11 to the non-identical core 19.

(Properties of the Double Cladding Structure)

Hereinafter, properties of the double cladding structure according to the present invention will be explained. Firstly, with reference to FIG. 5, an explanation will be provided as to the influence on the propagation constant according to the double cladding structure.

Figure 5:
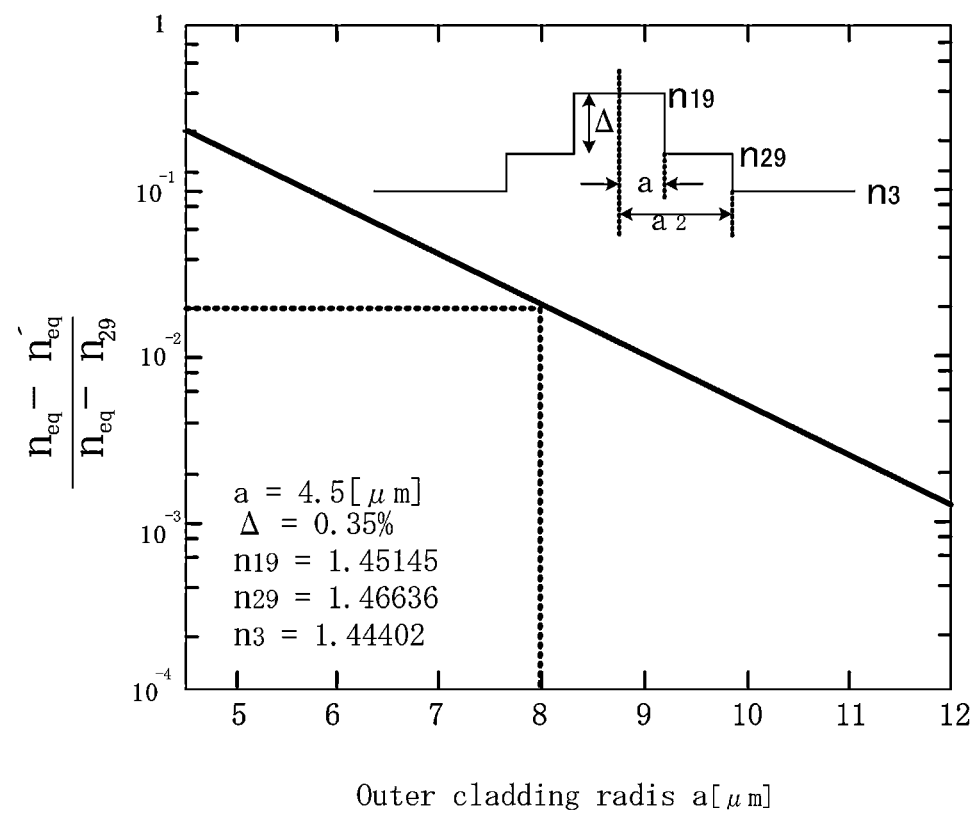
FIG. 5 illustrates relations between the change of the equivalent refractive index that changes depending on whether or not the second cladding exists, and the outer cladding radius of the first cladding.

FIG. 5 illustrates that in double cladding structure of the present invention, a ratio is obtained by normalizing the difference ($n_{eq} - n_{eq}'$) between the equivalent refractive index ($n_{eq}$) when the second cladding does not exist (the refractive index of the second cladding is equal to the refractive index of the first cladding) and the equivalent refractive index ($n_{eq}'$) when the second cladding exists, relative to the difference ($n_{eq} - n_{29}$) between the equivalent refractive index ($n_{eq}$) when the second cladding does not exist and the refractive index of the first cladding. Then, variations of the obtained ratio with respect to the outer cladding radius of the first cladding are shown in the figure.

The propagation constant in the fundamental mode in the single mode core allows evaluation of a ratio how much the optical electromagnetic profile is confined within the core, and the like, according to the comparison between the refractive index $n_1$ of the core part and the refractive index $n_2$ of the cladding part by using the equivalent refractive index. The equivalent refractive index $n_{eq}$ is defined as $n_{eq} = \beta/k_0$, as a ratio of the propagation constant $\beta$ in the guided mode, to the propagation constant $k_0$ of a plane wave in vacuum.

The confinement ratio of the optical electromagnetic field into the core is expressed approximately by ($n_{eq}$(equivalent refractive index)$-n$(cladding))/($n$(core)$-n$(cladding)). In view of this relationship, the influence on the propagation constant due to the existence of the second cladding may be represented by a difference between the equivalent refractive index $n_{eq}$ of the cladding having only the common cladding (the refractive index of the second cladding is equal to the refractive index of the first cladding part), and the equivalent refractive index $n_{eq}'$ of the core in the double cladding structure of the present invention. For example, it may be expressed by ($n_{eq} - n_{eq}'$)/($n_{eq} - n$(first cladding)).

Since the non-identical core whose propagation constant is the most vulnerable is a non-identical core in which a difference between the refractive index of the first cladding and the refractive index of the second cladding is large, the ratio of the aforementioned equivalent refractive index difference to the difference between the equivalent refractive index and the refractive index of the first cladding is expressed by ($n_{eq} - n'_{eq}$)/($n_{eq} - n_{29}$)).

By using the ratio of the difference of the equivalent refractive index to the difference between the equivalent refractive index and the refractive index of the first cladding, the influence on the propagation constant due to the existence of the second cladding may be evaluated. FIG. 5 illustrates, for example, the relations between the ratio of the equivalent refractive index difference, and the outer cladding radius $a_2$ of the first cladding.

It is possible to evaluate a distance up to the edge of the first cladding, at which the influence on the propagation constant due to the existence of the second cladding is ignorable, on the basis of the relations with the ratio of the equivalent refractive index difference to the distance between the core part and the edge of the first cladding, as shown in FIG. 5.

The example as shown in FIG. 5 illustrates the case where the refractive index difference is low, and it is assumed that the radius a of the core=4.5 µm, the relative refractive index difference $\Delta$=0.35%, the refractive index of the core part $n_{19}$=1.45145, the refractive index of the first cladding $n_{29}$=1.44636, and the refractive index of the second cladding $n_3$=1.44402.

FIG. 5 illustrates that the influence of the second cladding is 2% (=$2\times10^{-2}$), for instance, when the outer cladding radius $a_2$ of the first cladding is 8 µm.

Therefore, the outer cladding radius of the first cladding in each non-identical core is set to be at least 8 µm, thereby restraining variations of the propagation constant to 2% at the maximum, in the case where the variations are caused by employing the double cladding structure.

Figure 6:
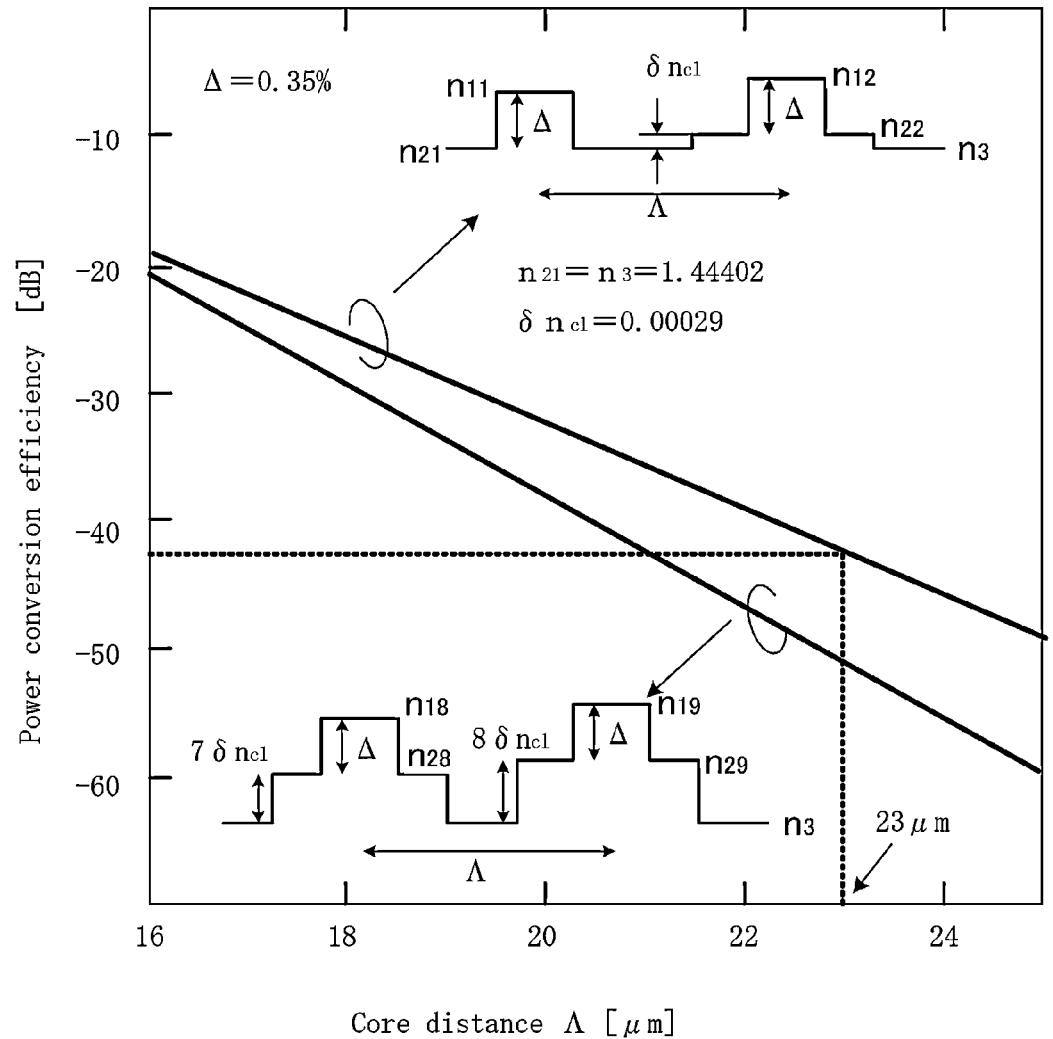
FIG. 6 illustrates the power coupling efficiency with respect to core center interval $\Lambda$ of the non-identical cores.

Next, with reference to FIG. 6, an explanation will be provided as to the influence of a difference between the refractive index of the first cladding and the refractive index of the common cladding, on the cross talk according to the double cladding structure. FIG. 6 illustrates the power coupling efficiency (maximum power transfer efficiency), relative to the core center interval $\Lambda$ of the non-identical cores. The power coupling efficiency indicates a cross talk between the non-identical cores. FIG. 6 illustrates the case of the refractive index $n_{28}$ and the refractive index $n_{29}$, as an example where the refractive index of the first cladding in the neighboring non-identical cores is high, in terms of the power coupling efficiency between the multiple types of non-identical cores, and also illustrates the case of the refractive index $n_{21}$ and the refractive index $n_{22}$, as an example where the refractive index of the first cladding in the neighboring non-identical cores is low. FIG. 6 shows characteristics indicating that the smaller is the difference between the refractive index of the first cladding and the refractive index of the common cladding, the higher is the power coupling efficiency and the larger is the cross talk.

Here, a comparison is made between the cross talk in the double cladding structure, and the cross talk according to conventional non-identical cores.

In the example as shown in FIG. 6, comparisons are made as to an arrangement example of seven cores using three types of non-identical cores similar to the example as shown in FIG. 37C where the adjacent core center interval $\Lambda$ is set to be 40 µm, in the case of low refractive index difference $\Delta$=0.35% (a=4.5 µm). As a difference $\delta n_{c1}$=0.00029 is set between the non-identical cores including the first cladding and the core that provide the equivalent refractive index difference corresponding to $\Delta$=0.325%, 0.350%, or 0.375%, assuming three types of cores. Here, when the refractive index is assumed as $n_{21}$=$n_3$=1.44402, according to the characteristic curve for the case of $\delta n_{c1}$, if the distance $\Lambda$ between the neighboring cores is equal to or longer than 23 µm, it is possible to set the power coupling efficiency to be −40 dB or less. The distance $\Lambda$ between the neighboring cores in the arrangement example of seven cores as shown in FIG. 37 is 40 µm, whereas in the double cladding structure example, the distance $\Lambda$ between the adjacent cores may be set to 23 µm. Therefore, the double cladding structure is able to reduce the distance $\Lambda$ between the adjacent cores.

(Configuration Example Provided with the Low Refractive Index Portion)

Next, with reference to FIG. 7 to FIG. 23, an explanation will be provided as to the configuration where the cladding part is provided with a low refractive index portion.

FIG. 7 illustrates a configuration where the cladding part is provided with the low refractive index portion, indicating the refractive index n in the direction of the core diameter r, similar to the aforementioned configuration as shown in FIG. 1, and showing an example of the low refractive index portion in the cladding part.

Figure 7B:
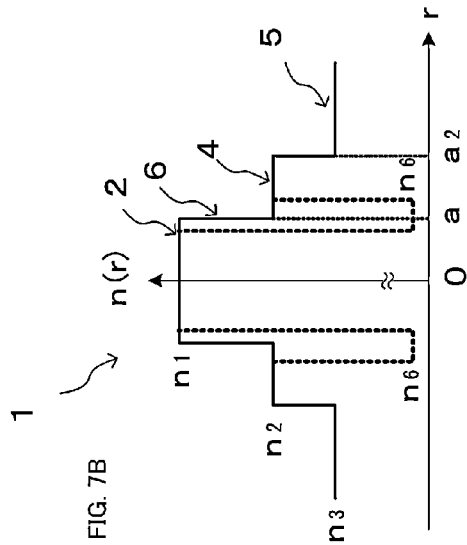
FIG. 7 illustrates a configuration of a cladding part provided with a low refractive index portion.
Figure 7D:
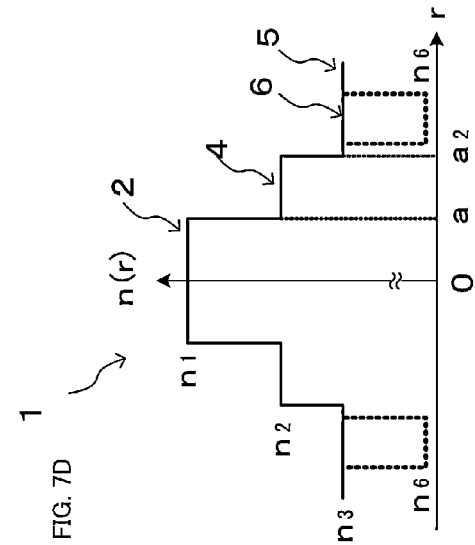
Figure 7A:
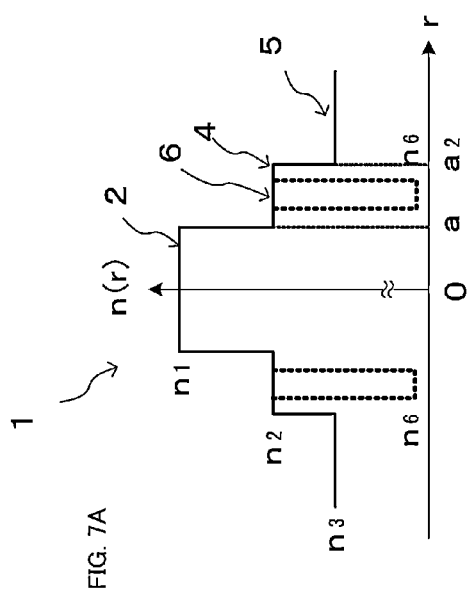
Figure 7C:
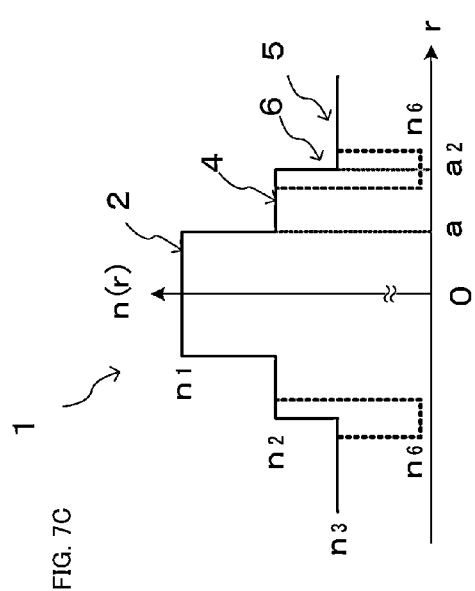

Here, as a range of the cladding part to be provided with the low refractive index portion 6, FIG. 7A illustrates an example of the range within the first cladding, FIG. 7B illustrates an example of the range straddling the first cladding and the core part, FIG. 7C illustrates an example of the range straddling the first cladding and the second cladding, and FIG. 7D illustrates an example of the range within the second cladding.

At least one part is provided as the low refractive index portion 6 within the range as described above, the part having the refractive index $n_6$ that is smaller than the refractive index $n_3$ of the second cladding 5. Providing the cladding part 3 with the low refractive index portion 6 may restrain the existence of $LP_{11}$ mode being the guided mode of the first cladding 4.

FIG. 7A illustrates a configuration for providing the low refractive index portion 6 within the range of the first cladding 4, and the refractive index $n_2$ of the part where the low refractive index portion 6 is not provided is indicated by a solid line, within the range of the first cladding 4. FIG. 7B illustrates a configuration for providing the low refractive index portion 6 within the range straddling the first cladding 4 and the core part 2, and the refractive indexes $n_2$ and $n_3$ of the part where the low refractive index portion 6 is provided are indicated by broken lines, and the refractive index $n_3$ of the part where the low refractive index portion 6 is not provided are indicated by solid lines, within the range straddling the first cladding 4 and the core part 2. FIG. 7C illustrates a configuration for providing the low refractive index portion 6 within the range straddling the first cladding 4 and the second cladding 5, and the refractive indexes $n_1$ and $n_2$ of the part where the low refractive index portion 6 is provided are indicated by broken lines, and the refractive indexes $n_2$ and $n_3$ of the part where the low refractive index portion 6 is not provided are indicated by solid lines, within the range straddling the first cladding 4 and the second cladding 5. FIG. 7D illustrates a configuration for providing the low refractive index portion 6 within the range of the second cladding 5, and the refractive indexes $n_1$ and $n_2$ of the part where the low refractive index portion 6 is provided are indicated by broken lines, and the refractive index $n_3$ of the part where the low refractive index portion 6 is not provided is indicated by the solid line, within the range of the second cladding 5.

Figure 8:
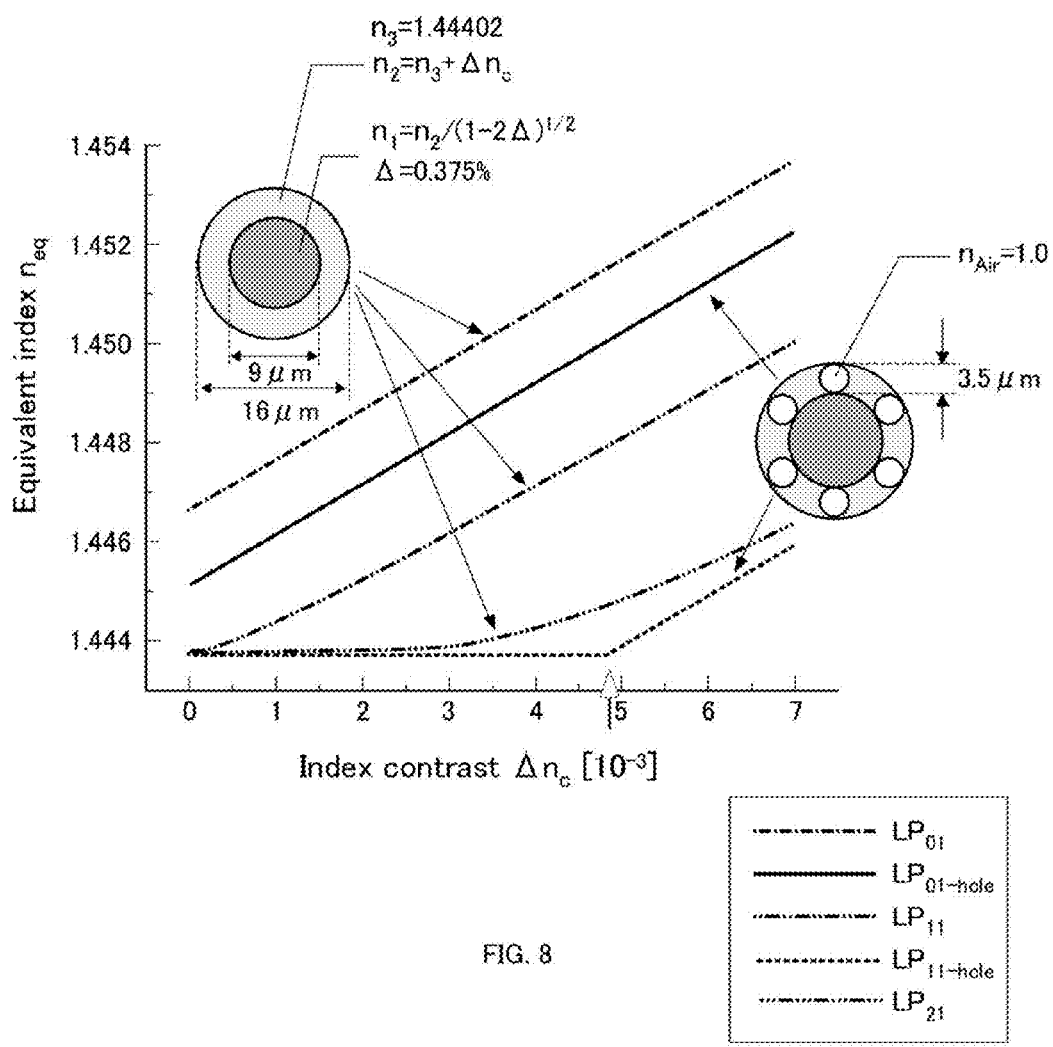
FIG. 8 illustrates a dependence property of the equivalent refractive index of each mode in one core configuring the multi-core fiber, on the refractive index difference $\Delta nc$ ($=n_2-n_3$) between the first cladding and the second cladding.

FIG. 8 illustrates a dependence property of the equivalent refractive index in each mode in one core constituting a multi-core fiber, on the refractive index contrast $\Delta nc$ (=$n_2$−$n_3$) between the first cladding and the second cladding, indicating the $\Delta nc$ dependence property of the core configuration when the low refractive index portion is provided, and the $\Delta nc$ dependence property when the low refractive index portion is not provided. The dependence property of the equivalent refractive index in each mode, on the refractive index contrast $\Delta nc$ between the first cladding and the second cladding as shown in FIG. 8 indicates variations of the propagation constant by the change of the equivalent refractive index $n_{eq}$ with respect to the refractive index contrast $\Delta nc$ between the first cladding and the second cladding. Here, the range of the equivalent refractive index $n_{eq}$ corresponds to the range of the refractive index of the cladding part and the core part, and the minimum value of the equivalent refractive index $n_{eq}$ corresponds to the refractive index $n_3$ of the second cladding 5.

FIG. 8 illustrates the $\Delta nc$ dependence property of the equivalent refractive index in the core configuration that does not have the low refractive index portion, in terms of $LP_{01}$ mode of the core part being the lowest order mode, and $LP_{11}$ mode and $LP_{21}$ mode of the first cladding being the next higher order mode. In addition, the $\Delta nc$ dependence property of the equivalent refractive index in the core configuration that has the refractive index part is also illustrated, in terms of $LP_{01\text{-}hole}$ mode of the core mode being the lowest order mode and $LP_{11\text{-}hole}$ mode of the first cladding being the next higher order mode.

In the example as shown in FIG. 8, the diameter of the core part is assumed as 9 μm, the diameter of the first cladding is assumed as 16 μm, the refractive index of the second cladding $n_3$ is assumed as 1.44402, the relative refractive index difference $\Delta$ between the core and the first cladding is assumed as 0.375%, the diameter of the air hole is assumed as 3.5 μm, and the air hole is assumed as existing in the range within the first cladding. The air hole constitutes the low refractive index portion, and the refractive index of this part corresponds to the refractive index (1.0) of the air.

The low refractive index portion may be formed by the air hole, or alternatively, it may be formed by using a member having the refractive index smaller than that of the second cladding.

As for the dependence property of the equivalent refractive index in each mode on the refractive index contrast $\Delta nc$ between the first cladding and the second cladding, when the equivalent refractive index $n_{eq}$ is in the range exceeding the refractive index $n_3$ of the second cladding 5, it is in the guided mode, and when the equivalent refractive index $n_{eq}$ is equal to or less than the refractive index $n_3$ of the second cladding 5, it is in the cutoff state, and it is not in the guided mode.

Upon focusing attention on the $LP_{11}$ mode and the $LP_{11\text{-}hole}$ mode of the first cladding having the core configuration with the low refractive index portion, in the range where the refractive index contrast $\Delta nc$ is smaller than the cutoff value, the equivalent refractive index $n_{eq}$ in the $LP_{11}$ mode and in the $LP_{11\text{-}hole}$ mode is equal to or less than the refractive index $n_3$ of the second cladding 5, and it is not in the guided mode. On the other hand, if the refractive index contrast $\Delta nc$ exceeds the cutoff value, the equivalent refractive index $n_{eq}$ in the $LP_{11}$ mode and the $LP_{11\text{-}hole}$ mode exceeds the refractive index $n_3$ of the second cladding 5 and becomes the guided mode (guided mode).

In FIG. 8, the cutoff value of the $LP_{11}$ mode refractive index contrast $\Delta nc$ of the first cladding in the core configuration that does not have the low refractive index portion is approximately $3 \times 10^{-4}$. On the other hand, the cutoff value of the $LP_{11\text{-}hole}$ mode refractive index contrast $\Delta nc$ of the first cladding in the core configuration that has the low refractive index portion is approximately $5 \times 10^{-3}$.

Therefore, with the core configuration having the low refractive index portion, a limit value of the refractive index contrast $\Delta nc$ for forming the $LP_{11}$ mode in the first cladding is enlarged, and by using the refractive index contrast $\Delta nc$ within the range of the limit value, it is possible to restrain the $LP_{11}$ mode of the first cladding.

In the case where the $LP_{11}$ mode exists in the first cladding, axis displacement or axis bending at a connection point of the optical fiber may allow the signals to be coupled between the $LP_{11}$ mode of the first cladding and the $LP_{01}$ mode of the core, thereby generating cross talk and failing to maintain a single mode property of the single-mode optical fiber.

If coupling occurs between the $LP_{01}$ mode propagating in the core and the $LP_{11}$ mode of the first cladding $LP_{11}$ mode, a delay difference occurs between the output signals at the output end, according to the different propagation constants and different group velocities, resulting in that the pulse width is expanded.

Figure 9:
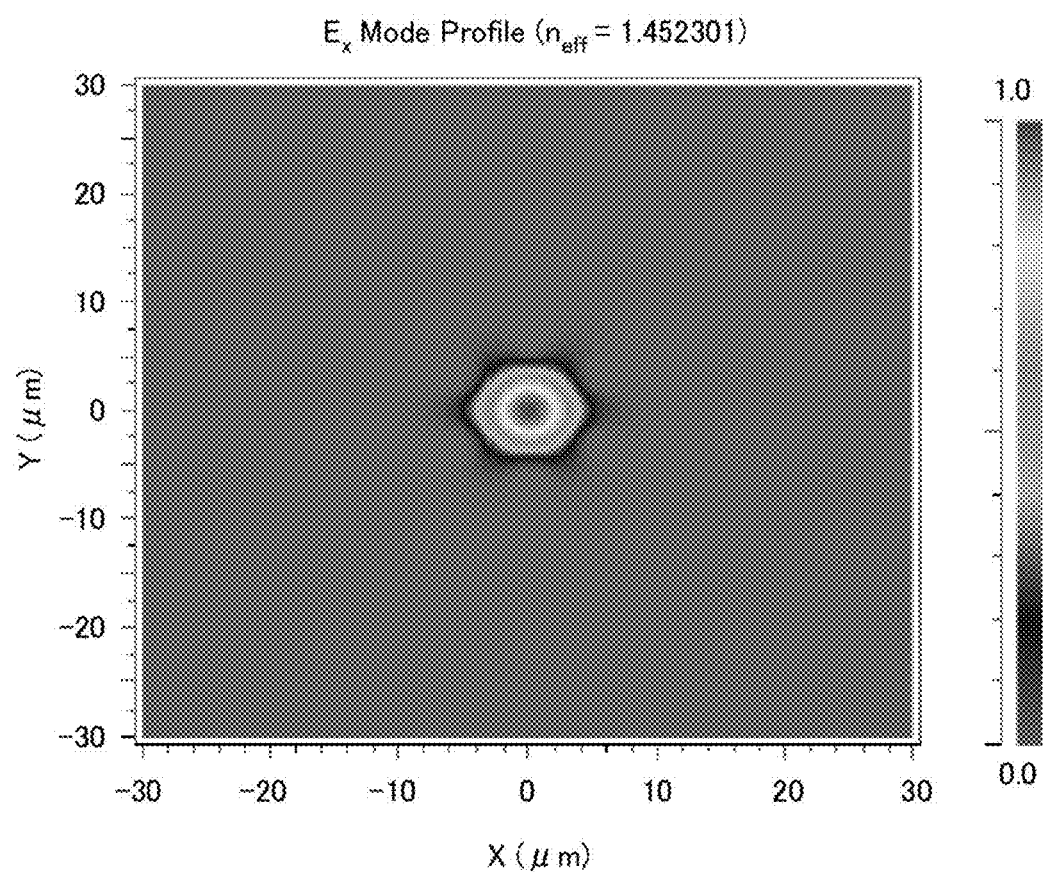
FIG. 9 illustrates the electric-field amplitude profile of $LP_{01}$ mode.
Figure 10:
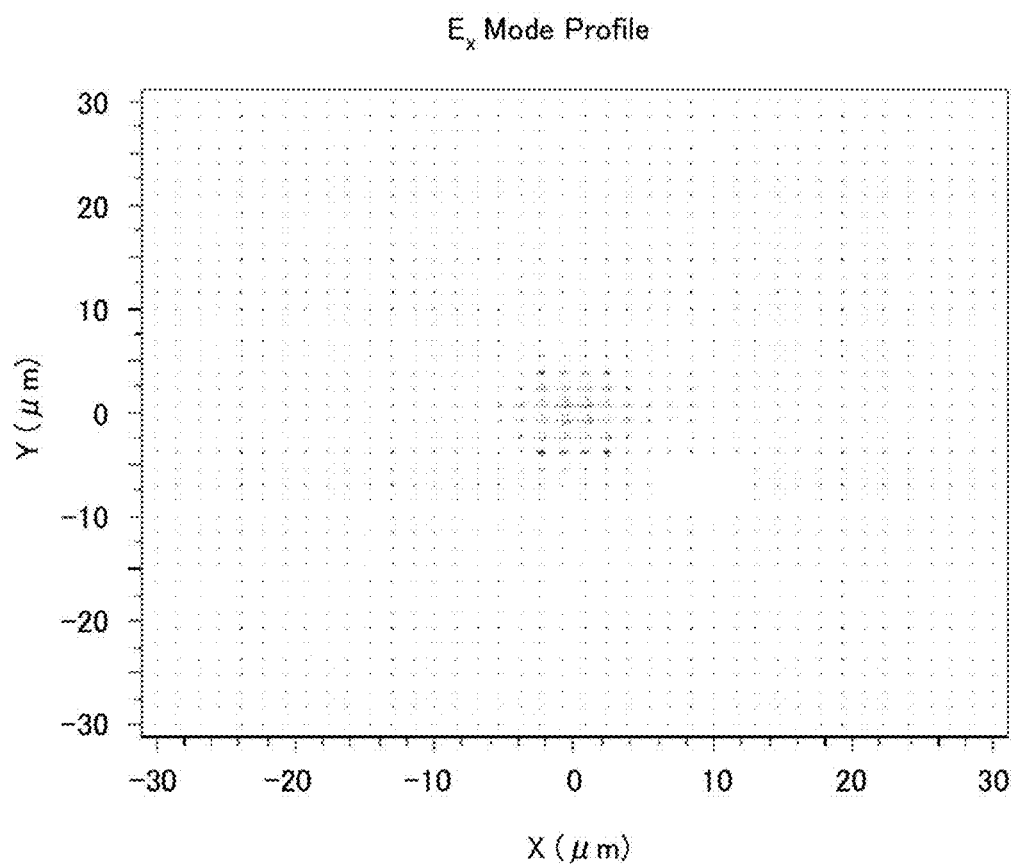
FIG. 10 illustrates a level of electric-field vector of $LP_{01}$ mode.
Figure 11:
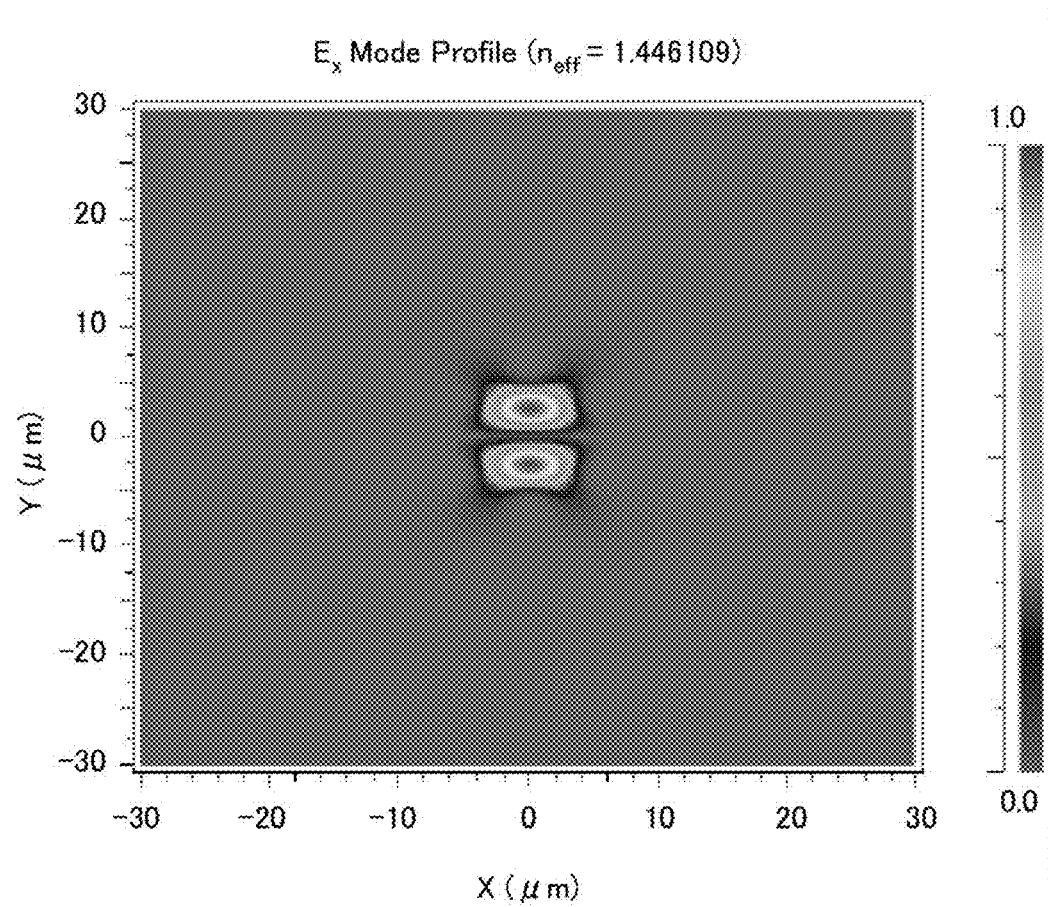
FIG. 11 illustrates an electric-field amplitude profile of $LP_{11}$ (even) mode.
Figure 12:
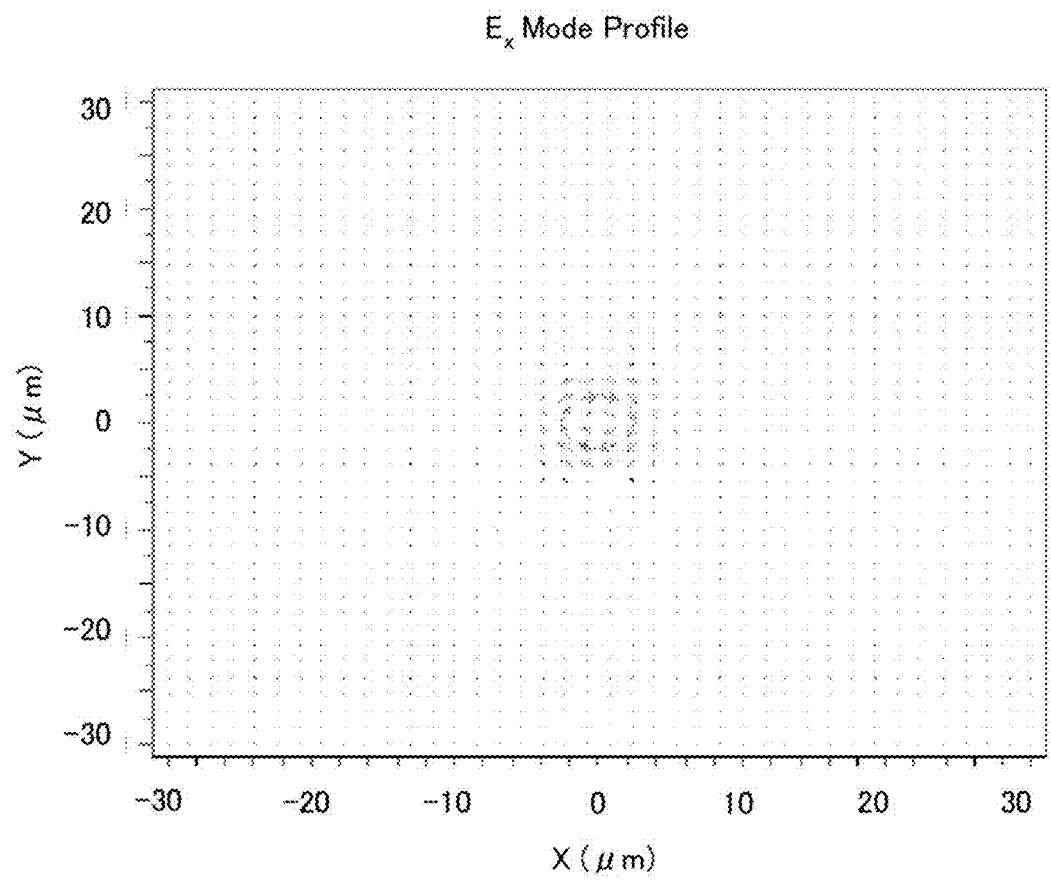
FIG. 12 illustrates a level of electric-field vector of $LP_{11}$ (even) mode.
Figure 13:
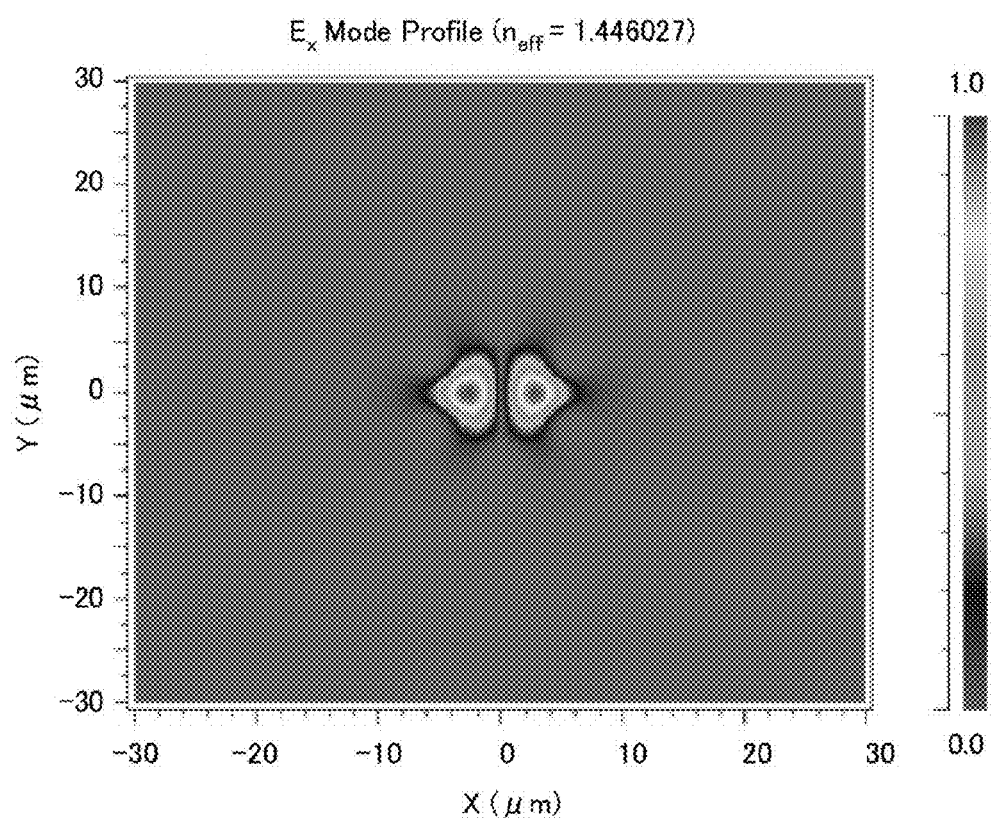
FIG. 13 illustrates an electric-field amplitude profile of $LP_{11}$ (odd) mode.
Figure 14:
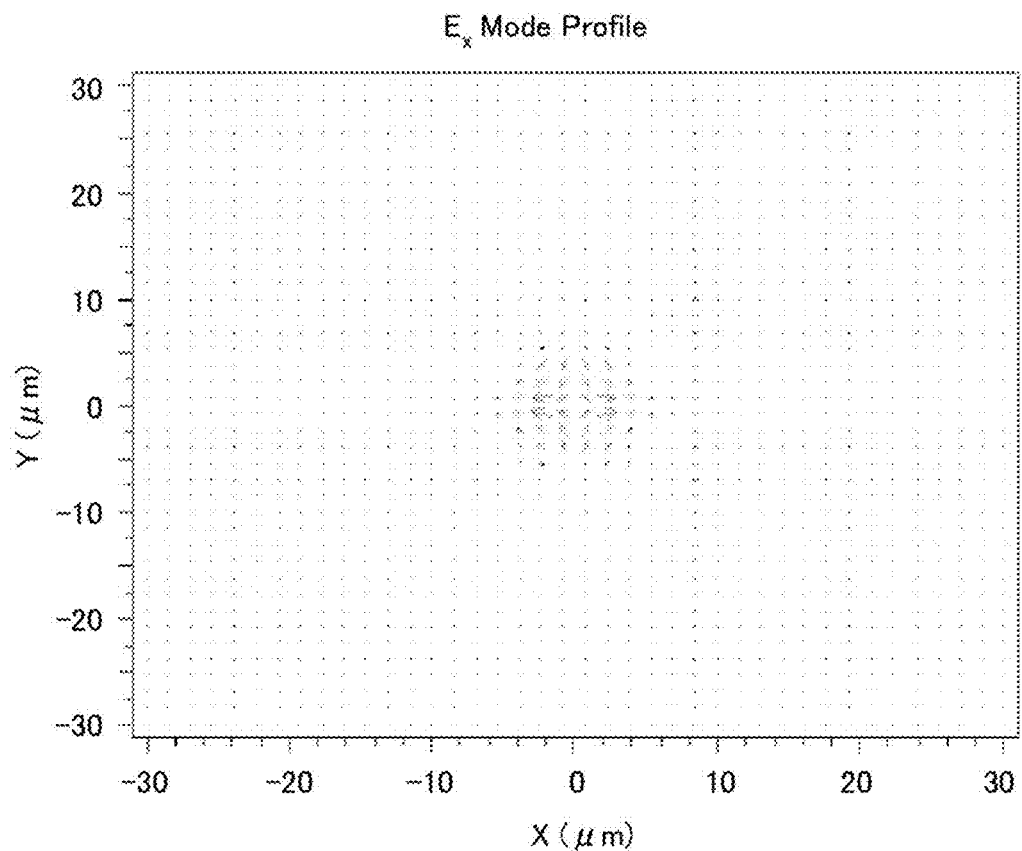
FIG. 14 illustrates a level of electric-field vector of $LP_{11}$ (odd) mode.

Figures from FIG. 9 to FIG. 14 illustrate one example of electric field amplitude profile and a level of electric field vector of LP mode. FIG. 9 illustrates the electric field amplitude profile of the $LP_{01}$ mode, FIG. 10 illustrates a level of the electric field vector of the $LP_{01}$ mode, FIG. 11 illustrates the electric field amplitude profile of the $LP_{11}$ (even) mode, FIG. 12 illustrates a level of the electric field vector of the $LP_{11}$ (even) mode, FIG. 13 illustrates the electric field amplitude profile of the $LP_{11}$ (odd) mode, and FIG. 14 illustrates a level of the electric field vector of the $LP_{11}$ (odd) mode.

When the modes with different propagation constants ($LP_{01}$ mode, $LP_{11}$ mode) propagate, a propagation time difference (delay difference) occurs between the output pulse signals in the output end, due to the different propagation constants, and detection of those modes in a lump by an optical detector may cause distortion in the pulse waveform.

According to the core configuration having the low refractive index portion against the cross talk and pulse waveform distortion caused by the $LP_{11}$ mode, it is possible to restrain occurrence of the $LP_{11}$ mode in the first cladding, thereby maintaining the single mode and reducing the cross talk and pulse wave distortion.

The configuration that restrains the occurrence of the $LP_{11}$ mode also enlarges the limit value of the refractive index contrast $\Delta nc$ where the $LP_{11}$ mode occurs, so as to reduce the cross talk and the pulse wave distortion. In addition, since the limit value of the refractive index contrast $\Delta nc$ becomes larger, it is possible to produce another effect that allows a tolerance in production to be expanded in forming a difference in the refractive index between each core.

Figure 15:
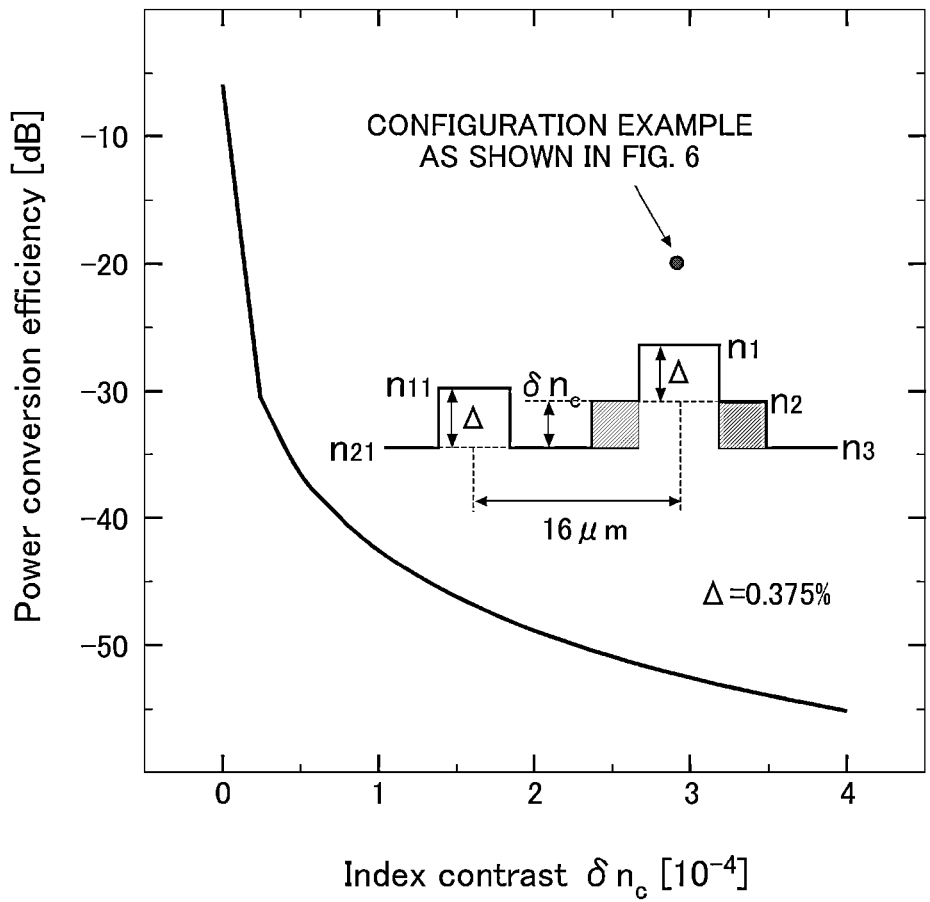
FIG. 15 illustrates a power coupling efficiency (maximum power transfer efficiency) between the cores.

FIG. 15 illustrates the power coupling efficiency (maximum power transfer efficiency) between the core made up of only the first cladding (the refractive index of the second cladding is equal to the refractive index of the first cladding) and the core having the next large refractive index, being a combination that maximizes the coupling, assuming the second cladding as the common cladding. Here, it is assumed that the relative refractive index difference $\Delta=0.375\%$, and the core center interval is 16 μm. In FIG. 15, when the refractive index contrast $\delta nc$ is $4 \times 10^{-4}$, the power coupling efficiency F that shows the cross talk is −20 dB in the case where the low refractive index portion is not provided, but when the low refractive index portion (air hole) is provided, it becomes −55 dB.

Here, the refractive index contrast $\delta nc$ used in FIG. 15 corresponds to the refractive index difference of the first cladding being close to each other, and therefore, it is almost equal to the refractive index difference between the adjacent cores and the equivalent refractive index difference. On the other hand, the refractive index contrast $\Delta nc$ as shown in FIG. 8 corresponds to the difference between the refractive index of the first cladding and the refractive index of the second cladding.

Therefore, the values of the refractive index contrast $\delta nc$ as shown in FIG. 15 become comparable, by using a value obtained by dividing the refractive index contrast value $\Delta nc$ as shown in FIG. 8, by the number of the non-identical cores.

In FIG. 15, the point where the refractive index contrast $\delta nc$ is 0.00029 and the power coupling efficiency is −20 dB indicates a configuration example that does not have the low refractive index portion as shown in FIG. 6. If comparison is made in this example here, it is possible to improve the cross talk approximately by −30 dB, if the configuration having the low refractive index portion is employed.

Figure 16A:
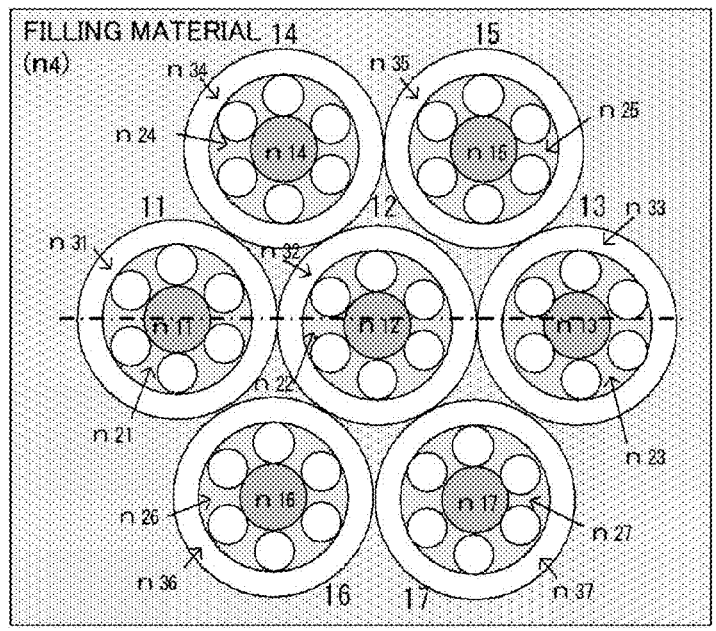
FIG. 16 illustrates a configuration example having a low refractive index portion.
Figure 16B:
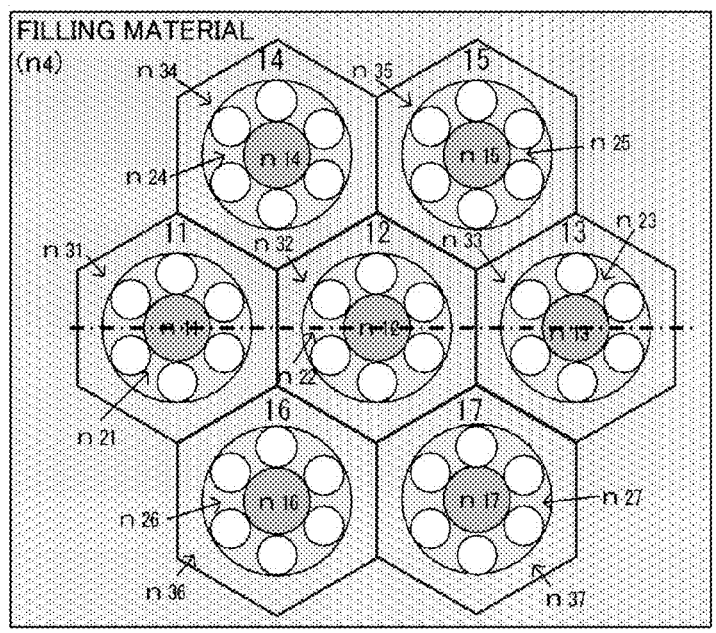
Figure 16C:
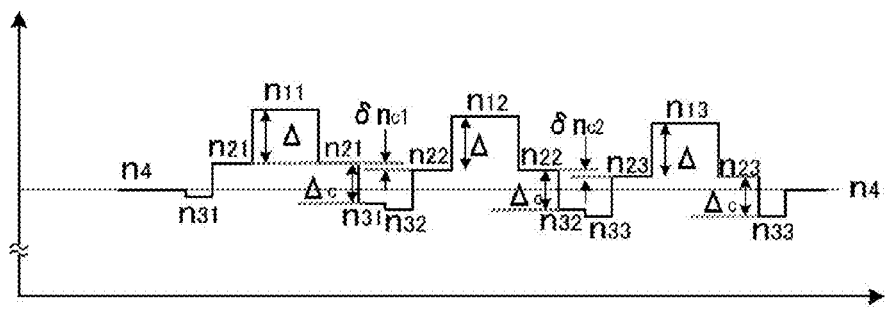

FIG. 16 illustrates a configuration example having the low refractive index portion, in comparison to the configuration example where no low refractive index portion is provided as shown in FIG. 3.

FIG. 16 illustrates a configuration example where six air holes are placed as the low refractive index portions in the first cladding of each core.

It is configured such that the diameter of the air hole agrees with the width of the first cladding, the periphery of the air hole on the inner side comes into contact with the outer periphery of the core part, and the periphery of the air hole on the outer side comes into contact with the inner periphery of the second cladding. It is also possible to configure such that the edge of the air hole comes into contact with neither the core part nor the second cladding.

Figure 17:
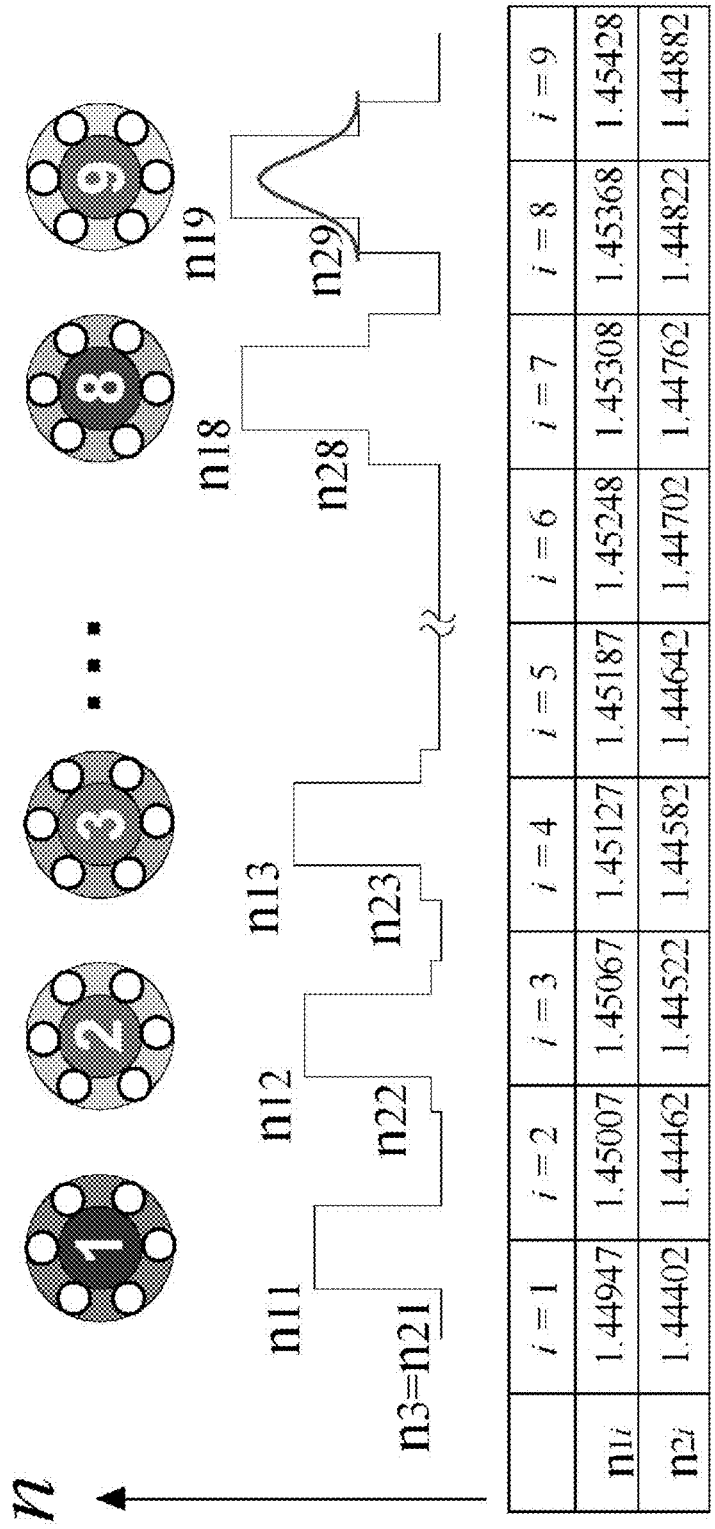
FIG. 17 illustrates one example of non-identical cores of nine types, in the configuration example having the low refractive index portion.

FIG. 17 illustrates an example of nine non-identical cores, similar to the example as shown in FIG. 4. FIG. 17 illustrates that the refractive index of the core part 2 increases sequentially from $n_{11}$ up to $n_{19}$, and the refractive index of the first cladding 4 increases sequentially from $n_{21}$ up to $n_{29}$, in each of the non-identical cores from 11 to 19. It is to be noted that in the example of FIG. 17, the refractive index $n_{21}$ of the first cladding in the non-identical core 11 is the same as the refractive index of the common cladding $n_3$ in the multi-core fiber, and an example of numerical values is shown as to the refractive index $n_{1i}$ of the core part and the refractive index $n_{2i}$ of the first cladding. The first cladding in each non-identical core is provided with six air holes as the low refractive index portions.

As shown in FIGS. 8, 16, and 17, the locations and the number of the low refractive index portions provided in the cladding part are not limited to the arranging configuration where six low refractive index portions are provided within the range of the first cladding, but other configuration may be possible such as placing multiple number of low refractive portions within any of the ranges; the range straddling the first cladding and the core part, and the range straddling the first cladding and the second cladding, and the range within the second cladding.

Hereinafter, with reference to FIG. 18 to FIG. 23, examples of the positions and the number of the low refractive index portions in the arrangement will be illustrated, which are provided in the cladding part. In any of the examples from FIG. 18 to FIG. 23, the diameter of the core part is assumed as 9 μm, the diameter of the first cladding is assumed as 16 μm, the refractive index of the second cladding $n_3$ is assumed as 1.44402, the relative refractive index difference Δ is assumed as 0.375%, and the diameter of the air hole is assumed as 3.5 μm. The air hole configures the low refractive index portion, and the refractive index of this portion corresponds to the refractive index of the air (1.0).

Figure 18:
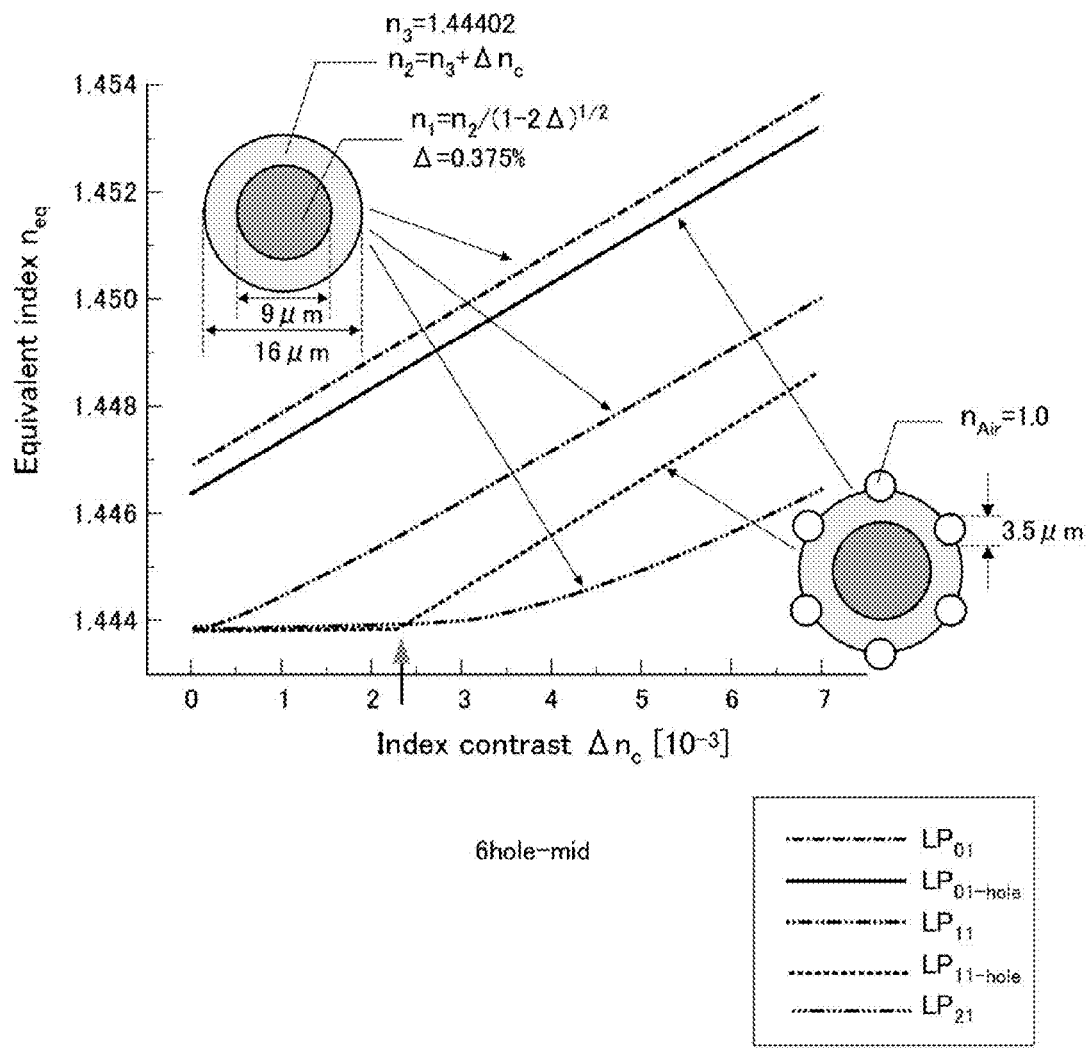
FIG. 18 illustrates a dependence property of the equivalent refractive index of each mode in one core configuring the multi-core fiber, on the refractive index difference $\Delta nc$ ($=n_2-n_3$) between the first cladding and the second cladding.

FIG. 18 illustrates an example that six low refractive index portions are arranged within the range straddling the first cladding and the second cladding. In this figure, the low refractive index portion is an air hole with the refractive index of the air hole $n_{air}=1.0$, and the center of the air hole is arranged on the circumference of the outer periphery of the first cladding. In this example here, a value of the refractive index contrast Δnc at which the $LP_{11}$ mode is cut off is approximately $2.4 \times 10^{-3}$. It is to be noted that the location for arranging the center of the air hole is not limited to the circumference of the outer periphery of the first cladding.

Figure 19:
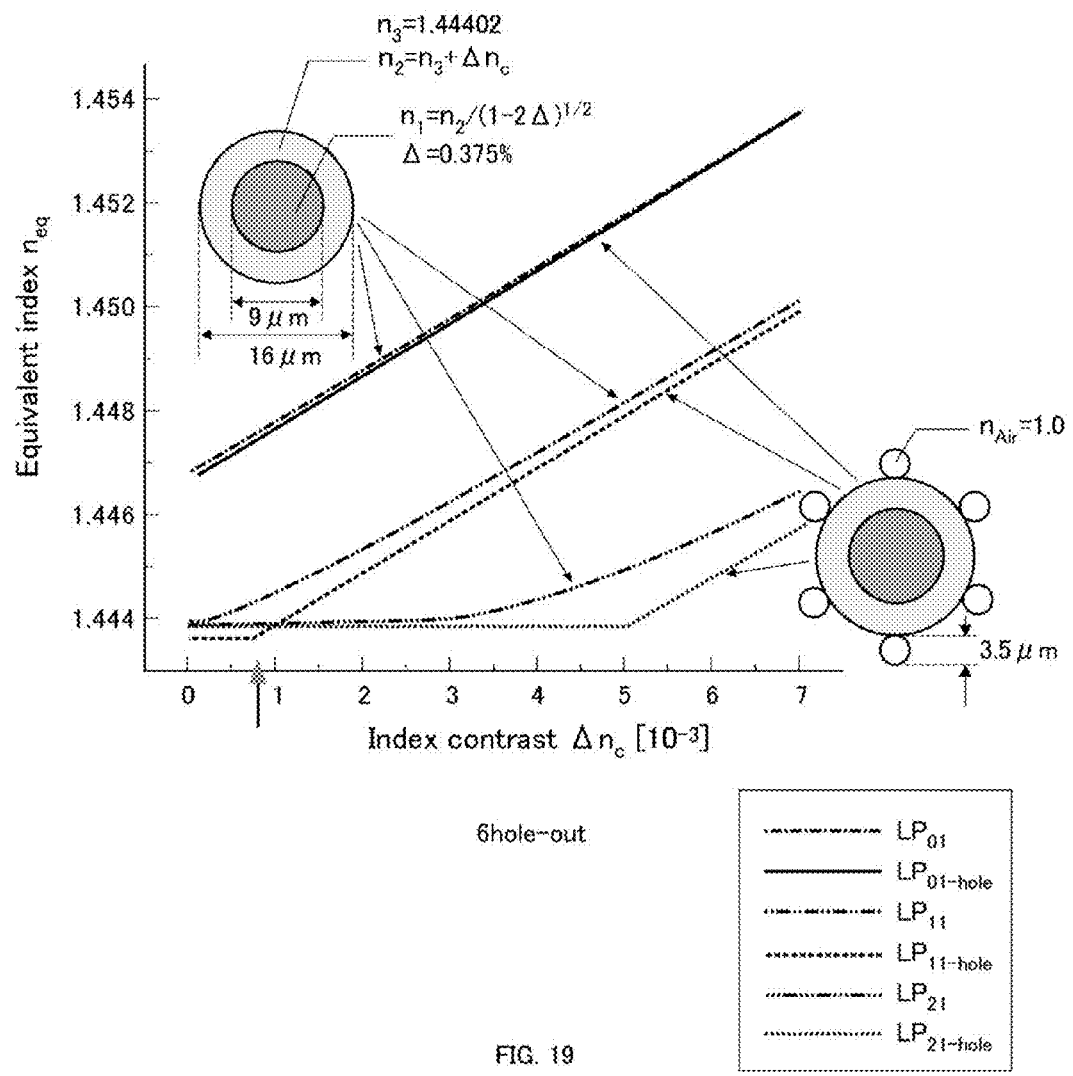
FIG. 19 illustrates a dependence property of the equivalent refractive index of each mode in one core configuring the multi-core fiber, on the refractive index difference $\Delta nc$ ($=n_2-n_3$) between the first cladding and the second cladding.

FIG. 19 illustrates an example in which six low refractive index portions are arranged within the range of the second cladding. The figure shows an example that the low refractive index portion is an air hole with the refractive index of the air hole $n_{air}=1.0$, and a part of the outer periphery of the air hole comes into the contact with the edge on the outer side of the first cladding. In this example here, a value of the refractive index contrast Δnc at which the $LP_{11}$ mode is cut off is approximately $0.8 \times 10^{-3}$. It is to be noted that the arrangement of the air hole is not limited to the configuration where the outer periphery of the air hole is arranged in such a manner as coming into contact with the outer edge of the first cladding, but it may be a configuration that a material constituting the second cladding is placed between the outer periphery of the air hole and the outer edge of the first cladding.

Figure 20:
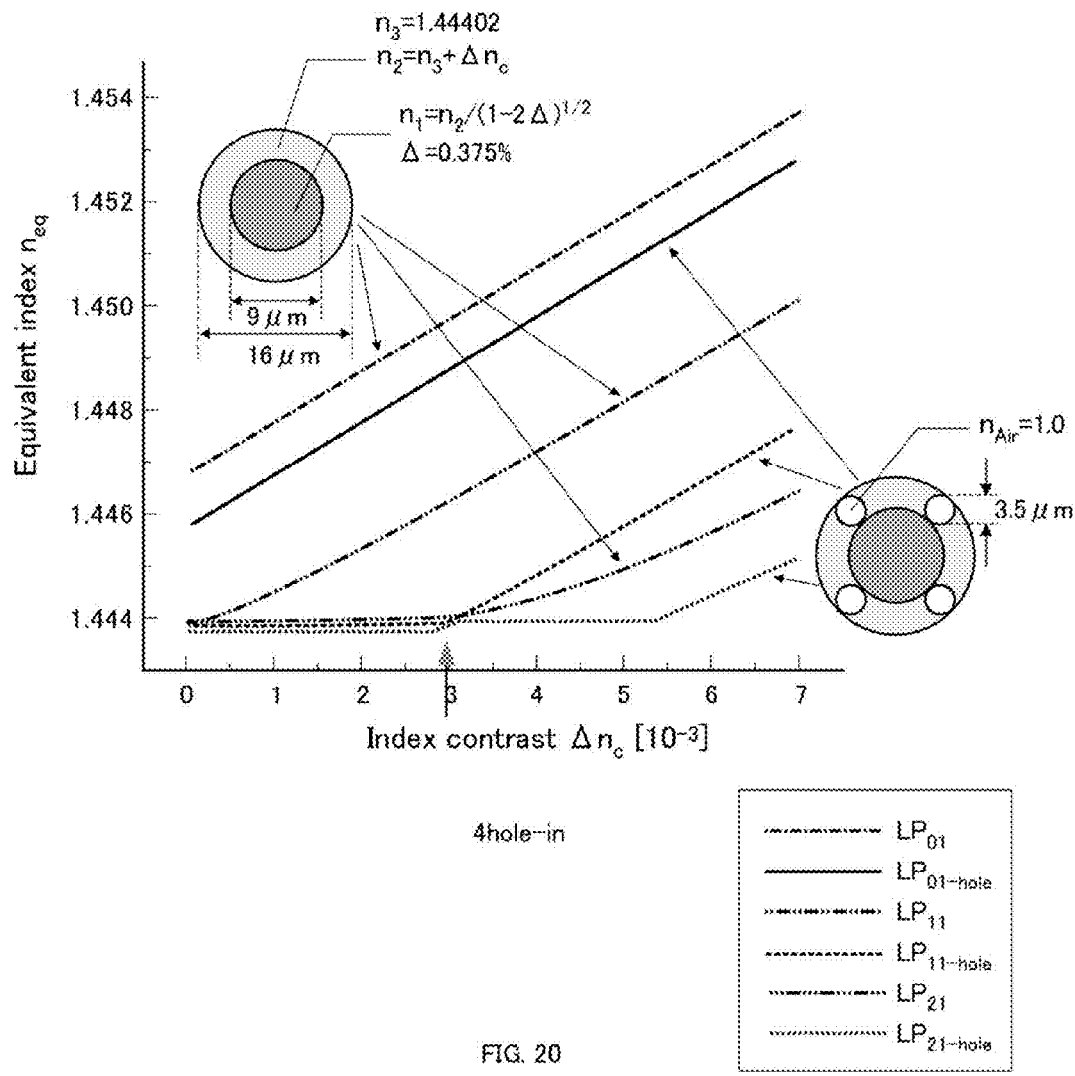
FIG. 20 illustrates a dependence property of the equivalent refractive index of each mode in one core configuring the multi-core fiber, on the refractive index difference $\Delta nc$ ($=n_2-n_3$) between the first cladding and the second cladding.

FIG. 20 illustrates an example that four low refractive index portions are arranged within the range in the first cladding. It is to be noted that in the figure, the low refractive index portion is an air hole with the refractive index of the air hole $n_{air}=1.0$, and the air hole is arranged with the outer periphery coming into contact with both the edge on the outer side of the first cladding, and the outer periphery of the core part. In this example here, a value of the refractive index contrast Δnc at which the $LP_{11}$ mode is cut off is approximately $2.9 \times 10^{-3}$. The arrangement of the air hole is not limited to the configuration where the outer periphery of the air hole is arranged in such a manner as coming into contact with both the edge on the outer side of the first cladding and the outer periphery of the core part, but another configuration is possible such as; the configuration for placing a material constituting the first cladding either between the outer periphery of the air hole and the edge on the outer side of the first cladding or between the outer periphery of the air hole and the outer periphery of the core part, or placing a material constituting the first cladding both between the outer periphery of the air hole and the edge on the outer side of the first cladding, and between the outer periphery of the air hole and the outer periphery of the core part.

Figure 21:
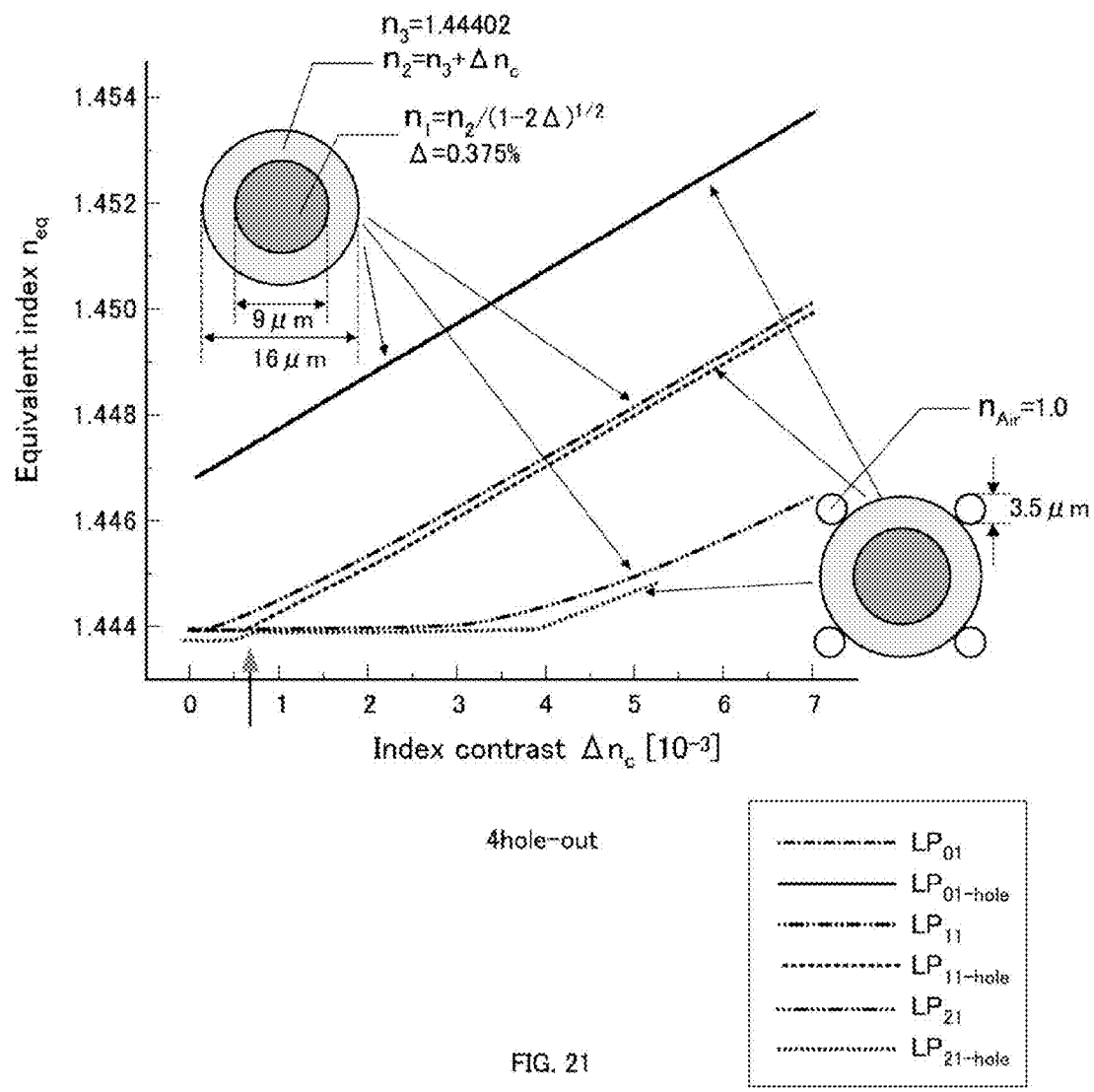
FIG. 21 illustrates a dependence property of the equivalent refractive index of each mode in one core configuring the multi-core fiber, on the refractive index difference $\Delta nc$ ($=n_2-n_3$) between the first cladding and the second cladding.

FIG. 21 illustrates an example that four low refractive index portions are arranged within the range in the second cladding. It is to be noted that the figure illustrates an example that the low refractive index portion is an air hole with the refractive index of the air hole $n_{air}=1.0$, and a part of the outer periphery of the air hole is arranged in such a manner as coming into contact with the edge on the outer side of the first cladding. In this example here, a value of the refractive index contrast Δnc at which the $LP_{11}$ mode is cut off is approximately $0.6 \times 10^{-3}$. It is to be noted that the arrangement of the air hole is not limited to the configuration where the outer periphery of the air hole is arranged in such a manner as coming into contact with the edge on the outer side of the first cladding, but it may be a configuration that a material constituting the second cladding is placed between the outer periphery of the air hole and the edge on the outer side of the first cladding.

Figure 22:
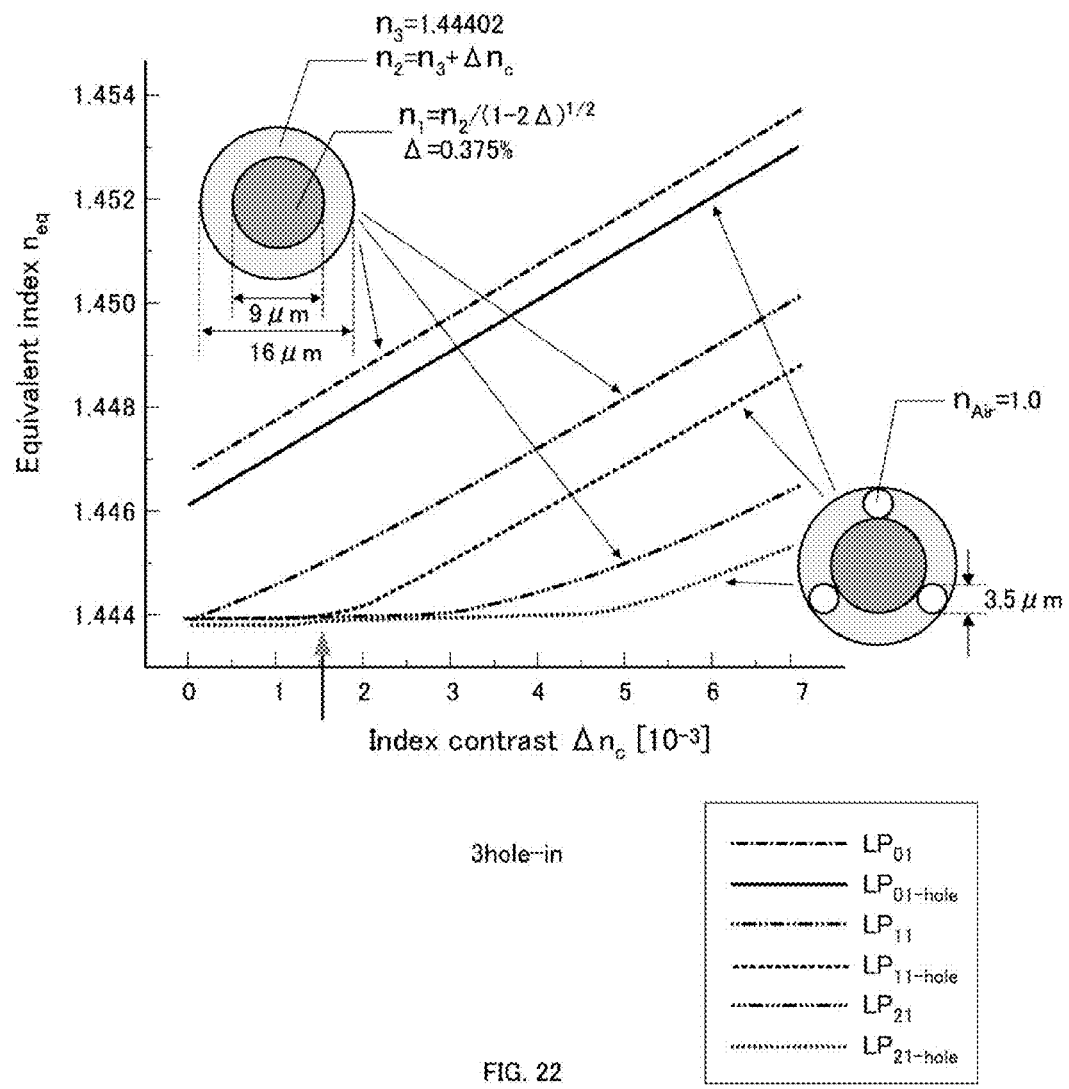
FIG. 22 illustrates a dependence property of the equivalent refractive index of each mode in one core configuring the multi-core fiber, on the refractive index difference $\Delta nc$ ($=n_2-n_3$) between the first cladding and the second cladding.

FIG. 22 illustrates an example that three low refractive index portions are arranged within the range in the first cladding. It is to be noted that the figure illustrates an example that the low refractive index portion is an air hole with the refractive index of the air hole $n_{air}=1.0$, and a part of the outer periphery of the air hole is arranged in such a manner as coming into contact with both the edge on the outer side of the first cladding and the outer periphery of the core part. In this example here, a value of the refractive index contrast Δnc at which the $LP_{11}$ mode is cut off is approximately $1.5 \times 10^{-3}$. It is to be noted that the arrangement of the air hole is not limited to the configuration where the outer periphery of the air hole is arranged in such a manner as coming into contact with both the edge on the outer side of the first cladding and the outer periphery of the core part, but it may be a configuration that a material constituting the first cladding is placed either between the outer periphery of the air hole and the edge on the outer side of the first cladding or between the outer periphery of the air hole and outer periphery of the core part, or a configuration that a material constituting the first cladding is placed both between the outer periphery of the air hole and the edge on the outer side of the first cladding and between the outer periphery of the air hole and the outer periphery of the core part.

Figure 23:
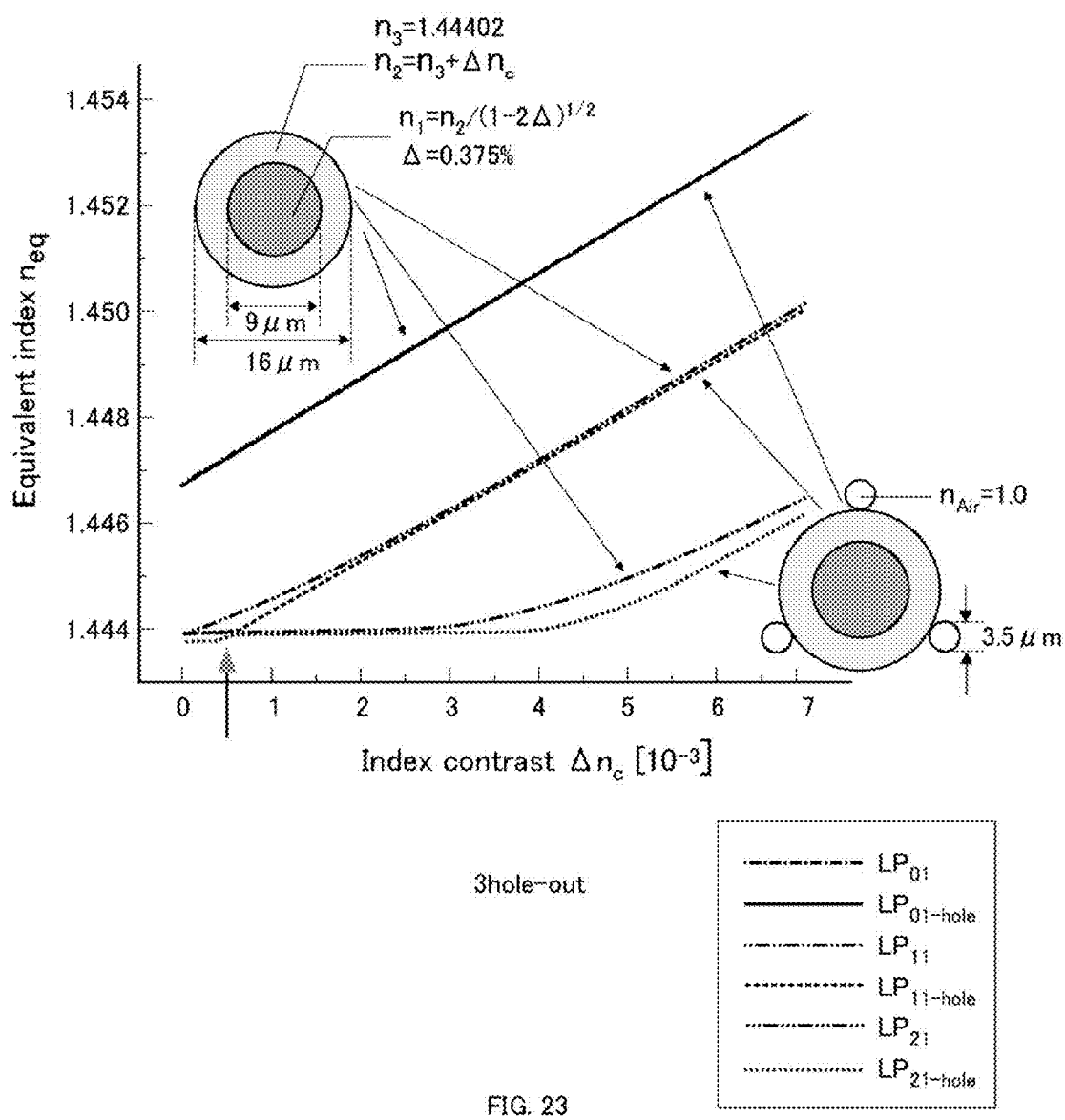
FIG. 23 illustrates a dependence property of the equivalent refractive index of each mode in one core configuring the multi-core fiber, on the refractive index difference $\Delta nc$ ($=n_2-n_3$) between the first cladding and the second cladding.

FIG. 23 illustrates an example that three low refractive index portions are arranged within the range in the second cladding. It is to be noted that the figure illustrates an example that the low refractive index portion is an air hole with the refractive index of the air hole $n_{air}$=1.0, and a part of the outer periphery of the air hole is arranged in such a manner as coming into contact with the edge on the outer side of the first cladding. In this example here, a value of the refractive index contrast $\Delta nc$ at which the $LP_{11}$ mode is cut off is approximately $0.5 \times 10^{-3}$. It is to be noted that the arrangement of the air hole is not limited to the configuration where the outer periphery of the air hole is arranged in such a manner as coming into contact with the edge on the outer side of the first cladding, but it may be a configuration that a material constituting the second cladding is placed between the outer periphery of the air hole and the edge on the outer side of the first cladding.

[Arrangement Example of the Non-Identical Cores]

Hereinafter, with reference to FIG. 24 to FIG. 31, an explanation will be provided as to the arrangement of the non-identical cores. FIG. 24 illustrates an example of the core arrangement according to a conventional configuration with a low refractive index difference, and an example of the core arrangement according to the double cladding structure of the present invention.

Figure 24A:
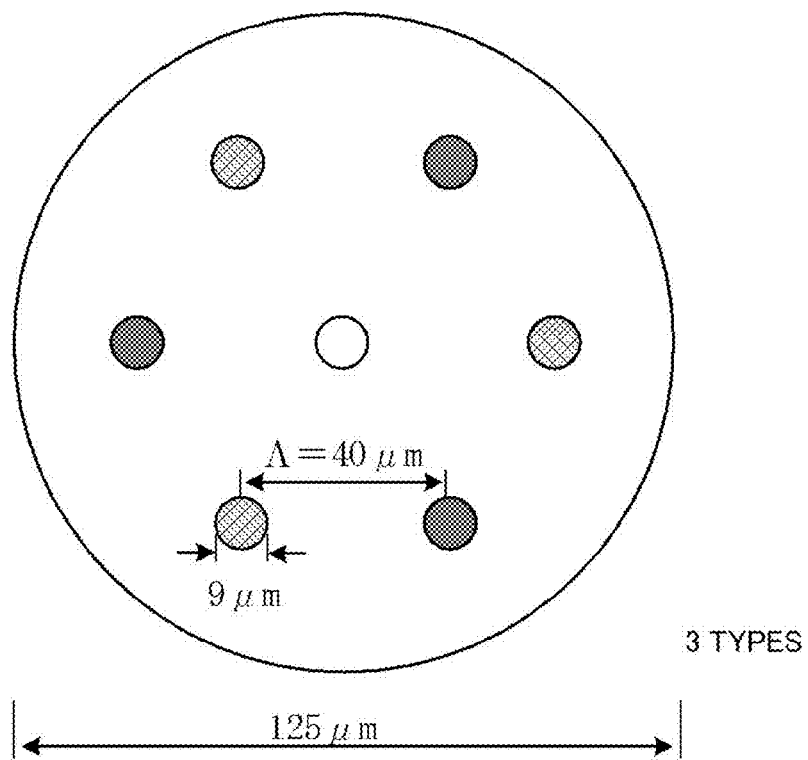
FIG. 24 illustrates an example of core arrangement according to a conventional configuration when a refractive index difference is low, and an example of core arrangement in a double cladding structure according to the present invention.
Figure 24B:
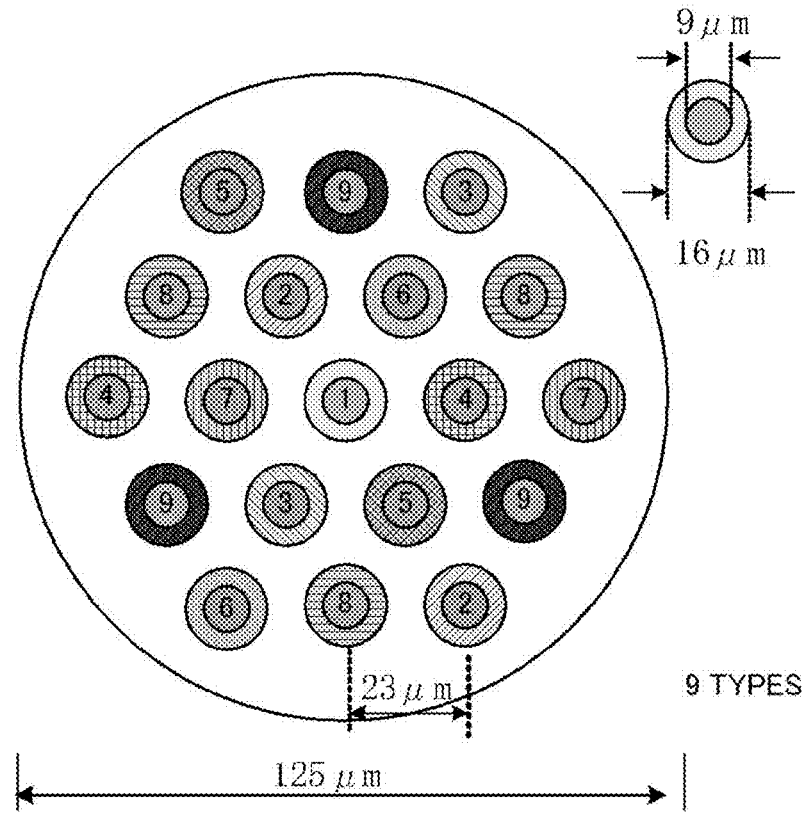

FIG. 24A illustrates the core arrangement example according to the conventional configuration, and seven cores are arranged, using three types of non-identical cores. FIG. 24B illustrates the core arrangement example according to the double cladding structure of the present invention, and nineteen cores are arranged using the nine-type non-identical cores in double cladding structure, achieving high density.

The core arrangement is efficiently performed by using lattice points of a lattice arrangement. Accommodating the cores into the circular fiber may be performed by using a triangular lattice, or alternatively, a rectangular lattice combining triangular lattices, depending on how many core types exist.

FIG. 25 illustrates a unit lattice of the lattice arrangement. The unit lattice represents a basic unit of a lattice position in the lattice arrangement. The lattice arrangement may be formed by arranging the unit lattice at regular spacing.

Figure 25A:
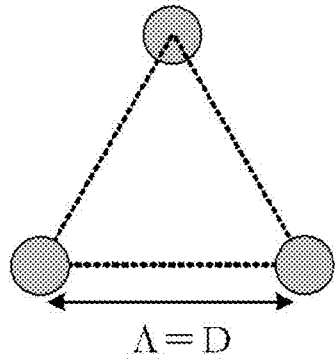
FIG. 25 illustrates a unit lattice in the core arrangement.

Here, lattices for arranging the cores are shown for the cases that the number of the core types being used is 1, 2, 3, 4, 8, and 9. FIG. 25A illustrates the unit lattice using one core type. In the case of this unit lattice, since the core is just one type, the identical core center interval D is equal to the non-identical core center interval $\Lambda$.

Figure 25B:
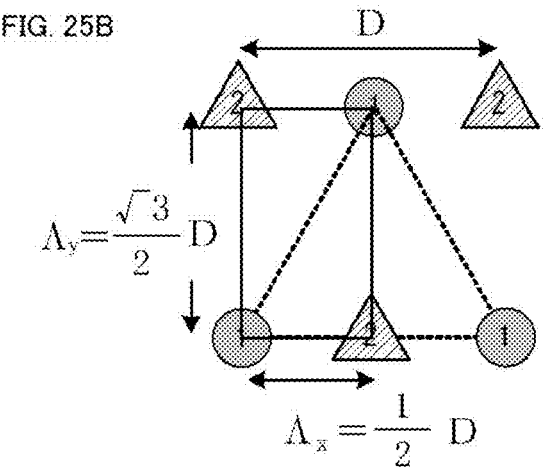

FIG. 25B illustrates the unit lattice using two types of cores. In the case of this unit lattice, the non-identical core center interval $\Lambda x$ in the x-direction is ½ of the identical core center interval D, and the non-identical core center interval $\Lambda y$ in the y-direction is $\sqrt{3}/2$ of the identical core center interval D.

Figure 25C:
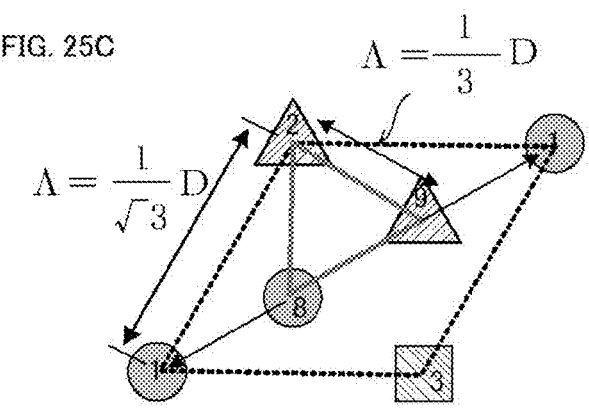

FIG. 25C illustrates the unit lattice using three types of cores and the unit lattice using nine types of cores. The unit lattice using the three type of cores is formed by lattice points provided with the signs 1 to 3 in the figure, and the non-identical core center interval $\Lambda$ is $1/\sqrt{3}$ of the identical core center interval D. The unit lattice using nine types of cores is formed by arranging lattice points on the center of gravity of the unit lattice made up of three types of cores, formed by the lattice points with the signs 1 to 3, 8, and 9 in the figure, and the non-identical core center interval $\Lambda$ is ⅓ of the identical core center interval D. It is to be noted here that in the cores of nine types, the lattice point of 4 to 7 are not illustrated.

Figure 25D:
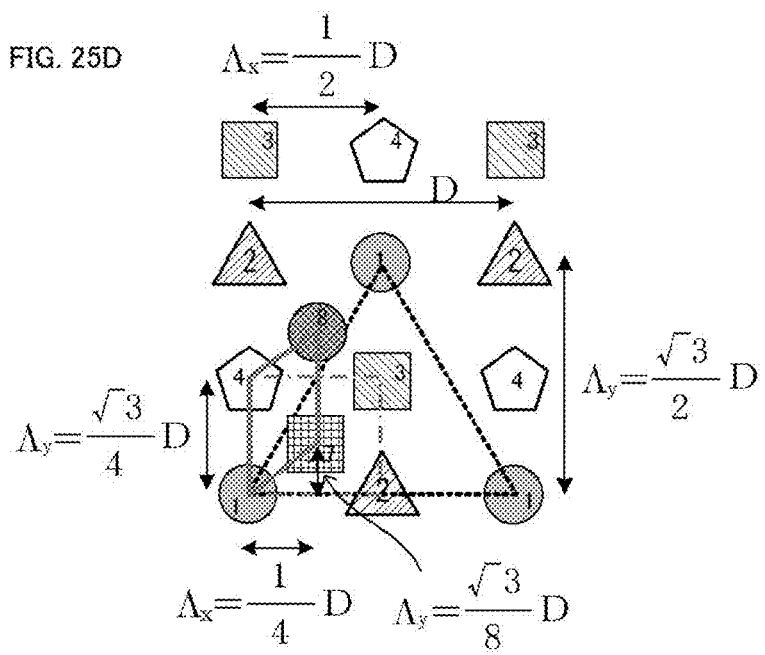

FIG. 25D illustrates the unit lattice using four types of cores and the unit lattice using eight types of cores.

The unit lattice made up of four types of cores may be formed by preparing two unit lattices of two-type cores, and arranging the cores of one two-type respectively on the midpoints of both long sides of the cores of the other two-type. The unit lattice made up of four types of cores is formed by the lattice points with the signs 1 to 4 in the figure, the non-identical core center interval $\Lambda x$ in the x-direction is ½ of the identical core center interval D, and the non-identical core center interval $\Lambda y$ in the y-direction is $\sqrt{3}/2$ of the identical core center interval D.

The unit lattice made up of eight types of cores may be formed by arranging each lattice point on the middle position between the cores, respectively in the x-direction and in the y-direction of the unit lattice made up of the four-type cores, being formed by the lattice points with the signs 1 to 4, 7, and 8 in the figure, the non-identical core center interval $\Lambda x$ in the x-direction is ¼ of the identical core center interval D, and the non-identical core center interval $\Lambda y$ in the y-direction is $\sqrt{3}/4$ of the identical core center interval D. It is to be noted here that in the eight-type cores, the lattice points 5 and 6 are not illustrated.

[Configuration for Arranging the Cores in the Multi-Core Fiber]

Next, a configuration for arranging the non-identical cores in the multi-core fiber will be explained. An explanation will be provided as to the arrangement considering inter-core coupling that occurs by bending the multi-core fiber.

Figure 26A:
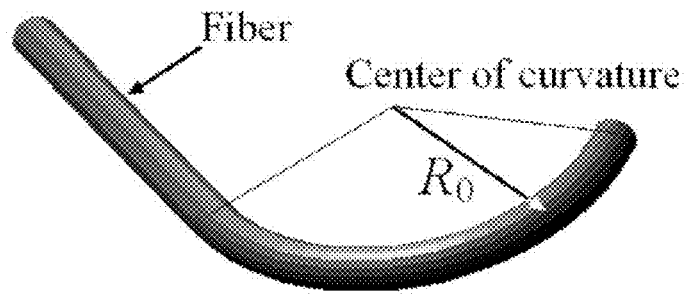
FIG. 26 illustrates an equivalent refractive index profile generated by bending the multi-core fiber.
Figure 26B:
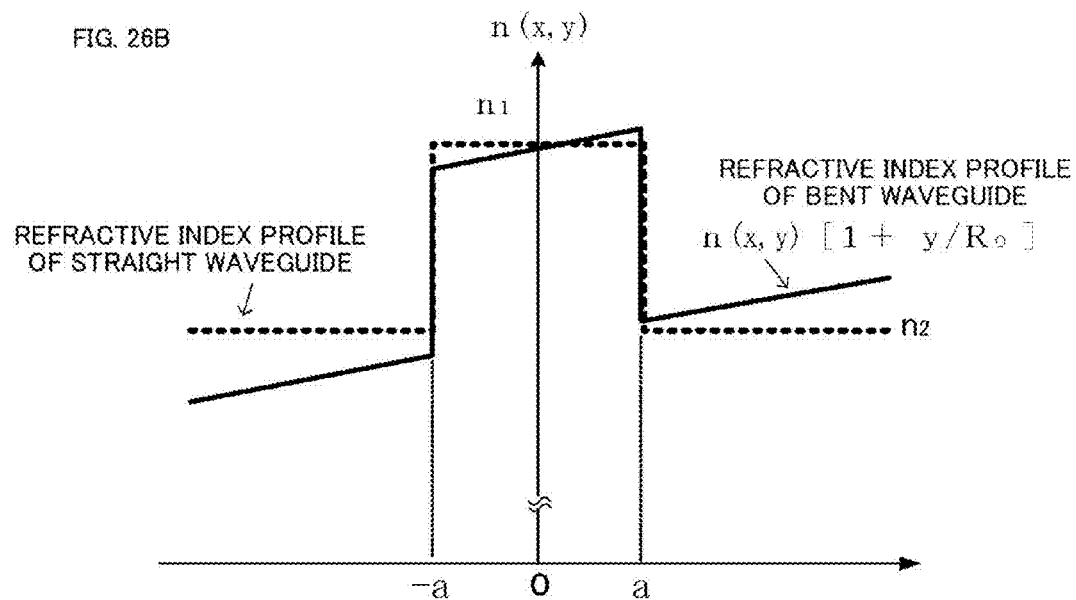
Figure 26C:
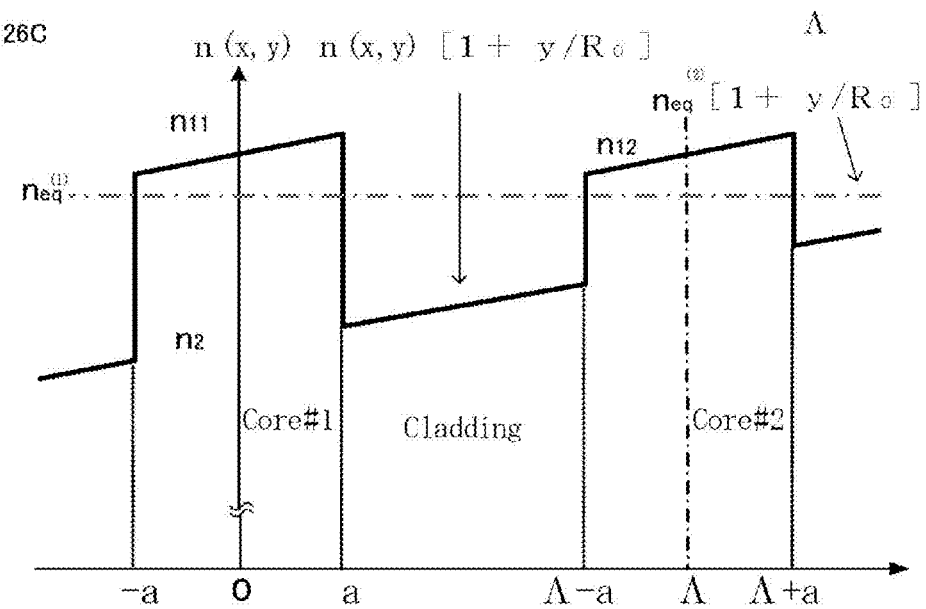

FIG. 26 illustrates the refractive index profile generated by bending the multi-core fiber. Bending of the multi-core fiber (FIG. 26A) may change the refractive index profile in each of the multiple cores arranged within the multi-core fiber (FIG. 26C).

The refractive index profile in one core in the multi-core fiber in the state of not being bent is represented by the refractive index profile that is a straight waveguide as indicated by the broken line in FIG. 26B. An equivalent refractive index profile in one core in the multi-core fiber in the bent state is represented by the refractive index profile that is a bent waveguide as indicated by the solid line in FIG. 26B.

The equivalent refractive index profile of the bent waveguide is expressed by $n(x, y)[1+y/R_0]$. Here, $R_0$ represents a bending radius.

By using the aforementioned relations of the refractive index profile, in a case where a threshold bending radius is obtained at which the bending equalizes the refractive indexes of the cores, between the cores having the refractive index $n_{11}$ and the refractive index $n_{12}$ being the most easily coupled between the adjacent cores, it is 114 mm. The aforementioned relations between the bending of the multi-core fiber and the refractive index profile represents that if the bending radius is equal to or larger than 114 mm, occurrence of inter-core coupling can be restrained, whereas if the bending radius is less than 114 mm, inter-core coupling may occur due to the bending.

It is to be noted that the formula for obtaining the threshold bending radius is as the following:

$$R_{0-th} = \left(\frac{2n_{eq}^{(2)2}}{n_{eq}^{(1)2} - n_{eq}^{(2)2}}\right) \cdot \Lambda \cong \left(\frac{2n_{12}^2}{n_{11}^2 - n_{12}^2}\right) \cdot \Lambda \quad \text{[Formula 1]}$$

In the arrangement of the non-identical cores in the multi-core fiber of the present invention, the cores are arranged in the following manners, so as to reduce the inter-core coupling due to bending.

A: The core with the core part having the lowest refractive index among the multiple types of non-identical cores is arranged in proximity to the center of the optical fiber. This arrangement allows the core with the core part having a high refractive index to be arranged at the position being distant from the center of the optical fiber.

B: Among the multiple types of non-identical cores, a pair of two types of non-identical cores are arranged from near the center of the optical fiber toward the outer peripheral direction of the optical fiber, based on a difference of the refractive indexes between the core parts in the non-identical cores, the pair of two types of non-identical cores being a combination of the cores including the core parts having a large refractive index difference therebetween, among the combinations with the refractive index difference of core parts in the pairs of non-identical cores.

Arrangement configuration of A: The optical fiber being the multi-core fiber has a configuration whose outer peripheral portion is covered with a polymer jacket. Therefore, in the core positioned in the outer peripheral portion where the distance up to the polymer jacket is short, there is a possibility that absorption loss may occur due to the leakage of the optical electromagnetic profile from the core to the polymer jacket.

Generally, the absorption loss in the polymer jacket is significantly larger than the absorption loss in the core part and a cladding part of the core. Therefore, the core which may easily cause the absorption loss due to the influence of the polymer jacket corresponds to a core whose refractive index of the core part and the first cladding is small. According to the present invention, the cores with the core part and the first cladding having small refractive indexes are arranged near the center of the center, thereby reserving a long distance between the core part and the polymer jacket, and the refractive indexes of the core part and the first cladding in proximity to the polymer jacket are made higher, thereby reducing the absorption loss due to the polymer jacket.

Arrangement configuration of B: Inter-core coupling due to the bending of the multi-core fiber is influenced more significantly, as the refractive index difference between the adjacent cores becomes smaller. Therefore, according to the present invention, in the arrangement of non-identical cores, a large refractive index difference is provided between the adjacent cores along the direction in which the multi-core fiber is bent, thereby reducing the influence on the inter-core coupling, caused by the bending.

In a case where the cores are placed in the triangular lattice arrangement, the cores arranged along the direction in which the multi-core fiber is bent may become cores being adjacent in the radiation direction.

Figure 27A:
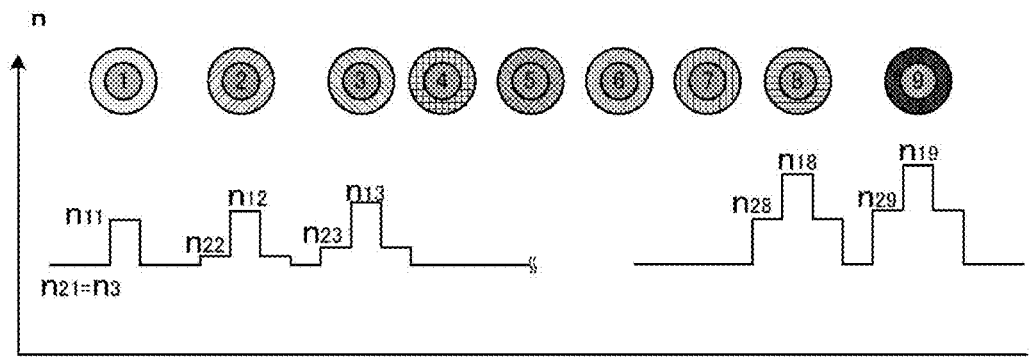
FIG. 27 illustrates an arrangement of non-identical cores in the multi-core fiber of the present invention.

FIG. 27 illustrates the arrangement of the non-identical cores in the multi-core fiber according to the present invention. FIG. 27A illustrates the state that nine types of non-identical cores are arranged side by side in ascending order of the magnitude of the refractive index of the core part. This example here illustrates the core with the smallest refractive index of the core part being $n_{11}$, and the refractive index of the first cladding $n_{21}$ agrees with the refractive index of the common cladding $n_3$, and the refractive index of the core part is increased sequentially from $n_{11}$ up to the refractive index $n_{19}$. In FIG. 27, numerical signs from 1 to 9 are assigned, so as to respectively represent the refractive indexes $n_{11}$ to $n_{19}$.

Figure 27B:
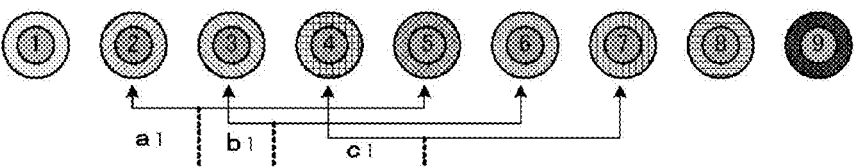

FIG. 27B illustrates nine types of non-identical cores (refractive indexes from $n_{11}$ to $n_{19}$ of the core part) are arranged in the order of refractive index of the core part, and a pair of cores are formed out of those non-identical cores. Here, the core $n_{12}$ and the core $n_{15}$ are used to form the pair a, the core $n_{13}$ and the core $n_{16}$ are used to form the pair b, and the core $n_{14}$ and the core $n_{17}$ are used to form the pair c. Those pairs of cores are combinations having a large refractive index difference, and any of those pairs have equivalent refractive index differences. Here, the refractive index difference between the adjacent cores is assumed to be approximately equal. It is to be noted that the refractive index difference of each pair is not necessarily equal to one another, but various refractive index difference is conceivable.

Figure 27C:
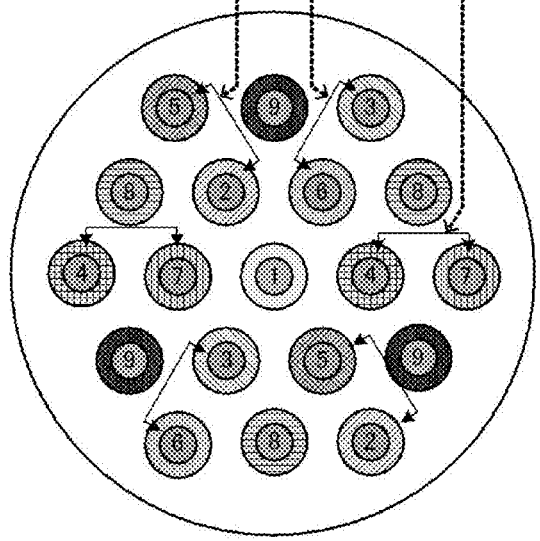
Figure 28:
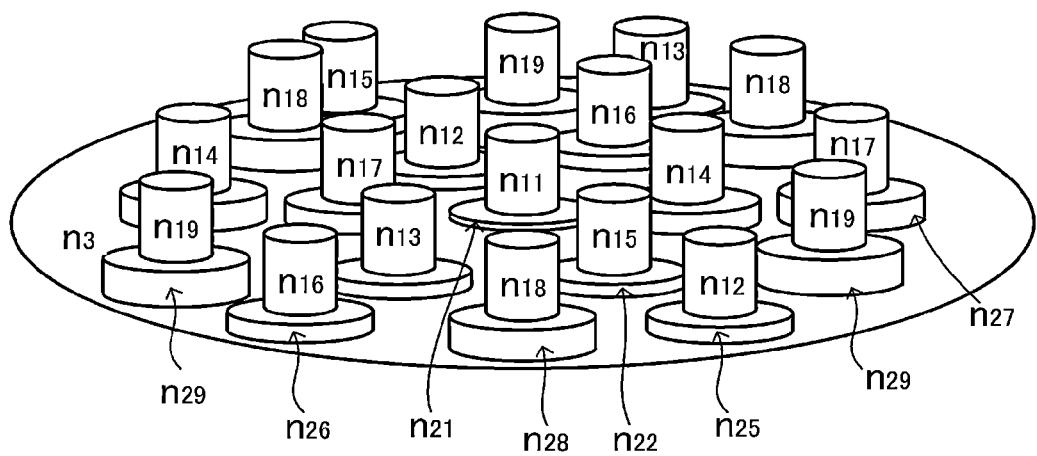
FIG. 28 illustrates a profile of the refractive index according to the direction for arranging the multi-core fiber of the present invention.

FIG. 27C illustrates an example that nineteen cores are accommodated within the optical fiber according to the triangular lattice arrangement. At the central position of the optical fiber, the core $n_{11}$ having the smallest refractive index of the core is arranged, and the pair a1, the pair b1, and the pair c1 are arranged respectively in the radiation directions, and the cores $n_{18}$ and $n_{19}$ are arranged respectively between each of the pair a1, the pair b1, and the pair c1. FIG. 28 schematically illustrates the profile of the refractive index, according to the arrangement example as shown in FIG. 27C.

In order to reduce the cross talk between the non-identical cores, it is desirable that the equivalent refractive index difference between the adjacent non-identical cores is large. In the arrangement of the non-identical cores as shown in FIG. 27C, the core $n_{11}$ placed at the center is adjacent to the core $n_{12}$ placed at the outer circumference thereof, and therefore the equivalent refractive index difference between those non-identical cores is smaller than the equivalent refractive index difference between other non-identical cores.

The following configuration may be established so as to enlarge the refractive index difference between the adjacent non-identical cores. In this configuration, as the nine types of non-identical cores used for accommodating nineteen cores, there are prepared at least ten types of non-identical cores in advance, and the core having the smallest refractive index is selected as the center core out of those cores, the non-identical core having the next largest refractive index is removed from the selection, and eight types of non-identical cores, i.e., the non-identical cores having the refractive index different by at least two stages from the core having the smallest refractive index, are selected. With this configuration, it is possible to set a large refractive index difference between the adjacent non-identical cores.

FIG. 29 illustrates another arrangement example of the non-identical cores according to the present invention.

Figure 29A:
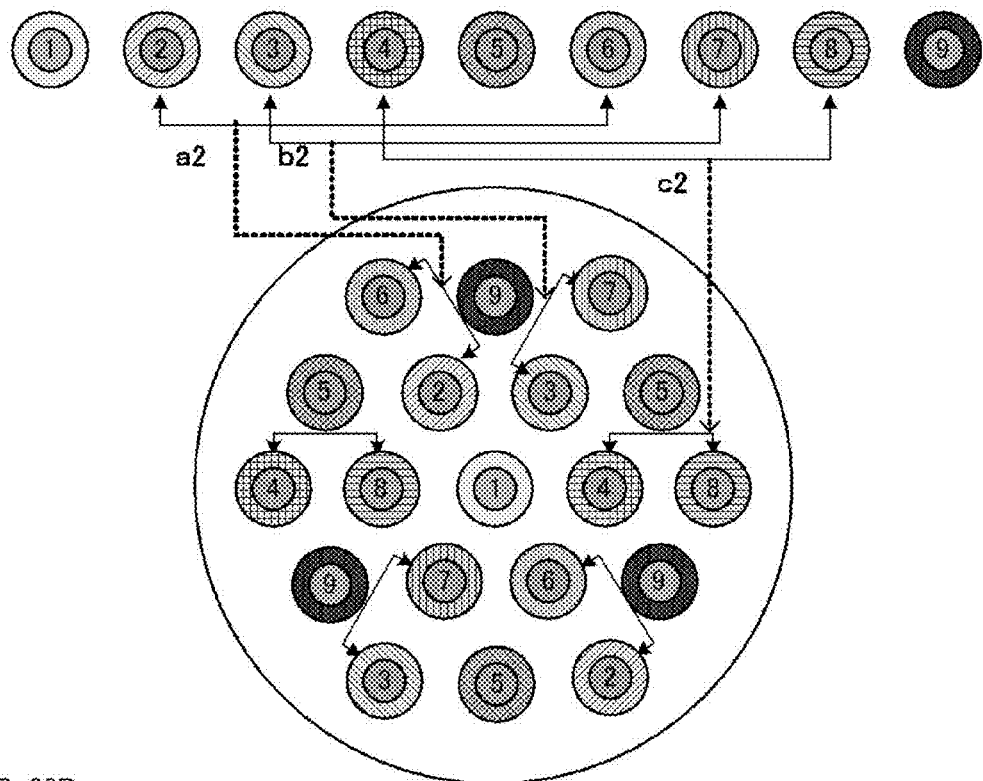
FIG. 29 illustrates another example for arranging non-identical cores in the multi-core fiber of the present invention.

In FIG. 29A, nine types of non-identical cores (core $n_{11}$ to core $n_{19}$) are arranged in the order of the refractive index of the core part, and the core $n_{12}$ and the core $n_{16}$ form the pair a2, the core $n_{13}$ and the core $n_{17}$ form the pair b2, and the core $n_{14}$ and the core $n_{18}$ form the pair c2. Those pairs of cores are combinations of the cores, each having a large refractive index difference therebetween, and any of those pairs are assumed to have equivalent refractive index differences. Here, it is also assumed that the refractive index difference between the adjacent cores is set to be approximately equal.

At the central position of the optical fiber, the core $n_{11}$ having the smallest refractive index of the core is arranged, and the pair a2, the pair b2, and the pair c2 are arranged respectively in the radiation directions, and the cores $n_{15}$ and $n_{19}$ are arranged respectively between each of the pair a2, the pair b2, and the pair c2.

Figure 29B:
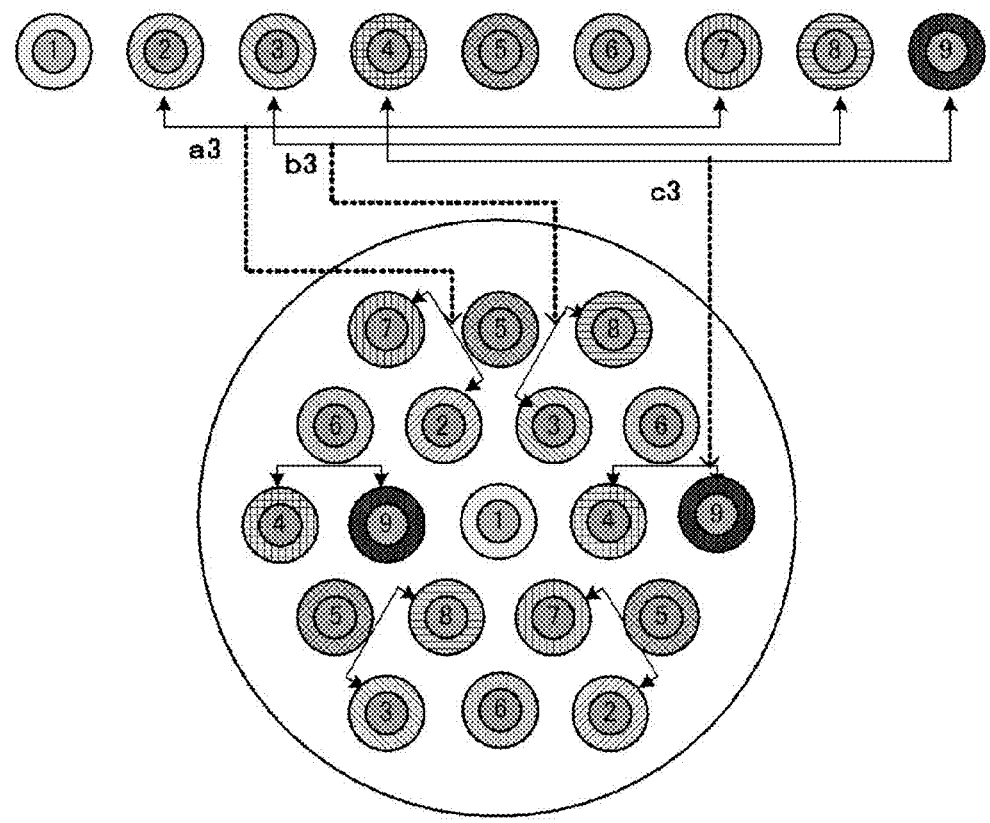

In FIG. 29B, nine types of non-identical cores (core $n_{11}$ to core $n_{19}$) are arranged in the order of the refractive index of the core part, and the core $n_{12}$ and the core $n_{17}$ form the pair a3, the core $n_{13}$ and the core $n_{18}$ form the pair b3, and the core $n_{14}$ and the core $n_{19}$ form the pair c3. Those pairs of cores are combinations of the cores, each having a large refractive index difference therebetween, and any of those pairs are assumed to have equivalent refractive index differences. Here, it is also assumed that the refractive index difference between the adjacent cores is set to be approximately equal.

At the central position of the optical fiber, the core $n_{11}$ having the smallest refractive index of the core is arranged, and the pair a3, the pair b3, and the pair c3 are arranged respectively in the radiation directions, the cores $n_{15}$ and $n_{16}$ are arranged respectively between each of the pair a3, the pair b3, and the pair c3.

(Modification Example of the Arrangement of Non-Identical Cores)

Figure 30A:
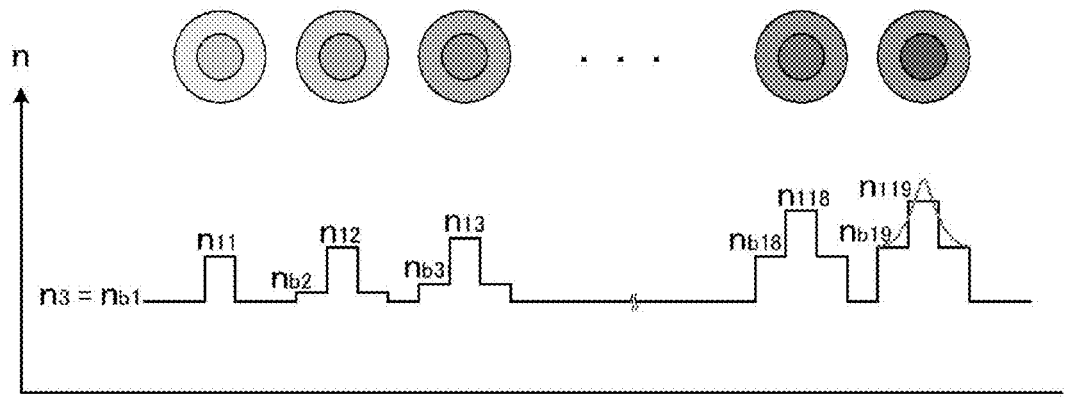
FIG. 30 illustrates an example where all types of non-identical cores arranged within the optical fiber are made different.
Figure 30B:
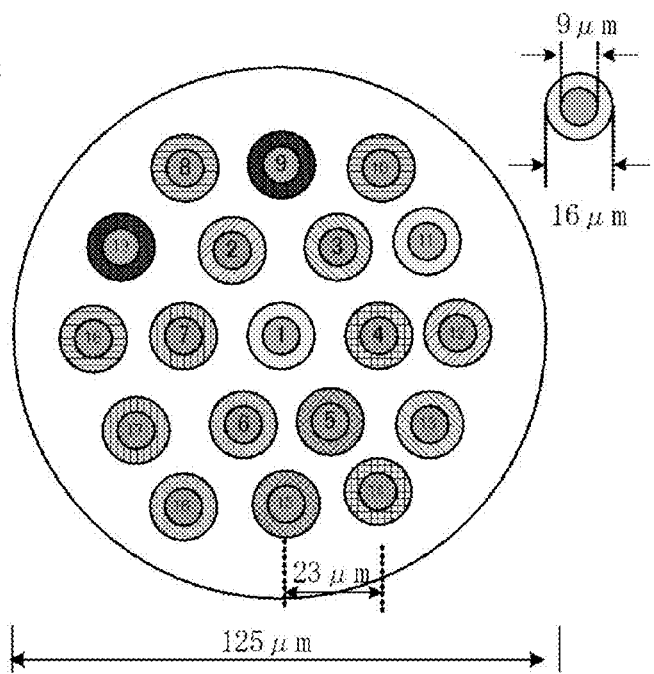

FIG. 30 illustrates an example that all the types of non-identical cores arranged in the optical fiber are made different. In the case where nineteen cores are arranged within the optical fiber, nineteen types of cores are prepared as the non-identical cores to be arranged (FIG. 30A) and they are arranged. In FIG. 30B, the core 11 having the smallest refractive index is arranged at the center of the core part, the cores $n_{12}$ to $n_{17}$ are arranged in the outer circumference of the core $n_{11}$, and the cores $n_{18}$ to the core $n_{119}$ are arranged on the further outer circumference thereof. FIG. 30B illustrates that the numbers from 1 to 19 are assigned to the cores, respectively. Here, the number of types of the non-identical cores is made to agree with the number of cores that are accommodated in the optical fiber, but it is possible that the number of types of non-identical cores being prepared is equal to or more than the number of cores to be accommodated, and the type of the non-identical core that is required for the number of cores to be accommodated may be selected.

(Example of Arrangement of the Non-Identical Cores Having a Low Refractive Index Portion)

Figure 31:
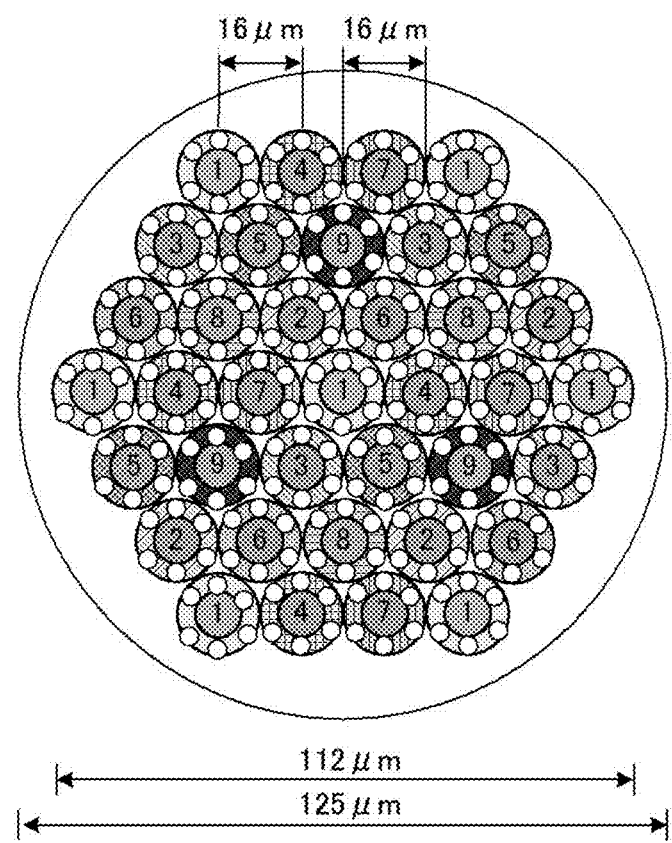
FIG. 31 illustrates an arrangement example of the non-identical cores each being provided with the low refractive index portion.
Figure 32A:
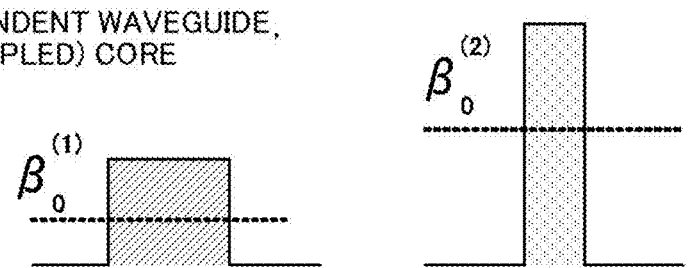
FIG. 32 illustrates the simplest model for explaining an inter-core coupling of the multi-core fiber.
Figure 32B:
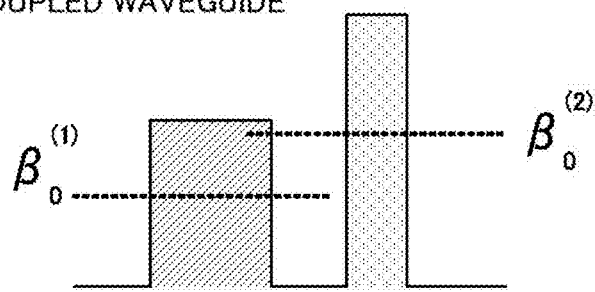
Figure 33A:
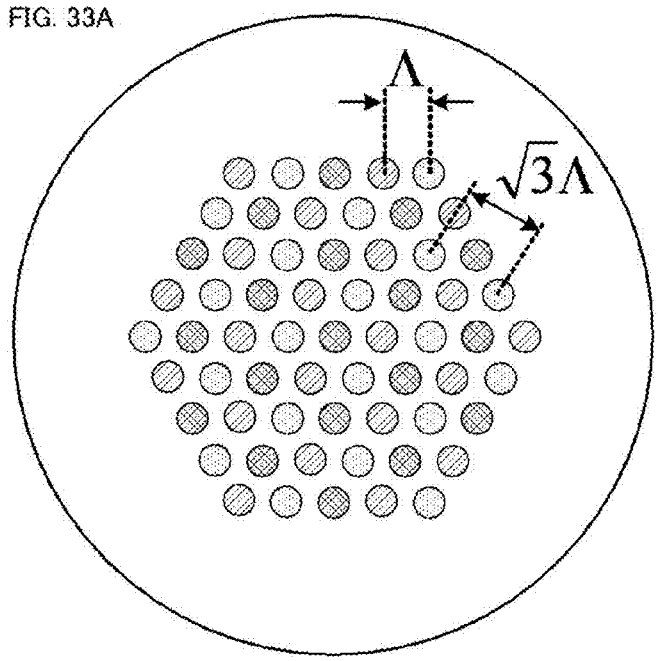
FIG. 33 illustrates an example of different propagation constants.
Figure 33B:
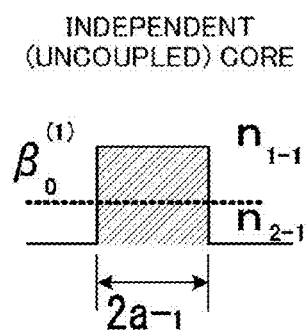
Figure 33C:
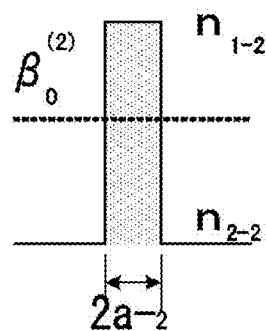
Figure 33D:
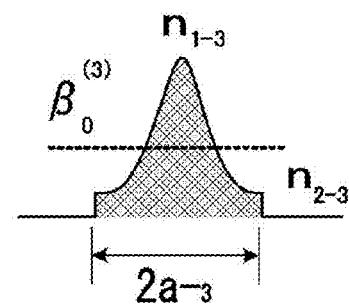
Figure 34A:
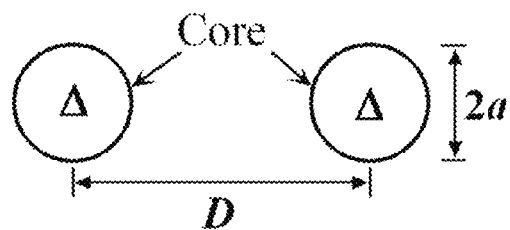
FIG. 34 illustrates the coupling length between the identical cores in the case of high refractive index difference where the refractive index difference is large between the cores of the non-identical cores.
Figure 34B:
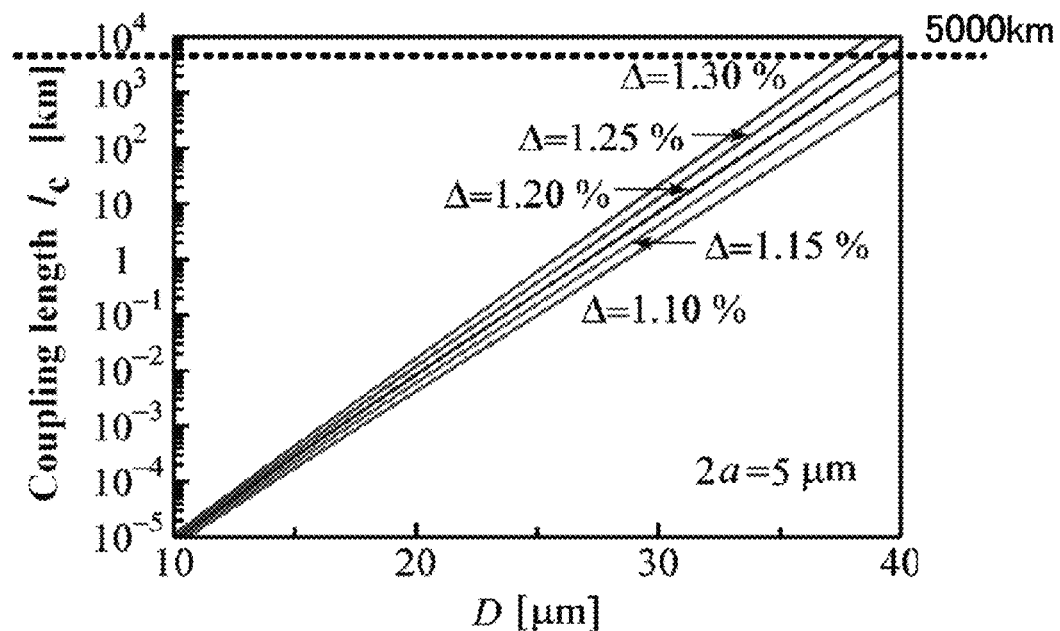
Figure 35A:
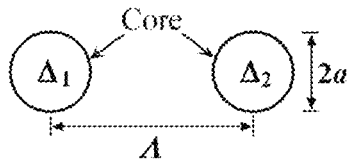
FIG. 35 illustrates a power coupling efficiency (maximum power transfer efficiency) between the non-identical cores in the case of high refractive index difference where the refractive index difference is large between the cores of the non-identical cores.
Figure 35B:
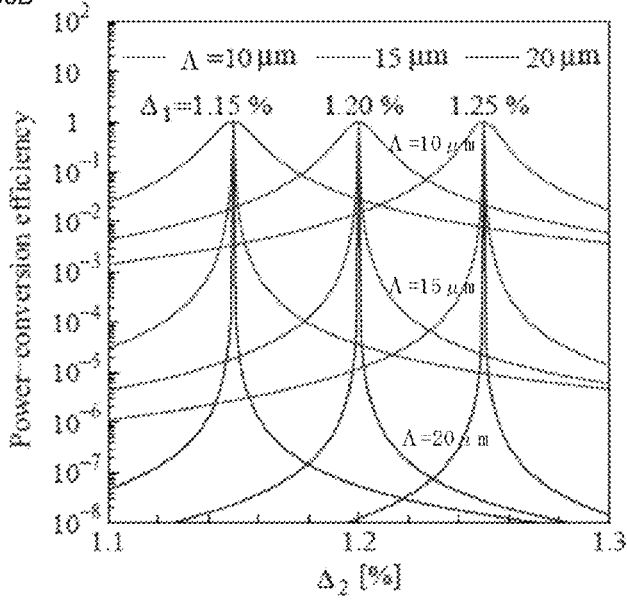
Figure 35C:
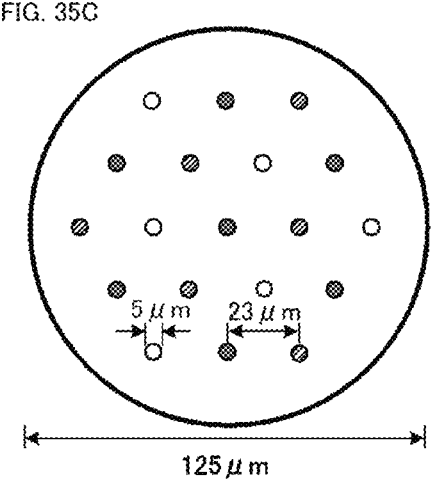
Figure 35D:
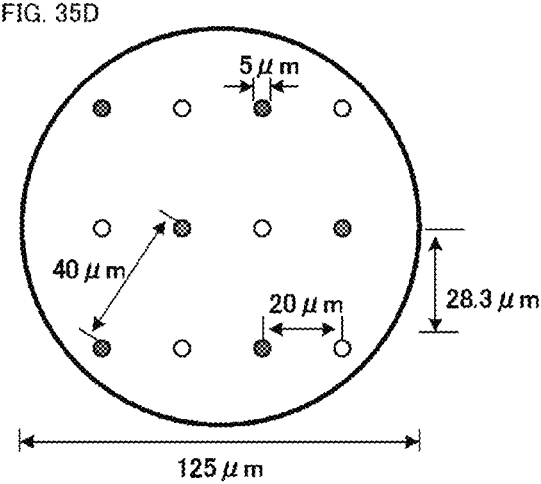
Figure 36A:
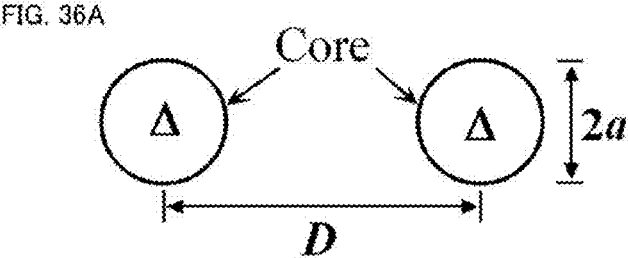
FIG. 36 illustrates a coupling length between the identical cores in the case of low refractive index difference where the refractive index difference is small between the cores of the non-identical cores.
Figure 36B:
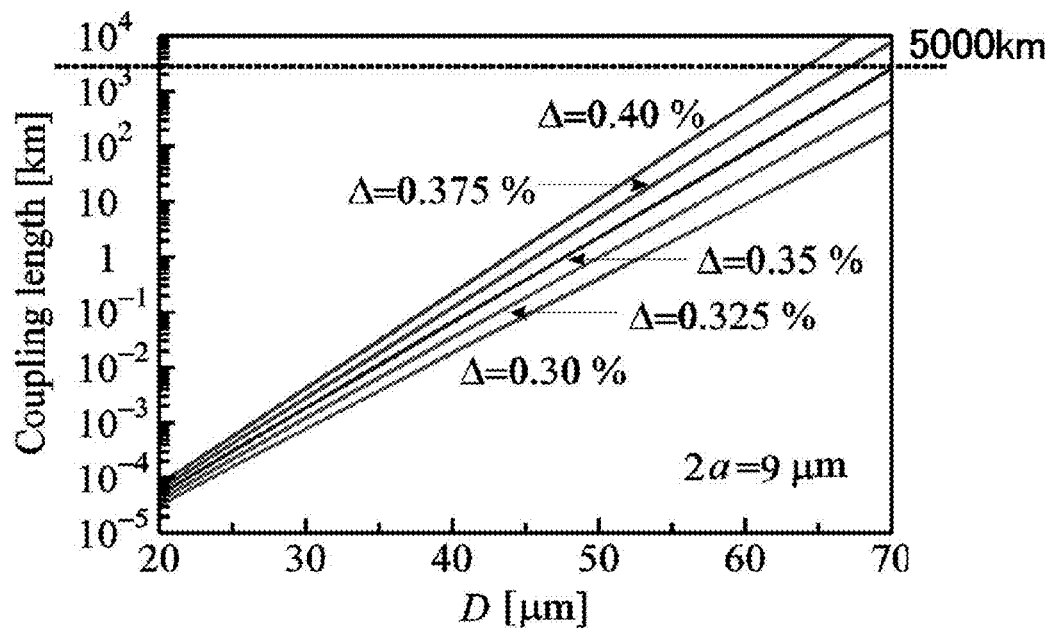
Figure 38A:
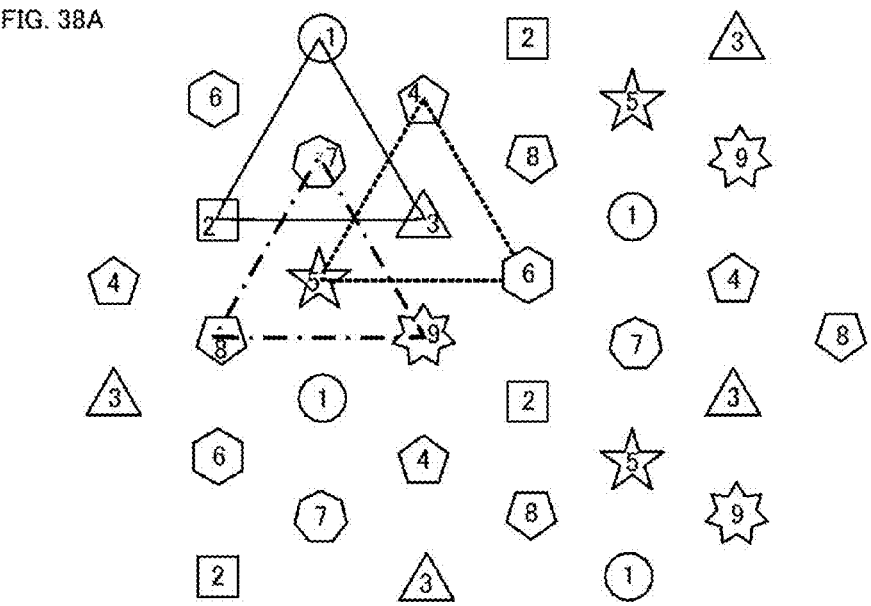
FIG. 38 illustrates increase of core density by raising the number of the non-identical core types.
Figure 38B:
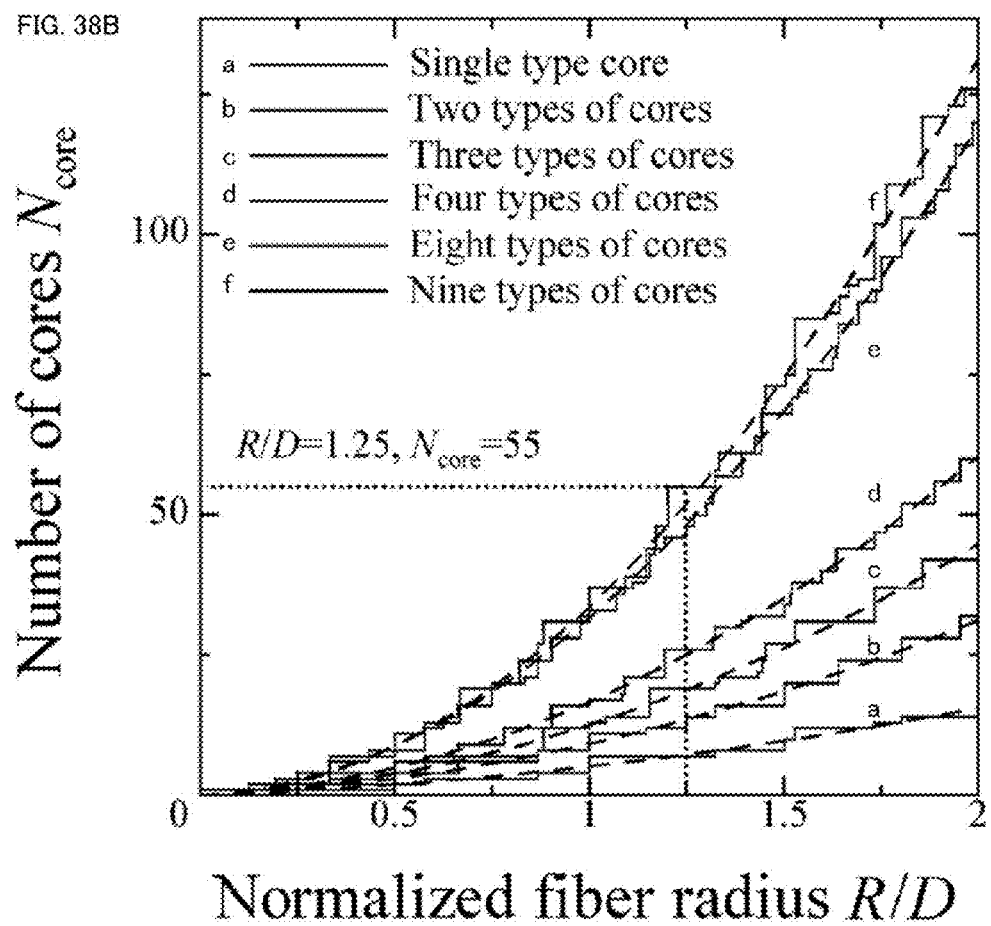
Figure 39A:
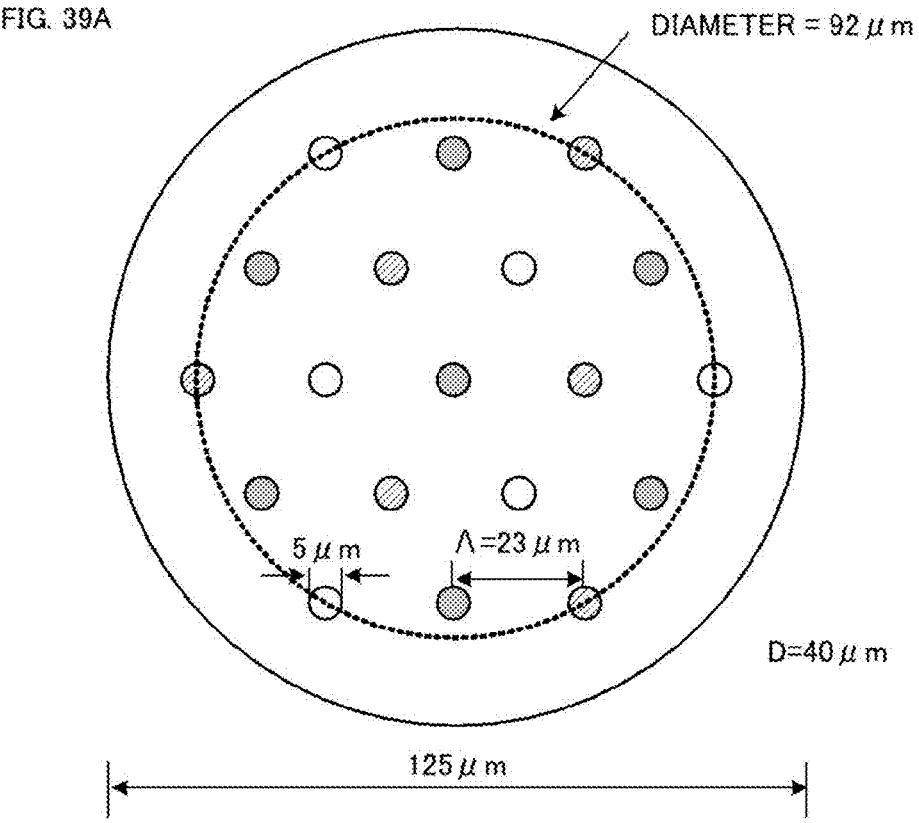
FIG. 39 illustrates an arrangement example of the non-identical cores.
Figure 39B:
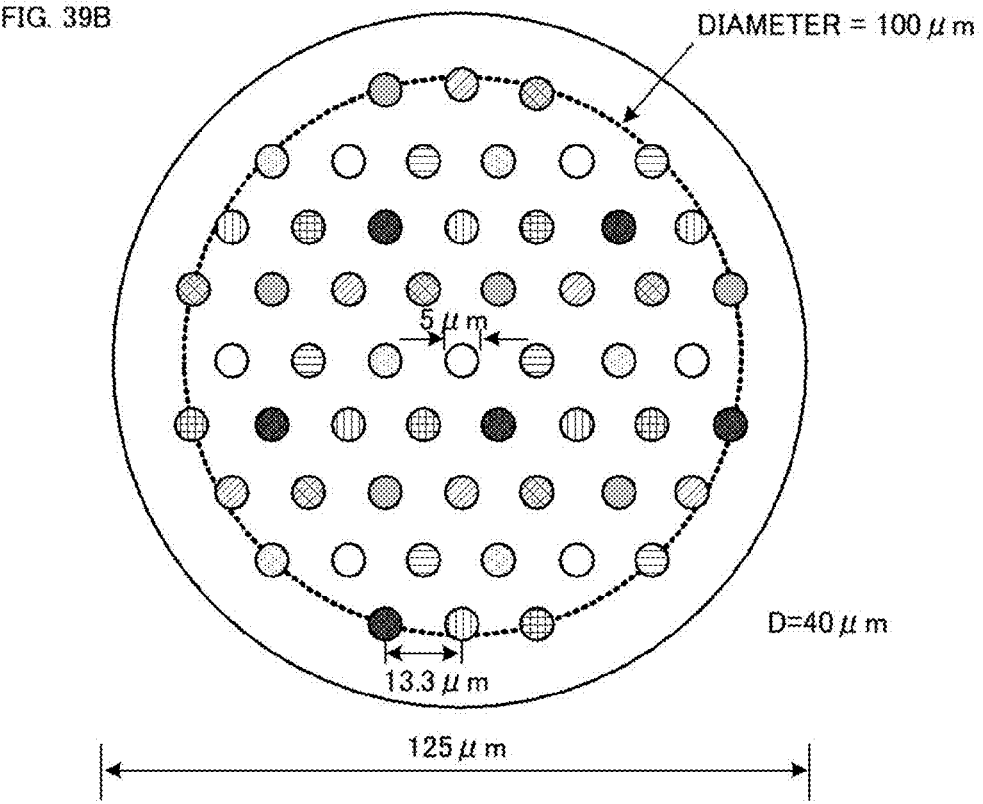
Figure 40:
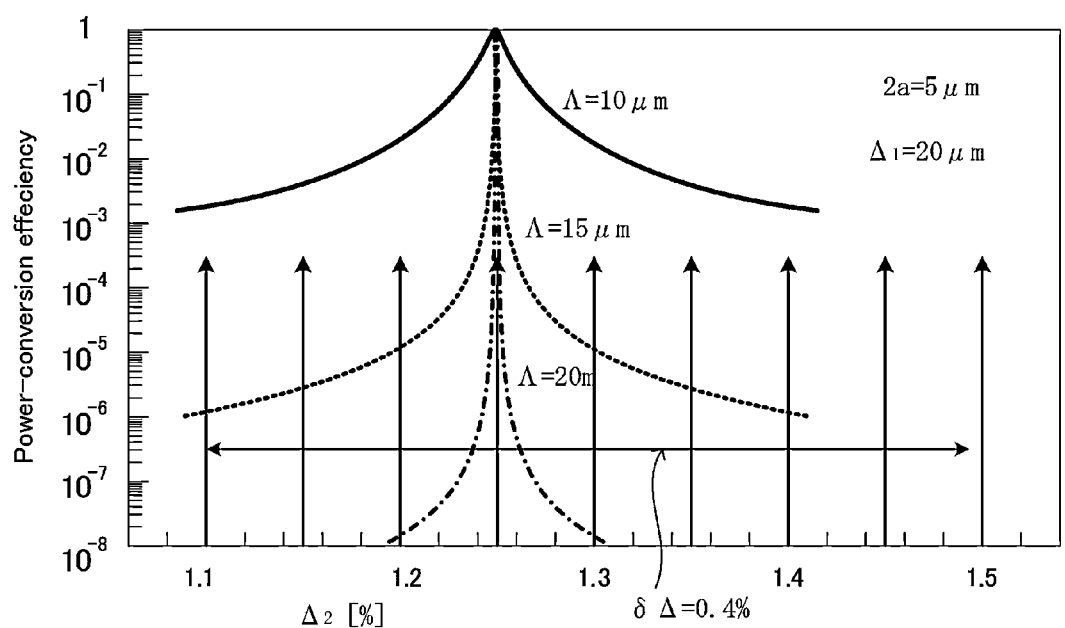
FIG. 40 illustrates a profile of the relative refractive index difference Δ in the cores, when the number of non-identical core types are increased.

FIG. 31 illustrates the arrangement of the non-identical cores having the low refractive index portion. In the example of the non-identical cores as shown in FIG. 8 and FIG. 15, when the diameter of the first cladding is assumed as 16 µm and the distance between the non-identical cores is assumed as 16 µm, 37 cores may be arranged within the area having the diameter of 100 µm.

In the Δnc dependence as shown in FIG. 8, the refractive index contrast Δnc at which the $LP_{11}$ mode is cut off indicates approximately 0.005. In the case of nine types of non-identical cores, the refractive index contrast δnc between the first cladding of adjacent cores is ⅛ of the refractive index contrast Δnc, and it becomes approximately 0.0006 (≈0.005/8). According to the properties of the inter-core maximum power transfer efficiency as shown in FIG. 15, when the refractive index contrast δnc between the first cladding of the adjacent cores is 0.0006, the inter-core maximum power transfer efficiency becomes equal to or less than −50 dB. Therefore, when thirty-seven non-identical cores of nine types are arranged according to the non-identical core arrangement as shown in FIG. 31, cross talk becomes sufficiently small. It is to be noted that the distance between the non-identical cores in FIG. 31 is set to be 16 µm based on the core center interval 16 µm as shown in FIG. 15.

Therefore, they are arranged at high density, nearly doubled in comparison to the case where the non-identical cores that do not have the low refractive index portion are used to arrange nineteen cores as shown in FIG. 24.

Also in the arrangement example, the cores are arranged in dual peripheral parts, with respect to the central core, and the refractive index of the core in the outer peripheral part is made larger than the refractive index of the core in the inner periphery part, thereby reducing the absorption loss caused by the polymer jacket. In addition, by enlarging the refractive index difference between the cores adjacent in the radiation direction, the inter-core coupling due to bending of the optical fiber may be reduced.

It is to be noted that the core arrangement within the optical fiber may not be limited to the triangular lattice arrangement as described in each of the aforementioned examples, but a rectangular lattice arrangement is also applicable.

INDUSTRIAL APPLICABILITY

The present invention may be applicable to a high refractive index core with the relative refractive index difference Δ from around 1.10 to 1.3%, and a low refractive index core with the relative refractive index difference Δ from around 0.3 to 0.4%.

EXPLANATION OF REFERENCES 1 core
2 core part
3 cladding part
4 first cladding
5 second cladding
6 low refractive index portion
11, 12, 13 non-identical core

What is claimed is:

1. A multi-core fiber for accommodating multiple single mode cores in one optical fiber,
   the multiple cores comprising multiple types of non-identical cores having different propagation constants,
   each of the multiple types of non-identical cores comprising a core part and a cladding part that covers an outer periphery of the core part, and
   the cladding part of the non-identical cores comprising a double cladding structure including a first cladding for surrounding an outer periphery of the core part and a second cladding on the outer side of the first cladding, wherein,
   in the multiple types of non-identical cores, a propagation constant of a fundamental mode propagating through the core part is different in each of the non-identical cores,
   in the core part and the first cladding, an optical electromagnetic profile is confined within a range of the core part and the first cladding, both of which restrict a leakage of the optical electromagnetic profile to the second cladding, thereby rendering propagation characteristics of all core part uniform, and
   a refractive index of the first cladding is used as a variable so that the non-identical cores vary in the propagation constant of the fundamental mode propagating through the core part, thereby rendering the propagation constant being different in the multiple types of non-identical cores.

2. The multi-core fiber according to claim 1, wherein,
the cladding part further comprises at least one low refractive index portion that has a refractive index being lower than the refractive index of the second cladding, in any of the following ranges; a range within the first cladding, a range straddling the first cladding and the core part, a range straddling the first cladding and the second cladding, and a range within the second cladding, thereby suppressing existence of $LP_{11}$ mode being a guided mode of the first cladding.

3. The multi-core fiber according to claim 2, wherein,
the second cladding is assumed as a common cladding in the non-identical cores, and a relative refractive index difference $\Delta c$ ($=(n_2^2-n_3^2)/2n_2^2$) between the refractive index $n_3$ of the common cladding as a reference and the refractive index $n_2$ of the first cladding, is different in the non-identical cores, being positive or negative.

4. The multi-core fiber according to claim 2, wherein,
the refractive index of the first cladding is different in the non-identical cores.

5. The multi-core fiber according to claim 2, wherein,
a V-value between the core part and the first cladding and a shape of the refractive index within the core part are uniform in the optical electromagnetic profile,
the V-value is a value determined by $(2\pi/\lambda) \cdot a \cdot n_1 \cdot (2\Delta)^{1/2}$, according to the refractive index $n_1$ at the center of the core part, the refractive index $n_2$ of the first cladding, a relative refractive index difference $\Delta$ ($=(n_1^2-n_2^2)/2n_1^2$) between the core part and the first cladding, and the radius a of the core part.

6. The multi-core fiber according to claim 2, wherein,
the low refractive index portion is an air hole that is formed as a hole being provided in any of the ranges in the cladding part, having the refractive index of the air.

7. The multi-core fiber according to claim 6, wherein,
the second cladding is assumed as a common cladding in the non-identical cores, and a relative refractive index difference $\Delta c$ ($=(n_2^2-n_3^2)/2n_2^2$) between the refractive index $n_3$ of the common cladding as a reference and the refractive index $n_2$ of the first cladding, is different in the non-identical cores, being positive or negative.

8. The multi-core fiber according to claim 6, wherein,
the refractive index of the first cladding is different in the non-identical cores.

9. The multi-core fiber according to claim 1, wherein,
the second cladding is a common cladding in the non-identical cores, and a relative refractive index difference $\Delta c$ ($=(n_2^2-n_3^2)/2n_2^2$) between the refractive index $n_3$ of the common cladding as a reference and the refractive index $n_2$ of the first cladding, is different in the non-identical cores, being positive or negative.

10. The multi-core fiber according to claim 1, wherein,
the refractive indexes of the first claddings of the non-identical cores are different.

11. The multi-core fiber according to claim 1, wherein,
a V-value between the core part and the first cladding and a shape of the refractive index within the core part are uniform in the optical electromagnetic profile,
the V-value is a value determined by $(2\pi/\lambda) \cdot a \cdot n_1 \cdot (2\Delta)^{1/2}$, according to the refractive index $n_1$ at the center of the core part, the refractive index $n_2$ of the first cladding, a relative refractive index difference $\Delta$ ($=(n_1^2-n_2^2)/2n_1^2$) between the core part and the first cladding, and the radius a of the core part.

12. The multi-core fiber according to claim 1, wherein,
the multiple cores accommodated in the one optical fiber includes the non-identical cores having different propagation constants and identical cores having an identical propagation constant, and the identical cores are made up of multiple cores being a combination of the cores having the identical propagation constant selected from the multiple types of the non-identical cores.

13. The multi-core fiber according to claim 1, wherein,
the multiple cores accommodated in one optical fiber comprise only the non-identical cores having different propagation constants, and the propagation constant in each of all the non-identical cores is different from one another.

* * * * *